US010801272B2

United States Patent
Arizmendi et al.

(10) Patent No.: US 10,801,272 B2
(45) Date of Patent: Oct. 13, 2020

(54) TUBULAR GRIPPING DEVICE

(71) Applicant: Centergenics, LLC, Magnolia, TX (US)

(72) Inventors: Napoleon Arizmendi, Magnolia, TX (US); Richard P Rubbo, The Woodlands, TX (US)

(73) Assignee: Centergenics, LLC, Magnolia, TX (US)

( * ) Notice: Subject to any disclaimer, the term of this patent is extended or adjusted under 35 U.S.C. 154(b) by 304 days.

(21) Appl. No.: 15/800,671

(22) Filed: Nov. 1, 2017

(65) Prior Publication Data

US 2018/0119497 A1    May 3, 2018

Related U.S. Application Data

(60) Provisional application No. 62/416,642, filed on Nov. 2, 2016.

(51) Int. Cl.
| | | |
|---|---|---|
| *E21B 17/10* | (2006.01) | |
| *E21B 17/00* | (2006.01) | |
| *F16D 1/08* | (2006.01) | |

(52) U.S. Cl.
CPC ............ *E21B 17/006* (2013.01); *E21B 17/10* (2013.01); *E21B 17/1078* (2013.01); *F16D 1/0823* (2013.01)

(58) Field of Classification Search
CPC ...... E21B 37/02; E21B 17/1078; E21B 17/10; F16L 37/0925; Y10T 403/7058
See application file for complete search history.

(56) References Cited

U.S. PATENT DOCUMENTS

| 2,533,973 A | 12/1950 | Carleton |
| 2,652,270 A | 9/1953 | Jones |
| (Continued) | | |

FOREIGN PATENT DOCUMENTS

| GB | 872345 A | 7/1961 |
| GB | 1476443 A | 6/1977 |
| (Continued) | | |

OTHER PUBLICATIONS

International Searching Authority, International Search Report and Written Opinion, PCT/US2017/059613, 13 pages, dated Mar. 14, 2018.

(Continued)

*Primary Examiner* — Kipp C Wallace

(57) ABSTRACT

A tubular gripping device comprising an outer body, a self-locking mechanism, and a retainer member. The outer body defines an inner tubular cavity having a first inner diameter, a second inner diameter, a first load shoulder, and a second load shoulder. The first load shoulder tapers the first inner diameter down to second inner diameter at the second load shoulder. The second load shoulder acts as a stop at the second inner diameter. The self-locking is mechanism positioned substantially co-axially within the tubular cavity of the outer body and proximate the first inner diameter, the self-locking mechanism having a spring expanded and a spring released position. The retainer member has a first retainer position radially restraining the self-locking mechanism in the spring expanded position and a second retainer position allowing the self-locking mechanism to contract to the spring released position to grip an outer surface of a tubular member.

29 Claims, 55 Drawing Sheets

(56) References Cited

U.S. PATENT DOCUMENTS

| | | | |
|---|---|---|---|
| 2,671,641 A | | 3/1954 | Hinkle |
| 2,855,052 A | * | 10/1958 | Wright ................ E21B 37/02 166/243 |
| 2,901,269 A | | 8/1959 | Rickard |
| 2,907,189 A | | 10/1959 | Werner |
| 2,936,625 A | | 5/1960 | Heiseler |
| 2,962,313 A | * | 11/1960 | Conrad ............. E21B 17/1028 403/362 |
| 3,065,005 A | * | 11/1962 | Hall, Sr. ............... E21B 37/02 403/6 |
| 3,600,010 A | * | 8/1971 | Downs, III ............ F16L 17/10 285/96 |
| 3,646,777 A | | 3/1972 | Anderson et al. |
| 4,131,167 A | | 12/1978 | Richey |
| 4,245,709 A | | 1/1981 | Manuel |
| 4,438,822 A | * | 3/1984 | Russell ............. E21B 17/1078 175/325.5 |
| 5,335,723 A | | 8/1994 | Mouton |
| 5,575,333 A | | 11/1996 | Lirette et al. |
| 5,706,894 A | * | 1/1998 | Hawkins, III ......... E21B 17/10 166/208 |
| 5,794,988 A | | 8/1998 | Gill |
| 5,860,760 A | | 1/1999 | Kirk |
| 6,186,560 B1 | | 2/2001 | Gill |
| 6,435,275 B1 | | 8/2002 | Kirk et al. |
| 6,533,034 B1 | | 3/2003 | Barger |
| 6,986,533 B2 | * | 1/2006 | Ko .................... F16L 37/0925 285/313 |
| 8,668,007 B2 | | 3/2014 | Casassa et al. |
| 2002/0112853 A1 | | 8/2002 | Buytaert |
| 2010/0218956 A1 | | 9/2010 | Buytaert et al. |
| 2011/0114338 A1 | | 5/2011 | Casassa et al. |
| 2014/0000900 A1 | | 1/2014 | Leiper et al. |
| 2015/0137514 A1 | * | 5/2015 | Gifford ............... F16L 37/0925 285/332.2 |

FOREIGN PATENT DOCUMENTS

| | | |
|---|---|---|
| GB | 2571038 A | 8/2019 |
| WO | 1997048268 A2 | 12/1997 |
| WO | 2012095671 A2 | 7/2012 |

OTHER PUBLICATIONS

International Searching Authority, International Search Report & Written Opinion for Application PCT/US2016/058170 dated Feb. 17, 2017, 12 pgs.

* cited by examiner

VIEW 'E-E'

VIEW 'E-E'

40600

```
┌─────────────────────────────────────────────┐
│  PLACING A CENTRALIZER HOUSING ONTO A       │
│  TUBULAR MEMBER, THE CENTRALIZER HOUSING    │──40602
│  COMPRISING AN INNER CAVITY CONFIGURED      │
│  TO SLIDE OVER AN OUTER SURFACE OF THE      │
│  TUBULAR MEMBER, THE HOUSING COMPRISING     │
│  AN OUTER SURFACE FOR CENTERING             │
│  THE TUBULAR MEMBER WITHIN A BOREHOLE       │
└─────────────────────────────────────────────┘
                     │
                     ▼
┌─────────────────────────────────────────────┐
│  ACCESSING A FIRST LOCKING MECHANISM COUPLED WITH │──40604
│  THE INNER CAVITY, THE FIRST LOCKING MECHANISM    │
│  CONFIGURED SUCH THAT WHEN RETAINED IN A RETRACTED│
│  POSITION BY A RETAINING MEMBER, THE LOCKING      │
│  MECHANISM ALLOWS AXIAL MOVEMENT OF THE CENTRALIZER│
│  HOUSING WITH RESPECT TO THE TUBULAR MEMBER AND   │
│  WHEN THE RETAINING MEMBER IS REMOVED AND THE FIRST│
│  LOCKING MECHANISM IS IN AN ENABLED POSITION, THE │
│  LOCKING MECHANISM PROVIDES A GRIPPING FORCE THAT │
│  RESTRICTS AXIAL MOVEMENT OF THE HOUSING WITH     │
│  RESPECT TO THE TUBULAR MEMBER                    │
└─────────────────────────────────────────────┘
                     │
                     ▼
┌─────────────────────────────────────────────┐
│  RELEASING THE RETAINING MEMBER TO ATTACH THE │──40606
│  CENTRALIZER TO THE TUBULAR MEMBER            │
└─────────────────────────────────────────────┘
```

```
┌─────────────────────────────────────────────────┐
│ POSITIONING A CENTRALIZER HOUSING ONTO A WELLBORE│──40702
│ PIPE, THE CENTRALIZER HOUSING COMPRISING AN INNER│
│ CAVITY CONFIGURED TO SLIDE OVER AN OUTER SURFACE │
│ OF THE WELLBORE PIPE, THE HOUSING COMPRISING AN  │
│ OUTER SURFACE FOR CENTERING THE WELLBORE         │
│ PIPE WITHIN A WELLBORE                           │
└─────────────────────────────────────────────────┘
                        │
                        ▼
┌─────────────────────────────────────────────────┐
│ ACCESSING A FIRST LOCKING MECHANISM COUPLED WITH │──40704
│ THE INNER CAVITY, THE FIRST LOCKING MECHANISM    │
│ CONFIGURED SUCH THAT WHEN RETAINED IN A RETRACTED│
│ POSITION BY A RETAINING MEMBER, THE LOCKING      │
│ MECHANISM ENABLES FREE MOVEMENT OF THE CENTRALIZER│
│ HOUSING WITH RESPECT TO THE WELLBORE PIPE AND    │
│ WHEN THE RETAINING MEMBER IS REMOVED AND THE FIRST│
│ LOCKING MECHANISM IS IN AN ENABLED POSITION, THE FIRST│
│ LOCKING MECHANISM PROVIDES A FRICTIONAL FORCE    │
│ BETWEEN THE WELLBORE PIPE AND SAID CENTRALIZER   │
│ HOUSING THAT RESTRICTS AXIAL MOVEMENT OF THE     │
│ CENTRALIZER HOUSING WITH RESPECT TO THE WELLBORE PIPE│
└─────────────────────────────────────────────────┘
                        │
                        ▼
┌─────────────────────────────────────────────────┐
│ REMOVING THE RETAINING MEMBER TO ATTACH THE      │──40706
│ CENTRALIZER TO THE WELLBORE PIPE                 │
└─────────────────────────────────────────────────┘
                        │
                        ▼
┌─────────────────────────────────────────────────┐
│ MOVING AXIALLY THE CENTRALIZER HOUSING WITH      │──40708
│ RESPECT TO THE WELLBORE PIPE                     │
└─────────────────────────────────────────────────┘
                        │
                        ▼
┌─────────────────────────────────────────────────┐
│ ENGAGING A SECOND LOCKING MECHANISM COUPLED WITH │──40710
│ THE INNER CAVITY AND CONFIGURED SUCH THAT WHEN IN AN│
│ UNLOCKED POSITION, THE SECOND LOCKING MECHANISM  │
│ PROVIDES A SECOND GRIPPING FORCE THAT RESTRICTS  │
│ ROTATIONAL MOVEMENT OF THE CENTRALIZER HOUSING   │
│ WITH RESPECT TO THE WELLBORE PIPE                │
└─────────────────────────────────────────────────┘
```

PLACING A TUBULAR GRIPPING DEVICE ONTO A TUBULAR MEMBER, THE TUBULAR GRIPPING DEVICE COMPRISING: AN OUTER BODY WHICH DEFINES AN INNER TUBULAR CAVITY CONFIGURED TO SLIDE OVER AN OUTER SURFACE OF THE TUBULAR MEMBER; A SELF-LOCKING MECHANISM POSITIONED SUBSTANTIALLY CO-AXIALLY WITHIN THE TUBULAR CAVITY OF THE OUTER BODY; AND A RETAINER MEMBER HAVING A FIRST RETAINER POSITION RESTRAINING THE SELF-LOCKING MECHANISM RADIALLY IN A SPRING EXPANDED POSITION AND A SECOND RETAINER POSITION ALLOWING THE SELF-LOCKING MECHANISM TO CONTRACT TO A SPRING RELEASED POSITION TO GRIP AN OUTER SURFACE OF THE TUBULAR MEMBER
56100

MOVING THE RETAINER MEMBER FROM THE FIRST RETAINER POSITION TO THE SECOND RETAINER POSITION TO ALLOW THE SELF-LOCKING MECHANISM OF THE TUBULAR GRIPPING DEVICE TO GRIP THE OUTER SURFACE OF THE TUBULAR MEMBER
56200

AXIALLY REPOSITIONING THE SELF-LOCKING MECHANISM RELATIVE TO THE OUTER BODY BY SLIDING THE SELF-LOCKING MECHANISM INTO CONTACT WITH ITS RESPECTIVE LOAD SHOULDER BY MANUALLY INTERACTING WITH THE SELF-LOCKING MECHANISM VIA ONE OR MORE APERTURES PROVIDED IN THE OUTER BODY
56300

FIG. 56B

TUBULAR GRIPPING DEVICE

RELATED APPLICATIONS

This application claims priority to Provisional U.S. Patent Application No. 62/416,642 filed on Nov. 2, 2016 entitled "STOP COLLAR" by Napoleon Arizmendi and Richard P. Rubbo, which is assigned to the assignee of the present invention, the contents of which are incorporated by reference herein in their entirety.

TECHNICAL FIELD

Embodiments described are related to wellbore pipe, or casing, tubular gripping device that is self-locking onto a tubular member such as a tubular wellbore pipe.

BACKGROUND

Within the area of subterranean well construction, centralizers are used to keep the tubular casing centered in the wellbore to facilitate placement of the casing in the bore and to prevent cementing the pipe against a side of the borehole. Centralizers isolate the outer surface of the wellbore pipe from the inner surface of the wellbore. Additionally, in long horizontal sections of wellbore, centralizers provide support of the tubular casing section, preventing the wellbore pipe from laying on the lower inner surface of the horizontal wellbore. In some instances, a centralizer is configured to grip a tubular casing. In some instances, a gripping stop collar may be affixed around a tubular casing. For example, in situations where a non-gripping centralizer is employed, the non-gripping centralizer may be used in conjunction with a stop/lock collar which grips the tubular casing and may interface with the non-gripping centralizer to constrain linear and axial movement of the centralizer with respect to the tubular casing.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 42 is a flow diagram of an exemplary method for attaching a centralizer to a tubular in accordance with an embodiment.

FIG. 43 is a flow diagram of an exemplary method for using a wellbore pipe centralizer in accordance with an embodiment.

FIG. 56A and FIG. 56B illustrate a flow diagram of a method of attaching a tubular gripping device to a tubular member, in accordance with various embodiments.

DETAILED DESCRIPTION

Figure 1:
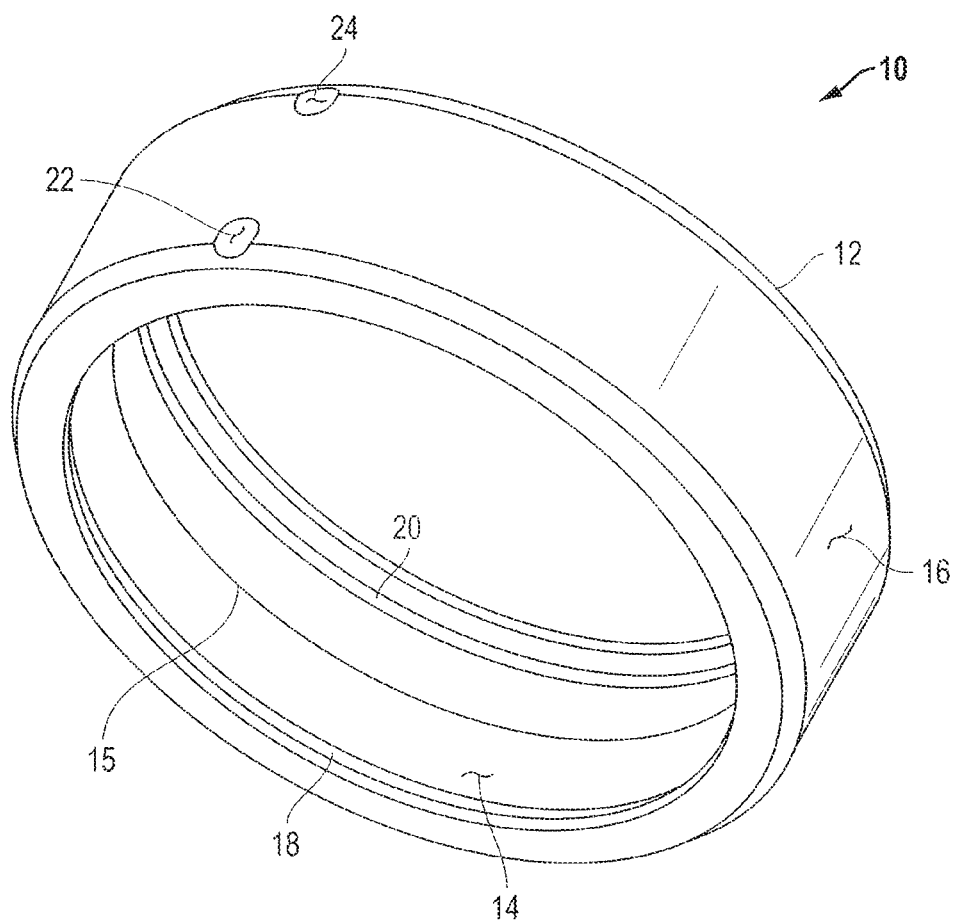
FIG. 1 is an isometric view of an embodiment of a lock collar illustrated in accordance with principles of the present invention described herein.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the invention as defined by the appended claims. Furthermore, in the Detailed Description, numerous specific details are set forth in order to provide a thorough understanding of embodiments of the present subject matter. However, embodiments may be practiced without these specific details. In other instances, well known methods, procedures, and components have not been described in detail as not to unnecessarily obscure aspects of the described embodiments.

Notation and Nomenclature

Any use of "top," "bottom," "above," "below," other directional terms, and variations of these terms is made for convenience, but does not require any particular orientation of the components. The terms "helical" and "spiral" are not intended to require perfectly mathematical helix or spirals, and are also particularly intended to include square ended, closed ended, and ground versions of springs of these types, various screw thread forms, and also as the channels that would receive any of these shapes.

Embodiments described herein relate to a tubular gripping device that can be disposed about and can grip to a tubular wellbore pipe, such as for example a well casing or tubing, within a wellbore. The tubular gripping device may comprise a centralizer, a lock collar, or the like. In one embodiment, the tubular gripping device described herein attaches to an outside surface of a tubular well pipe section. Conventional attachment procedures for a tubular gripping device involve installing locking pins, tightening a retaining device or other conventional practices that requires an externally applied force at the time of installation, such as for example pounding with a hammer or tightening a screw, to lock the tubular gripping device to a pipe section or drive a securing pin into a pipe section. Embodiments described herein do not require an externally applied force at the time of installation to secure the tubular gripping device to a pipe segment, as with conventional tubular gripping devices.

Embodiments described herein include a tubular gripping device that comprises a first self-locking mechanism including a spring, grip ring, or the like that is able to passively, such as with only the tension in the self-locking mechanism, grip onto a pipe section once positioned and allowed to engage. A retaining member initially retains the first self-locking in disabled, disengaged, and unlocked position in which it has an expanded diameter that allows it to be slidably positioned relative to a pipe section. Once positioned, retaining member is released from the first self-locking mechanism and the tubular gripping device becomes installed and engaged as the unretained self-locking mechanism grips the pipe section. When installed and engaged, the first self-locking mechanism, in one embodiment, restricts axial movement of the tubular gripping device with respect to a pipe section. In one embodiment, the first self-locking mechanism additionally or alternatively restricts rotational movement of the tubular gripping device with respect to a pipe section. In some examples, the second self-locking mechanism includes ridges, teeth, or sharp wickers that provide gripping and/or frictional force between the tubular gripping device and the pipe section.

In some embodiments, the tubular gripping device further comprises a second self-locking mechanism that augments the gripping of first self-locking mechanism to also restrict movement of the tubular gripping device with respect to a pipe section.

In some embodiments, the second self-locking mechanism, when engaged, restricts one or more of axial and rotational movement of the tubular gripping device with respect to the pipe section. In some embodiments, the second self-locking mechanism is of a different type that the first self-locking mechanism; in other embodiments, the second self-locking mechanism may be of similar or identical type to the first self-locking mechanism. In some examples, the second self-locking mechanism includes ridges, teeth, or sharp wickers that provide gripping and/or frictional force between the tubular gripping device and the pipe section. For example, the second self-locking mechanism may employ one or more twisted square wires having ridges or sharp wickers in a helix formation about the wire that provide a gripping and/or frictional force between the tubular gripping device and the pipe section that resists a rotational movement of the tubular gripping device.

FIG. 1 is an isometric view of a first embodiment of a lock collar 10 illustrated in accordance with principles of the present invention described herein. Referring to FIG. 1, lock collar 10 has a cylindrical body 12 with a hollow interior. Lock collar 10 has an interior surface 14 and an exterior surface 16. Interior surface 14 may be wedge shaped, having a circumferential peak 15. A first interior channel 18 is located on interior surface 14. A second interior channel 20 is located on interior surface 14. A first aperture 22 extends between exterior surface 16 and first channel 18. A second aperture 24 extends between exterior surface 16 and second channel 20.

Figure 2:
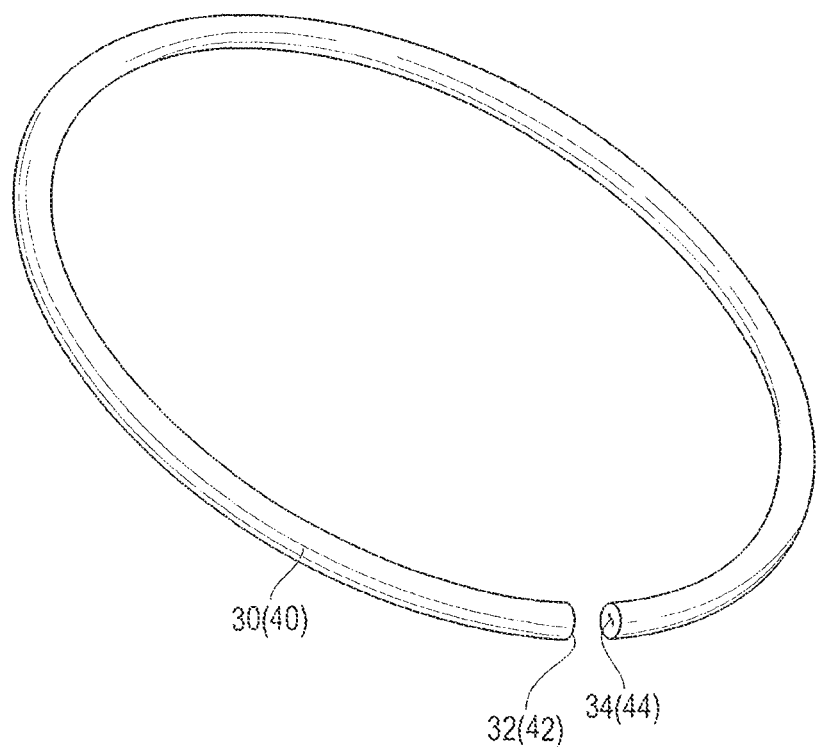
FIG. 2 is an isometric view of a spring member for use with the lock collar of FIG. 1.

FIG. 2 is an isometric view of a typical first and second expandable spring member 30 and 40, respectively, having a pair of opposing ends 32 (42) and 34 (44).

Figure 3:
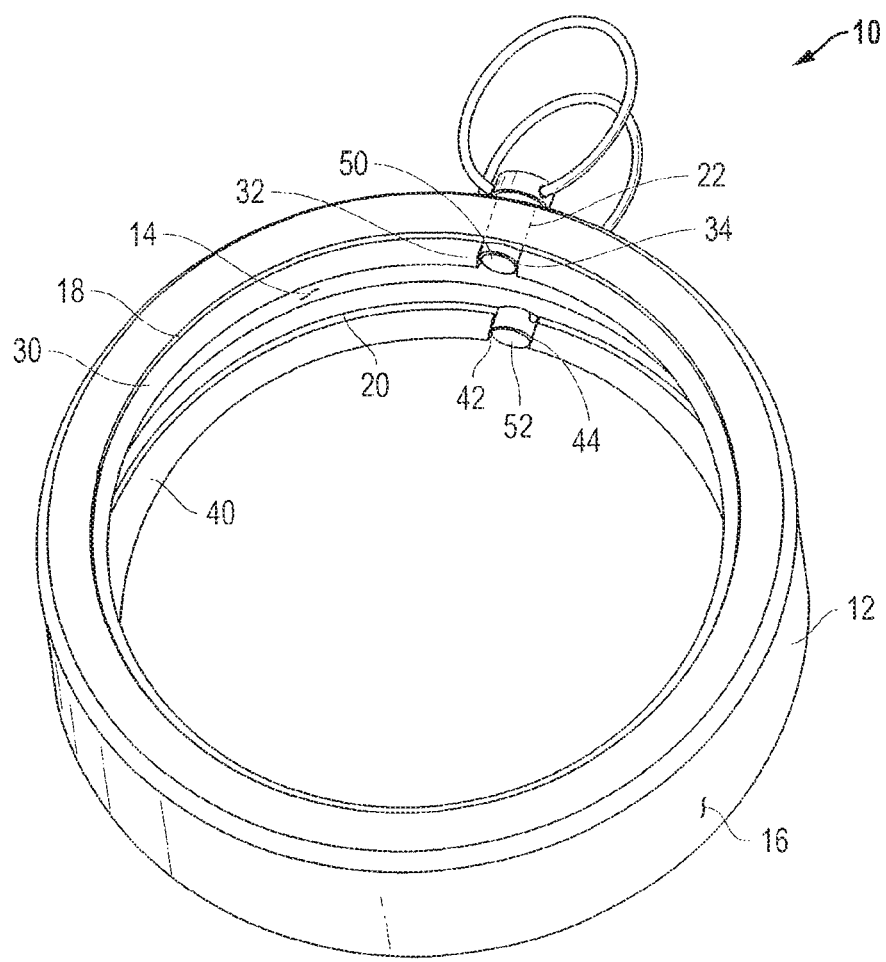
FIG. 3 is an isometric view of the lock collar illustrated with the spring member of FIG. 2 in place.

FIG. 3 is an isometric view of lock collar 10 illustrated with first spring member 30 located in first channel 18. Opposing ends 32 and 34 of first spring 30 are positioned adjacent to aperture 22. Second expandable spring member 40 is located in second channel 20. Opposing ends 42 and 44 of second spring 40 are positioned adjacent to aperture 24.

A first retaining pin 50 is removably located in first aperture 22, between ends 32 and 34 of first spring 30 so as to hold first spring 30 in an expanded position. A second retaining pin 52 is removably located in second aperture 24 between ends 42 and 44 of second spring 40 so as to hold second spring 40 in an expanded position.

With first and second springs 30 and 40 held in the expanded position by their respective retaining pins 50 and 52, lock collar 10 may be placed over the exterior surface of the down hole well tubular to which it will lock. This is possible because the interior diameter of first and second springs 30 and 40 in the expanded state is equal to or greater than the exterior diameter of the tubular.

As illustrated, first and second retaining pins 50 and 52 are removable from exterior surface 16 side of lock collar 10. The interior diameter of first and second springs 30 and 40 in an unexpanded state is less than the exterior diameter of the tubular over which lock collar 10 will be located. In this manner, removal of retaining pins 50 and 52 will release spring members 30 and 40 such that they will grip the exterior surface of the downhole well tubular.

Figure 4:
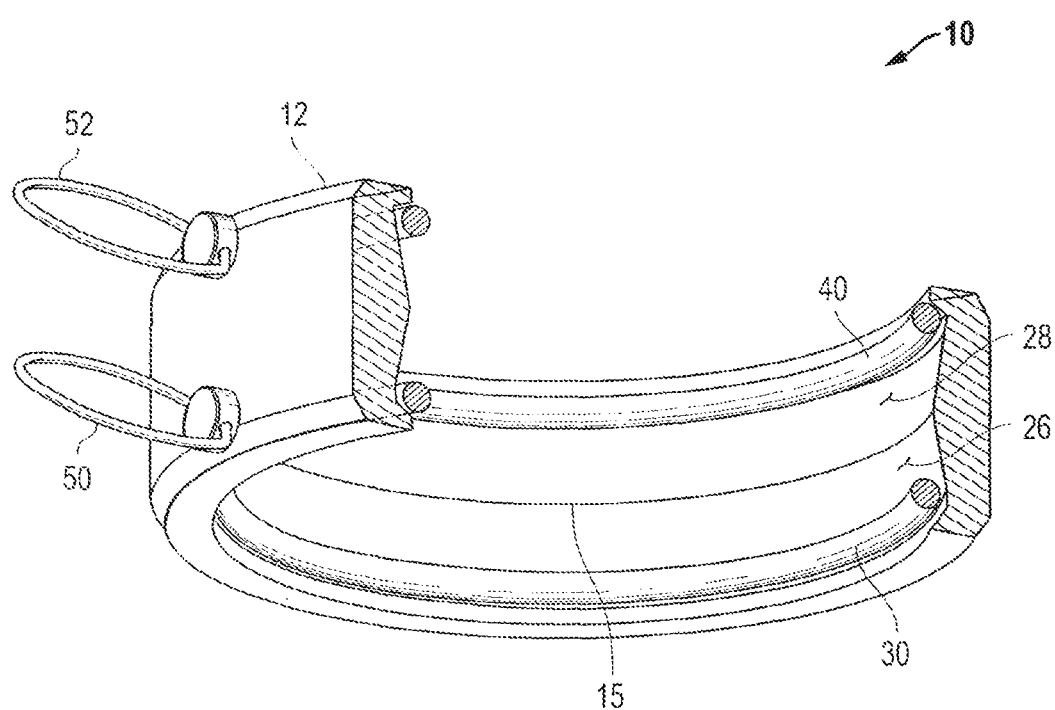
FIG. 4 is an isometric sectioned view of the lock collar illustrated with the spring member of FIG. 2 in place.

FIG. 4 is an isometric sectioned view of lock collar 10 illustrated with spring members 30 and 40 held in channels 18 and 20 by retainers 50 and 52. Circumferential peak 15 creates a wedge shape to which a wedge surface 26 urges spring 30 outwardly. Similarly, circumferential peak 15 creates a wedge shape to which a wedge surface 28 urges spring 40 outwardly. Wedges 26 and 28 discourage axial movement of springs 30 and 40 in relationship to circumferential peak 15, thus strengthening the gripping force of lock collar 10 on the tubular to which it is attached.

In another embodiment, springs 30 and 40 may have a knurled or profiled surface to assist in gripping the pipe OD.

Figure 5:
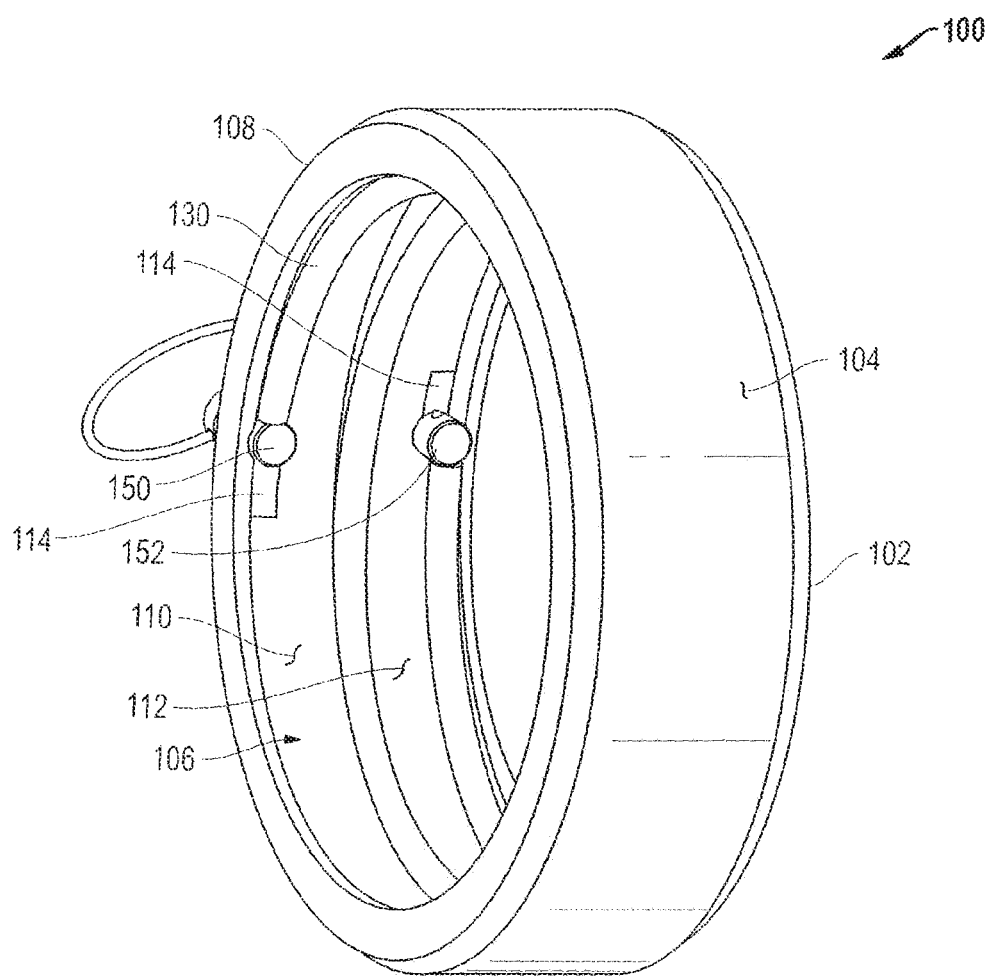
FIG. 5 is an isometric view of a second embodiment of a lock collar illustrated in accordance with principles of the present invention described herein.

FIG. 5 is an isometric view of a second embodiment of a lock collar illustrated in accordance with principles of the present invention described herein. As illustrated in FIG. 5, lock collar 100 has a cylindrical body 102 with a hollow interior. Lock collar 100 has an exterior surface 104 and an interior surface 106. Interior surface 106 may be wedge shaped, having a circumferential peak 108. Peak 108 forms opposing wedge surfaces 110 and 112. A generally helical interior channel 114 is located on interior surface 106.

A first aperture 122 (not visible) extends between exterior surface 104 and helical channel 114. A first retaining pin 150 is removably located in first aperture 122. A second aperture 124 (not visible) extends between exterior surface 104 and channel 114. A second retaining pin 152 is removably located in second aperture 124.

Figure 6:
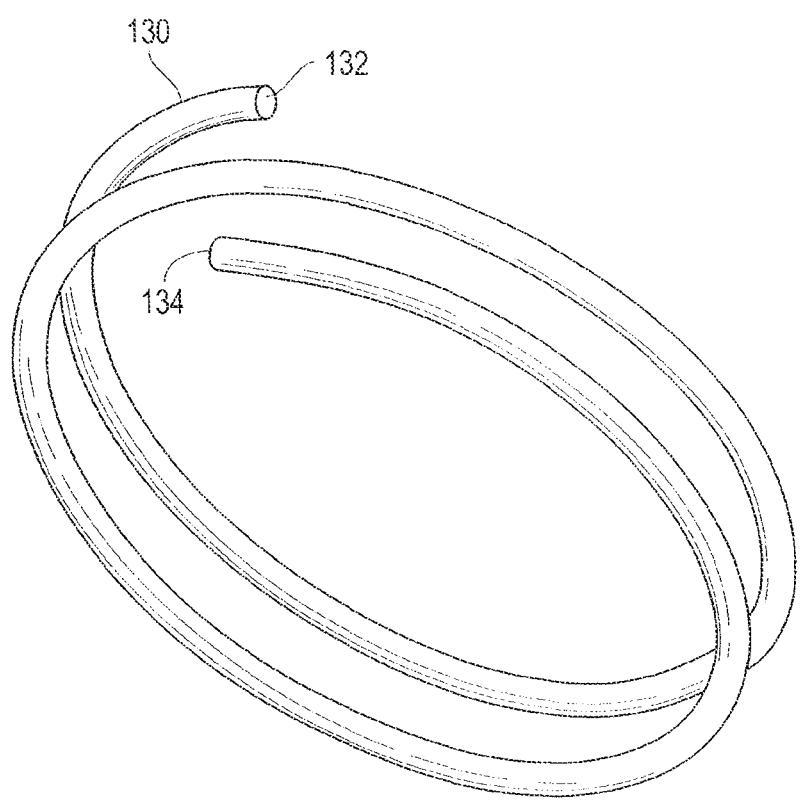
FIG. 6 is an isometric view of a spring member for use with the lock collar of FIG. 5.

FIG. 6 is an isometric view of an expandable helical spring member 130, having a first end 132 and an opposite second end 134. Spring 130 is illustrated in an embodiment in which it has open ends, and is not ground. Referring back to FIG. 5, spring member 130 is located in channel 114, between retaining pins 150 and 152.

Figure 7:
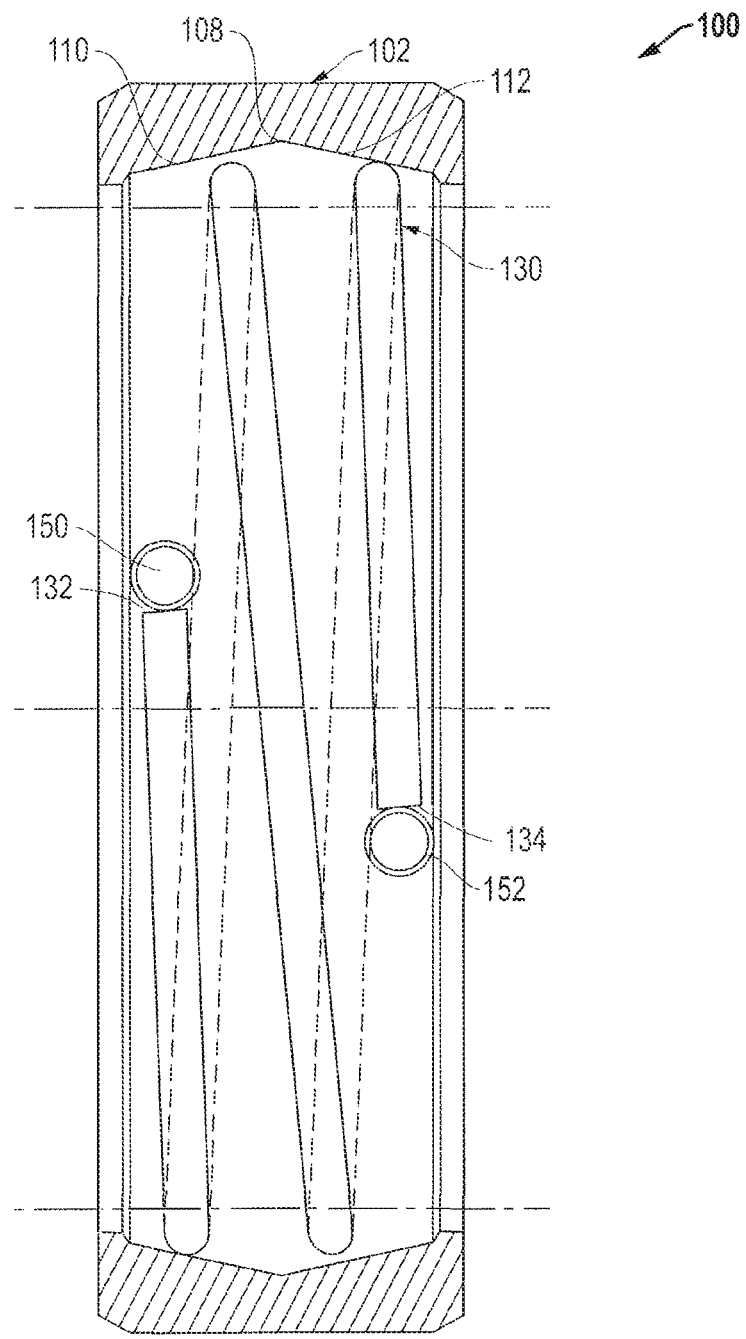
FIG. 7 is a cross-sectional view of the lock collar of FIG. 5.

FIG. 7 is a cross-sectional view of lock collar 100 illustrated with spring member 130 located in cham1el114. End 132 of spring 130 is in engagen1ent with retaining pin 150. End 134 of spring 130 is in engagement with retaining pin 152. Spring 130 engages interior wedges 110 and 112. The open end, or not ground design, of spring 130 requires less axial force for lock collar 100 to grip the pipe OD due to the "point load" contact between the end of the last coil and wedge 110 and 112 surfaces.

With spring 130 held in the expanded position by retaining pins 150 and 152, lock collar 100 may be placed over the exterior surface of the downhole well tubular to which it will lock. This is possible because the interior diameter of spring 130 in the expanded state is equal to or greater than the exterior diameter of the tubular.

First and second retaining pins 150 and 152 are removable from exterior surface 104 side of lock collar 100. The interior diameter of spring 130 in an unexpanded state is less than the exterior diameter of the tubular over which lock collar 100 will be located. In this manner, removal of retaining pins 150 and 152 will release spring member 130 such that it will grip the exterior surface of the downhole well tubular.

Figure 8:
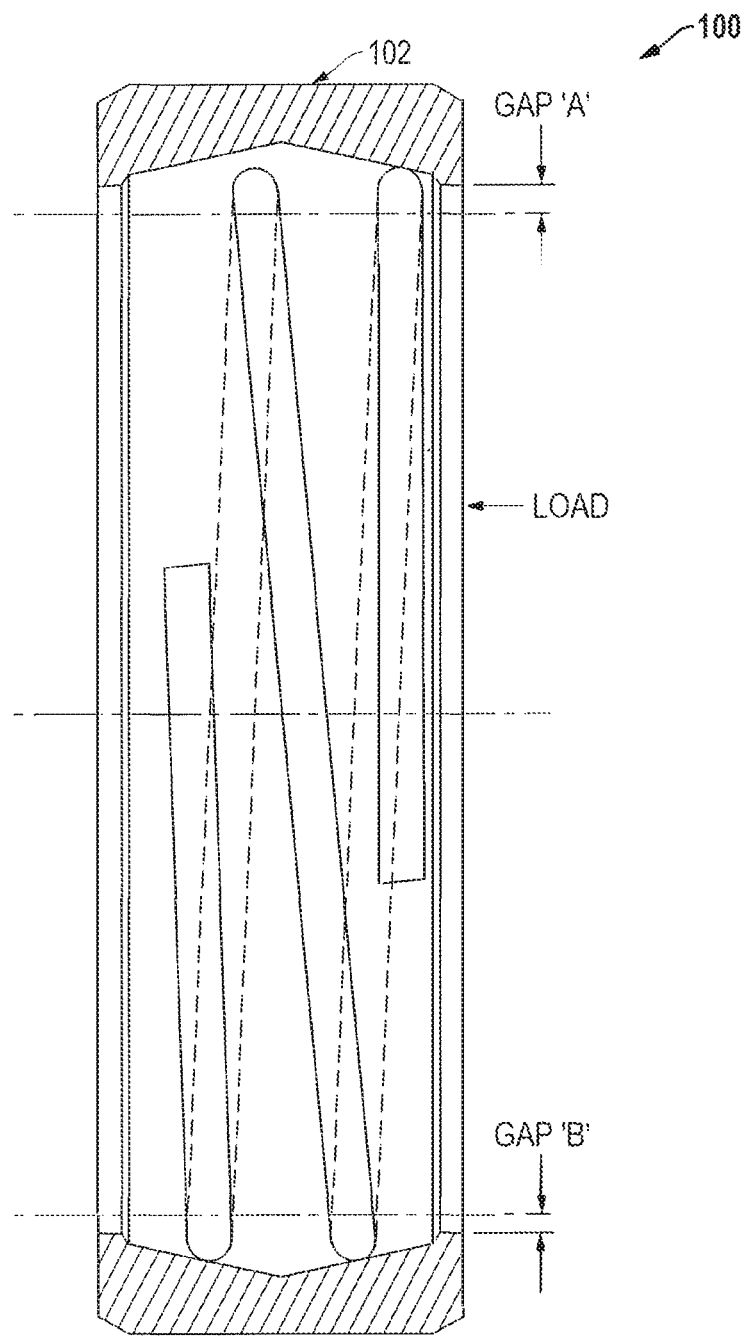
FIG. 8 is a cross-sectional view of the lock collar of FIG. 5, showing the function of the wedge surface in response to axial force against the lock collar.

FIG. 8 is a cross-sectional view of lock collar 100 illustrated with spring member 130 located in channel 114. Circumferential peak 108 separates interior wedges 110 and 112. Wedges 110 and 112 discourage axial movement of spring 130 in relationship to circumferential peak 108, thus strengthening the gripping force of lock collar 100 on the tubular to which it is attached. In another embodiment, spring 130 may have a knurled or profiled surface to assist in gripping the pipe OD. As shown in FIG. 8, lock collar 100 1nay become slightly offset from the pipe diameter as the load is increased; the "point contact" will become a "line contact" between the last coil and the wedge surfaces 110 and 112. See Gap 'A' and Gap 'B' of FIG. 8.

Figure 9:
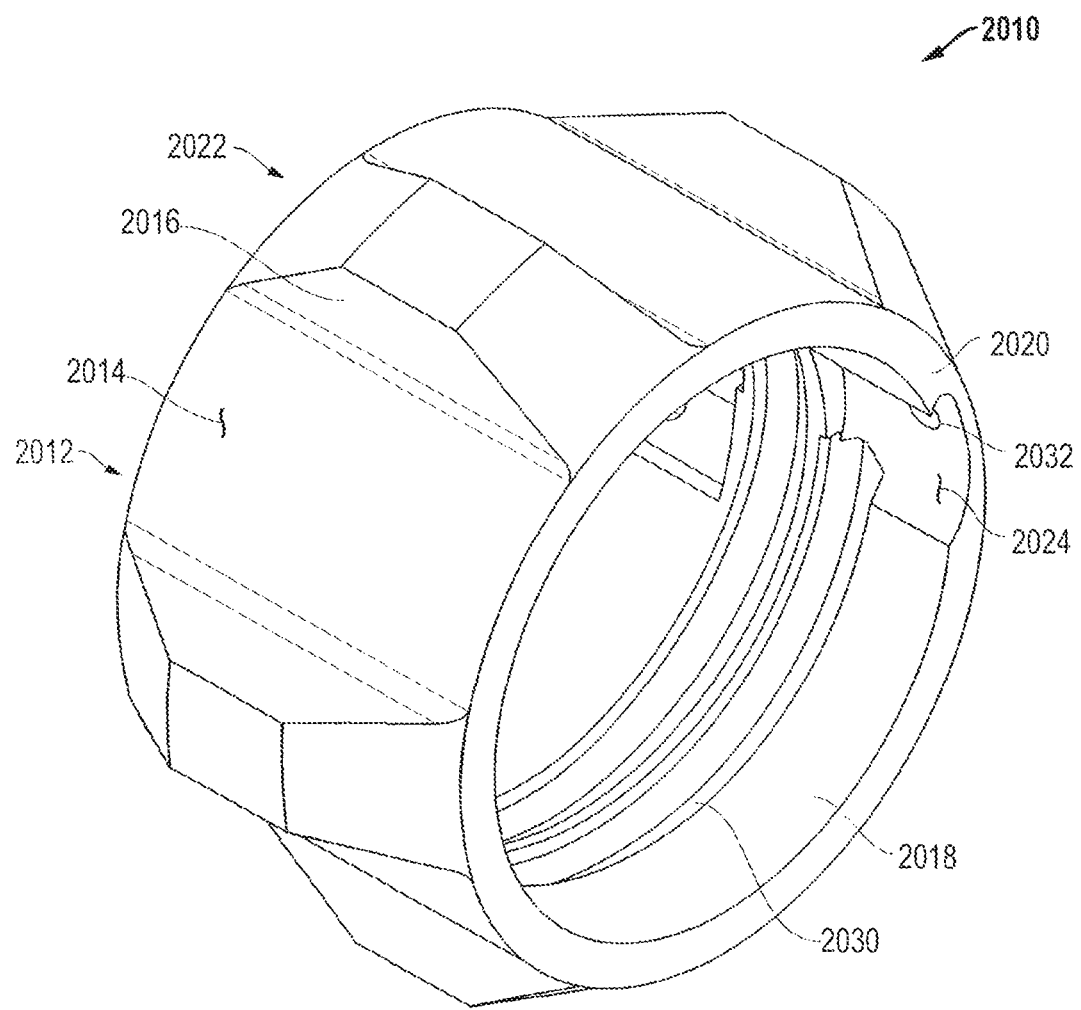
FIG. 9 is an isometric view of an embodiment of a centralizer body illustrated in accordance with principles of the present invention described herein.

FIG. 9 is an isometric view of a first embodiment of a centralizer 2010 illustrated in accordance with principles of the present invention described herein. Referring to FIG. 9, centralizer 2010 has a cylindrical body 2012, comprising an exterior surface 2014 and stabilizing fins 2016 extending outwards from exterior surface 2014. Body 2012 has a hollow interior with an interior surface 2018, a first edge 2020, and a second edge 2022 formed between exterior surface 2014 and interior surface 2018.

A first ramp 2024 is formed on interior surface 2018, proximate to first edge 2020, and a second ramp 2026 (see FIG. 11) is formed on interior surface 2018, proximate to second edge 2022. A generally helical interior channel 2030 is provided on interior surface 2018, extending between first ramp 2024 and second ramp 2026. A first aperture 2032 extends between exterior surface 2014 and first ramp 2024. A second aperture 2034 (see FIG. 11, aperture 2034 shown receiving retaining pin 2052) extends between exterior surface 2014 and second ramp 2026.

Figure 10:
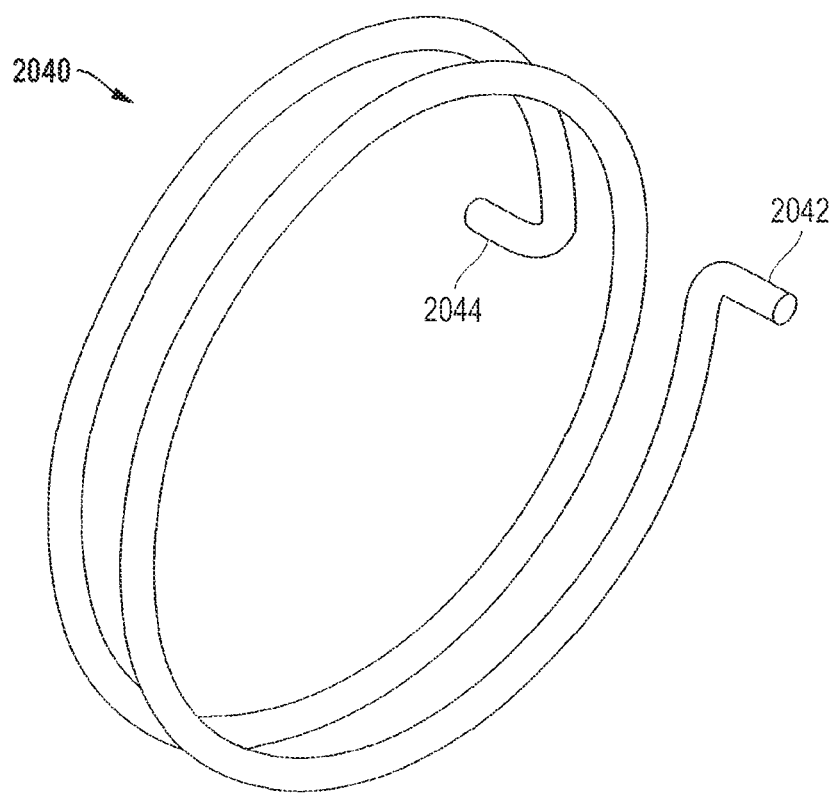
FIG. 10 is an isometric view of a spring member for use with the centralizer body of FIG. 9.

FIG. 10 is an isometric view of a spring member 2040 for use with centralizer 2010. Expandable spring member 2040 is provided with a first tab 2042 at one end and a second tab 2044 at its opposite end.

Figure 11:
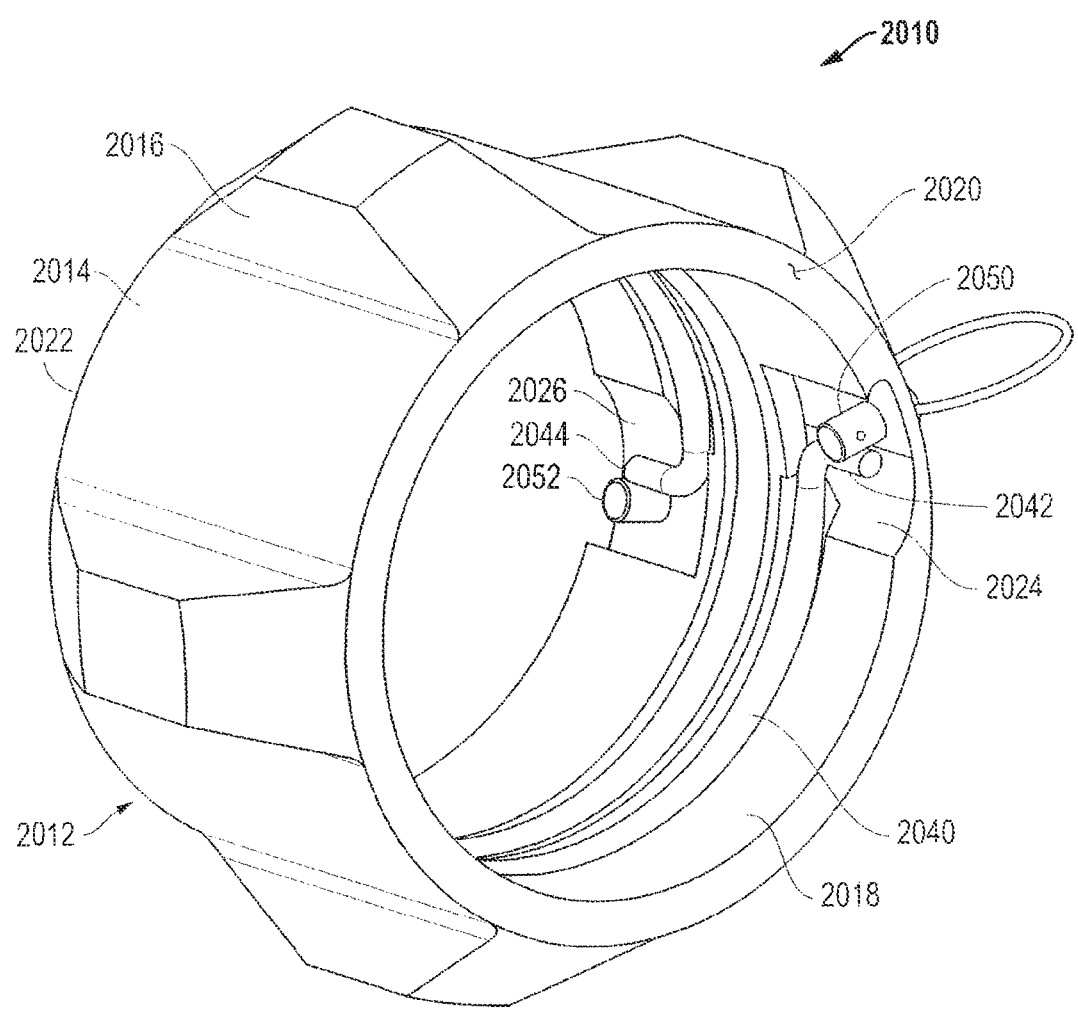
FIG. 11 is an isometric view of the centralizer illustrated with the spring member of FIG. 10 in place.

FIG. 11 is an isometric view of centralizer 2010, illustrated with spring member 2040 in place. As seen in this view, spring 2040 is located in channel 2030. A first retaining pin 2050 is removably located in first aperture 2032 such that retaining pin 2050 is in engagement with first tab 2042. A second retaining pin 2052 is removably located in second aperture 2034 for engagement with second tab 2044 such that retaining pin 2052 is in engagement with second tab 2044.

Figure 12:
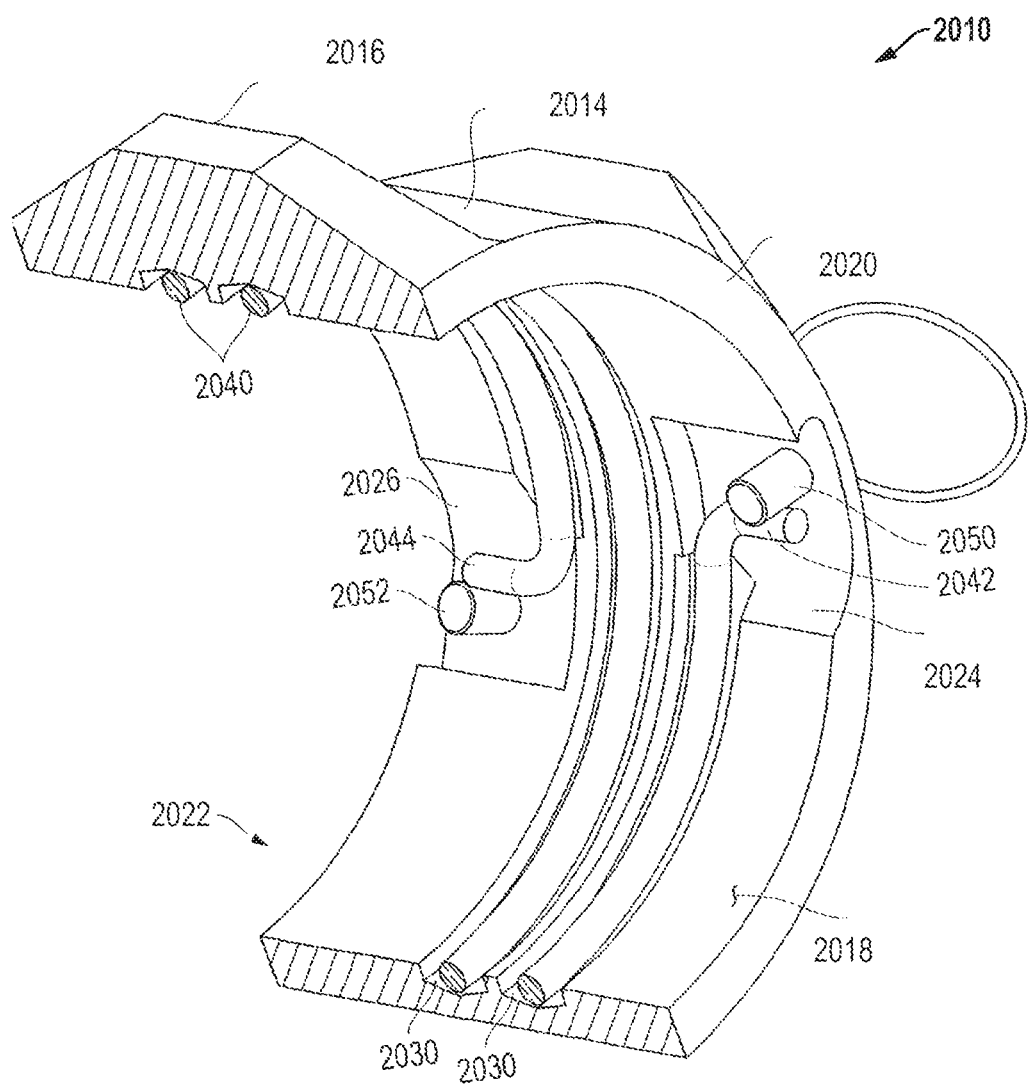
FIG. 12 is an isometric cross-sectional view of the centralizer illustrated with the spring member of FIG. 10 in place.

FIG. 12 is an isometric cross-sectional view of centralizer 2010. In this view, the intersection of channel 2030 with first ramp 2024 and second ramp 2026 is readily visible. It is also seen that spring 2040 is compressed between retaining pins 2050 and 2052.

Figure 13:
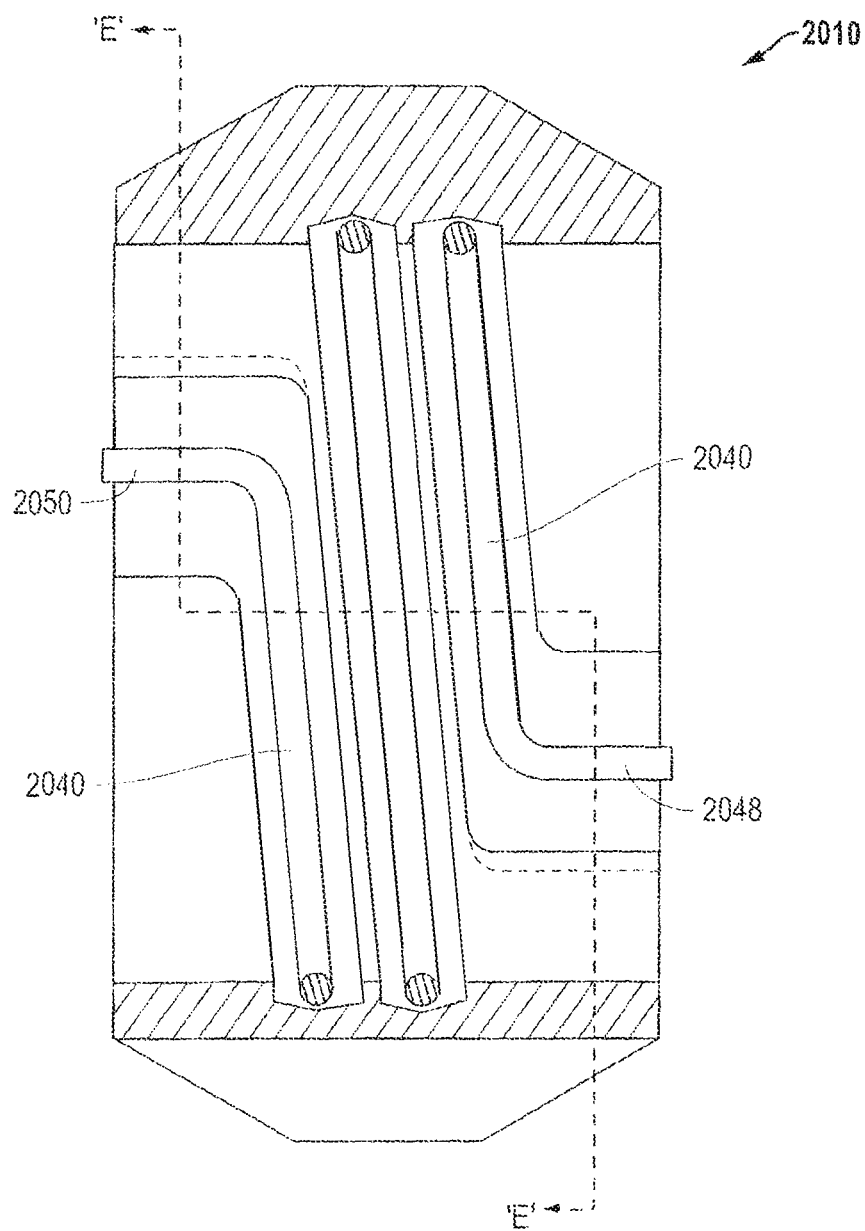
FIG. 13 is a cross-sectional side view of the centralizer 110 that defines a section E-E through which both end positions of the spring may be seen.

FIG. 13 is a cross-sectional side view of centralizer 2010 that defines a section E-E through which both end positions of the spring may be seen.

Figure 14:
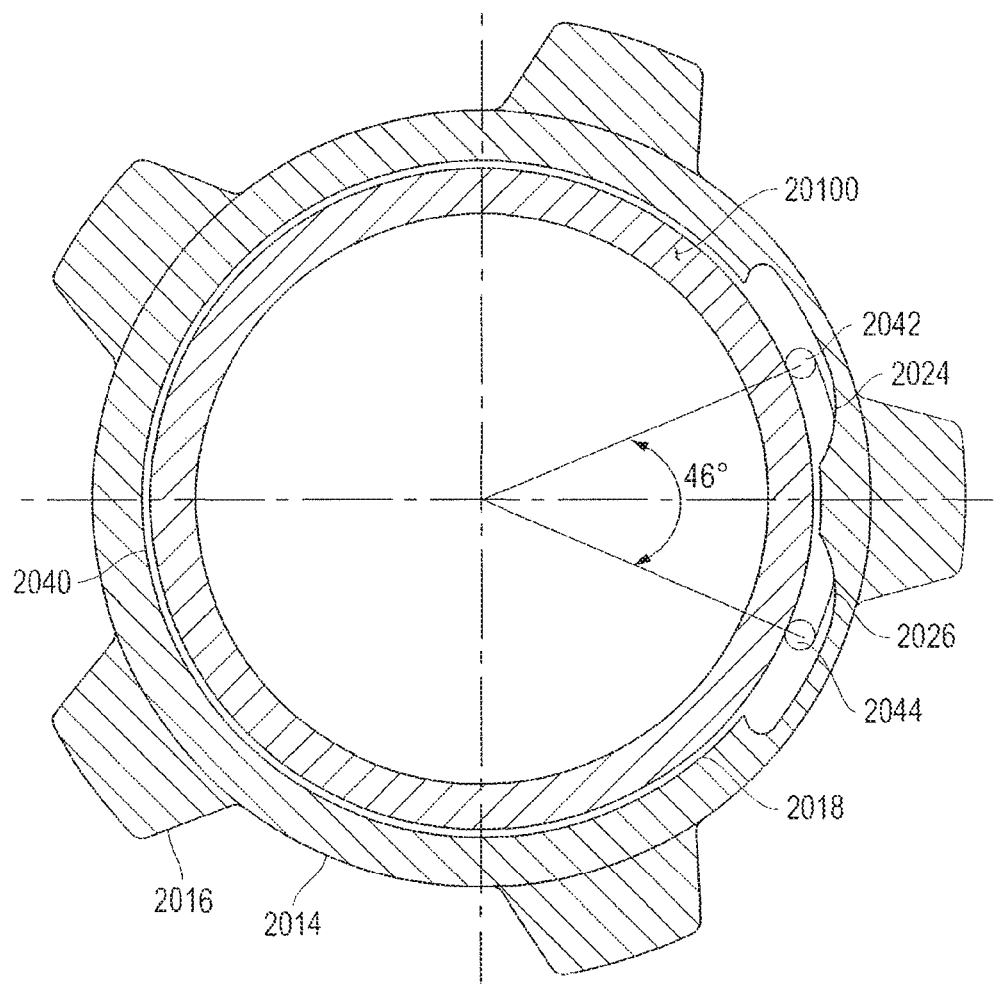
FIG. 14 is an axial cross-section of the centralizer, illustrated as mounted on a tubular, and illustrated inside a well bore, illustrated at a section line that permits viewing of both ends of the spring member, with the spring in the installed, uncompressed state.

FIG. 14 is an axial cross-section of centralizer 2010, illustrated as mounted on tubular 20100, illustrated at a section line that permits viewing both tabs 2042 and 2044 of spring member 2040 in relationship to slopes 2024 and 2026, respectively. In this embodiment, an exemplary angle of 46 degrees is provided between first tab 2042 and second tab 2044. As seen in FIG. 14, rotation in either direction will have the result of further securing centralizer 2010 against tubular 20100.

Figure 15:
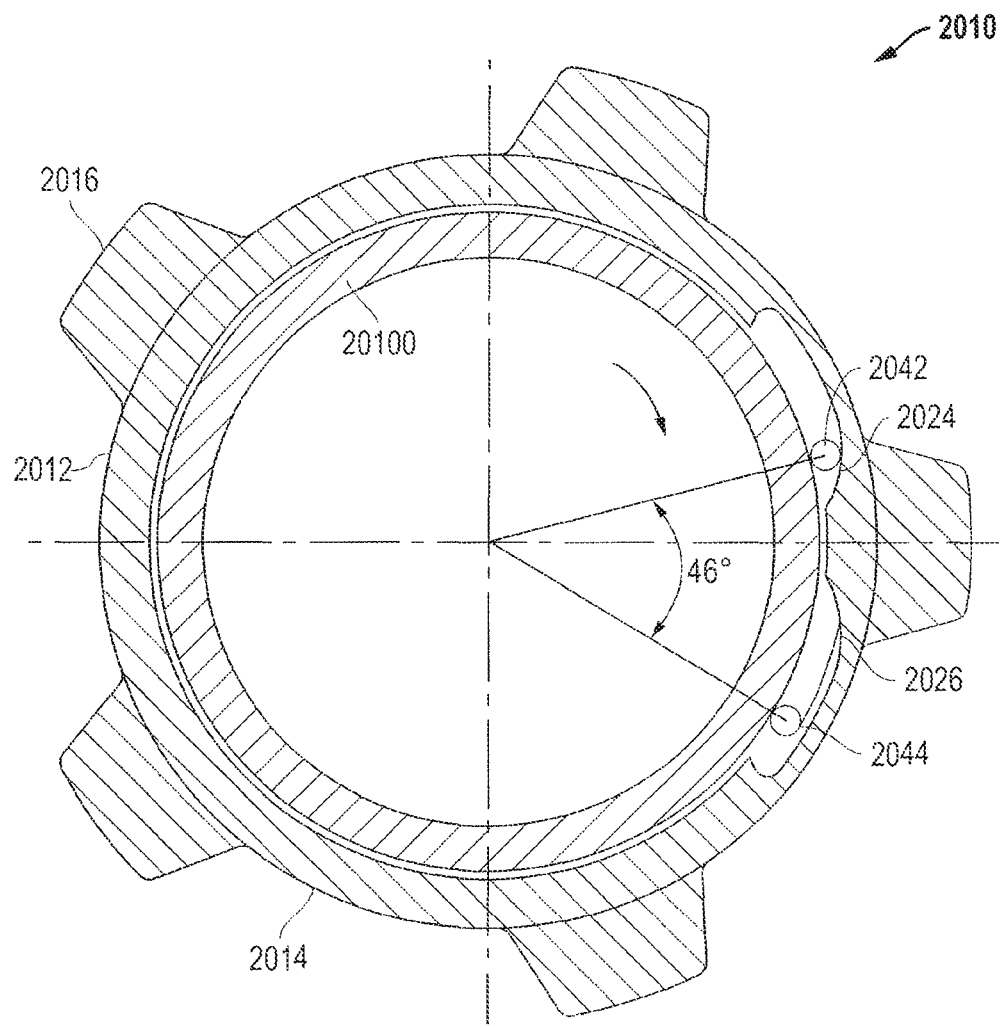
FIG. 15 is an axial cross-section of the centralizer, illustrated as mounted on a tubular, illustrated at a section line that permits viewing of both ends of the spring member, shown with the centralizer rotated counterclockwise and loading the spring against the internal wedge surface.

FIG. 15 is another axial cross-section of centralizer 2010, illustrated as mounted on tubular 20100, illustrated at section line E-E, shown with tubular 20100 rotated clockwise (centralizer 2010 rotated relatively counterclockwise) and loading spring tab 2042 against ramp 2024 to limit additional relative rotation between tubular 20100 and centralizer 2010.

Figure 16:
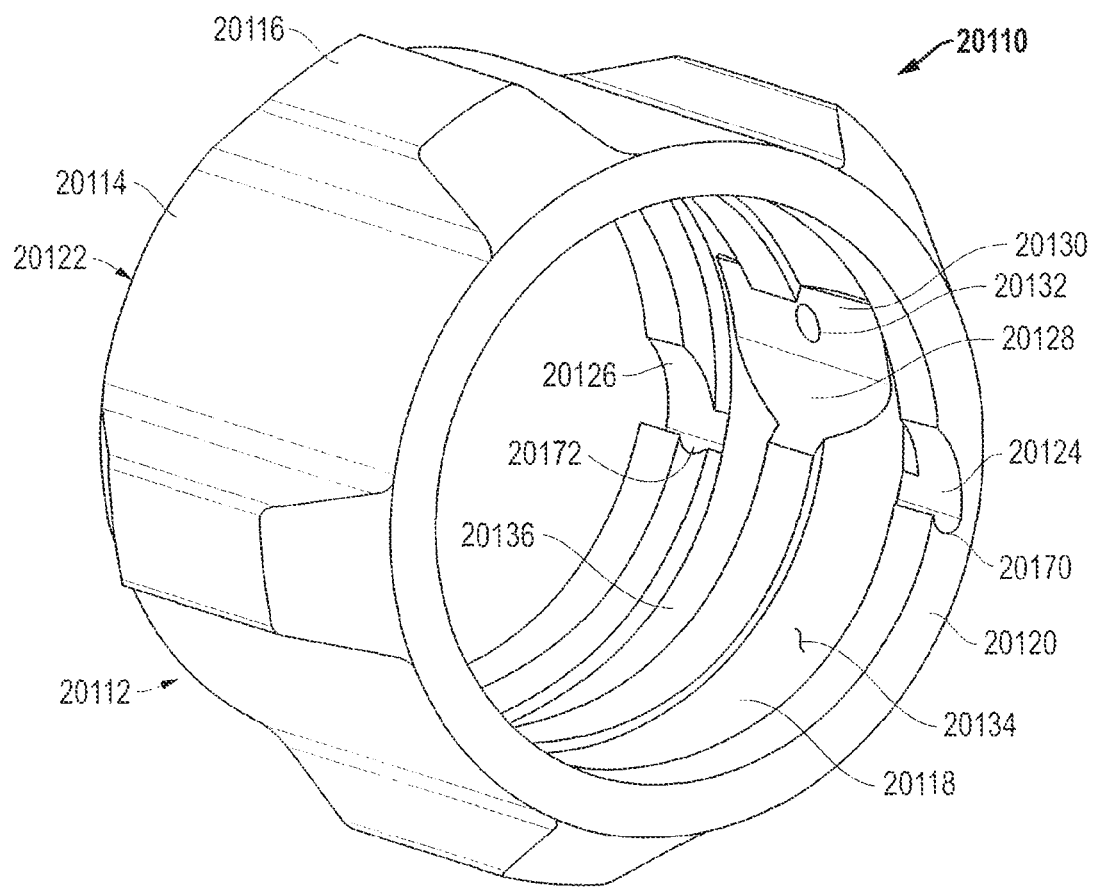
FIG. 16 is an isometric view of a second embodiment of a centralizer body illustrated in accordance with principles of the present invention described herein.

FIG. 16 is an isometric view of a second embodiment of a centralizer body 20110 illustrated in accordance with principles of the present invention described herein. Referring to FIG. 16, centralizer 20110 has a cylindrical body 20112, comprising an exterior surface 20114 and stabilizing fins 20116 extending outwards from exterior surface 20114. Body 20112 has a hollow interior with an interior surface 20118, a first edge 20120, and a second edge 20122 formed between exterior surface 20114 and interior surface 20118.

A first ramp 20124 is formed on interior surface 20118, proximate to first edge 20120, and a second ramp 20126 is formed on interior surface 20118, proximate to second edge 20122. A first ramp 20124 is formed on interior surface 20118, proximate to first edge 20120. A second ramp 20126 is formed on interior surface 20118, proximate to second edge 20126.

At the position where first ramp 20124 engages side 20120, a first slot 20170 is formed. A second slot 20172 is formed where second ramp 20126 engages side 20122.

A third ramp 20128 is centrally formed on interior surface 20118. A first interior circumferential wedge 20134 is formed on interior surface 20118 and extends between first ramp 20124 and third ramp 20128. A second interior circumferential wedge 20136 is formed on interior surface 20118 and extends between second ramp 20126 and third ramp 20128. An aperture extends between exterior surface 20112 and third ramp 20128.

Figure 17:
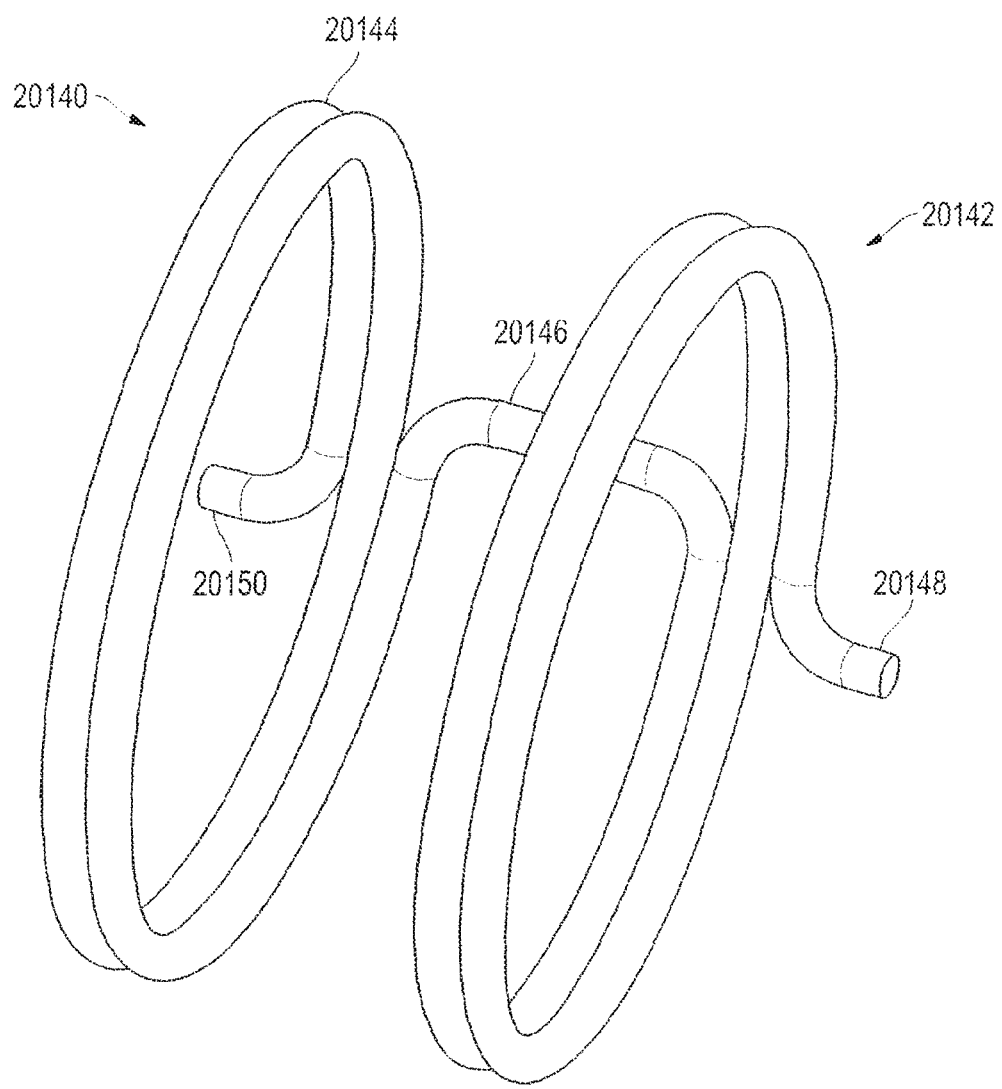
FIG. 17 is an isometric view of a spring member for use with the centralizer of FIG. 16.

FIG. 17 is an isometric view of a spring member 20140 for use with centralizer 20110 of FIG. 16. Expandable spring member 20140 has a first helical section 20142 and a second helical section 20144 connected by a bridge portion 20146. A first tab 20148 extends outward from first helical section 20142. A second tab 20150 extends outward from second helical section 20144.

Figure 18:
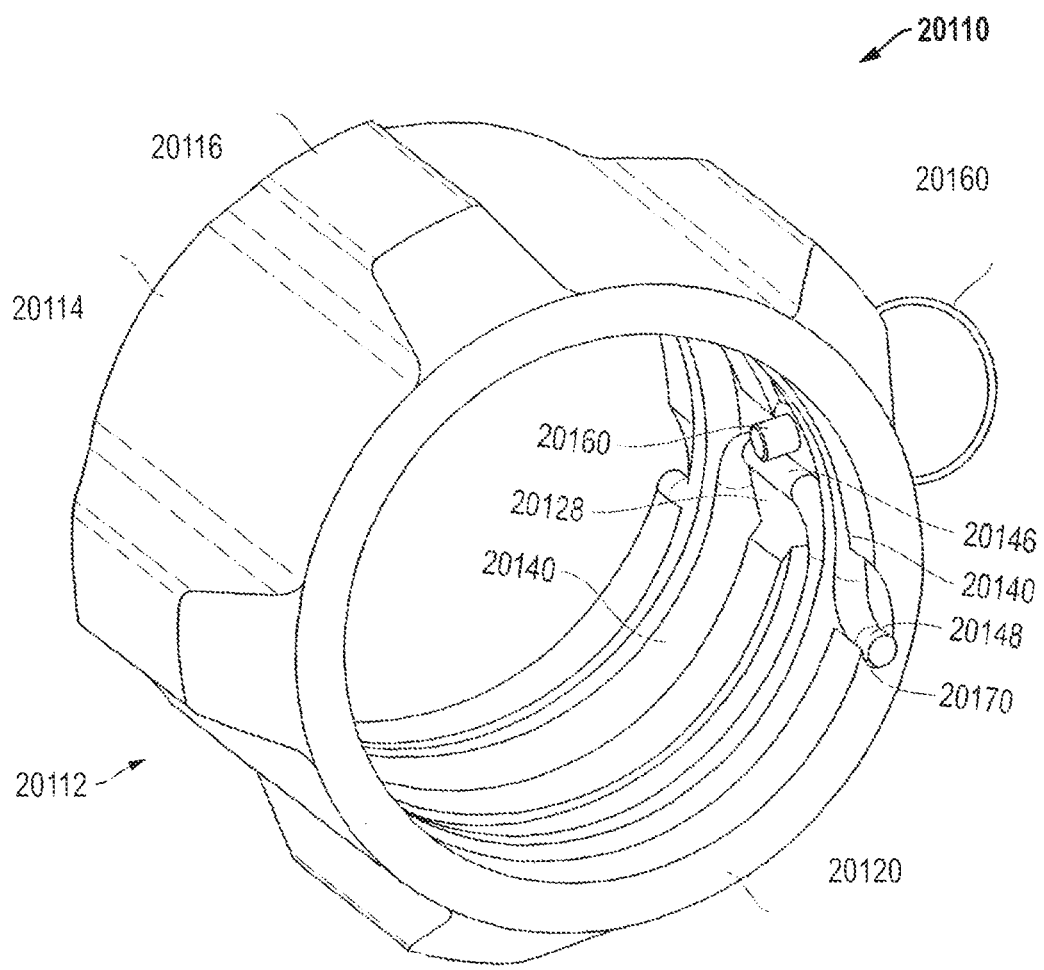
FIG. 18 is an isometric view of the centralizer illustrated with the spring member of FIG. 17 in place.
Figure 19:
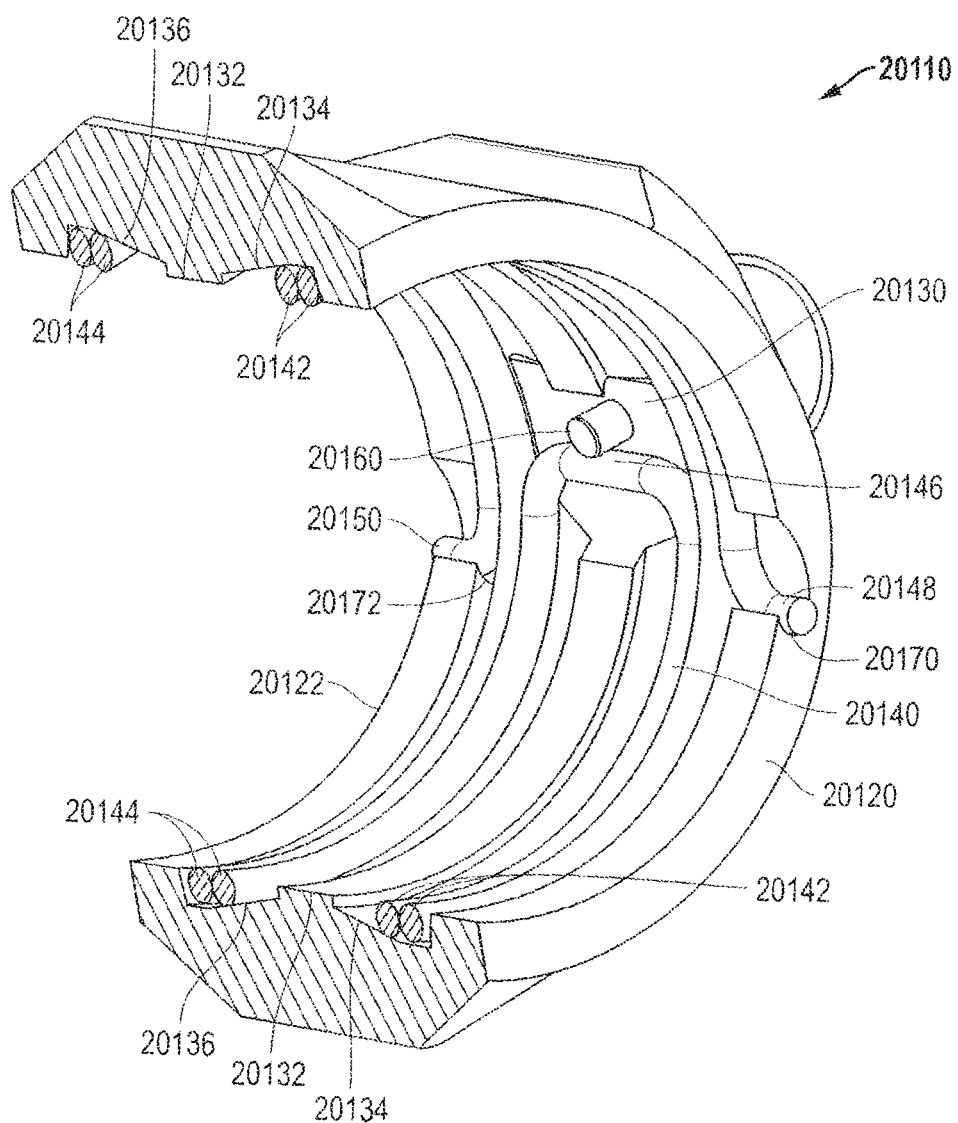
FIG. 19 is an isometric cross-sectional view of the centralizer illustrated with the spring of FIG. 17 in place.

FIG. 18 is an isometric view of centralizer 20110 illustrated with spring member 20140 of FIG. 17 in place. FIG. 19 is an isometric cross-sectional view of centralizer 20110 as illustrated in FIG. 18.

Referring to FIGS. 18 and 19, it is seen that first helical section 20142 is located on first wedge 20134. Second helical section 20144 is located on second wedge 20136. A retaining pin 20160 is removably located in aperture 20136 for engagement with bridge 20146 of spring 20140. As will be seen in FIGS. 17 and 18, slots 20170 and 20172 provide a rotational limit for spring 20140 when pre-tensioning spring member 20140 against retaining pin 20160.

Figure 20:
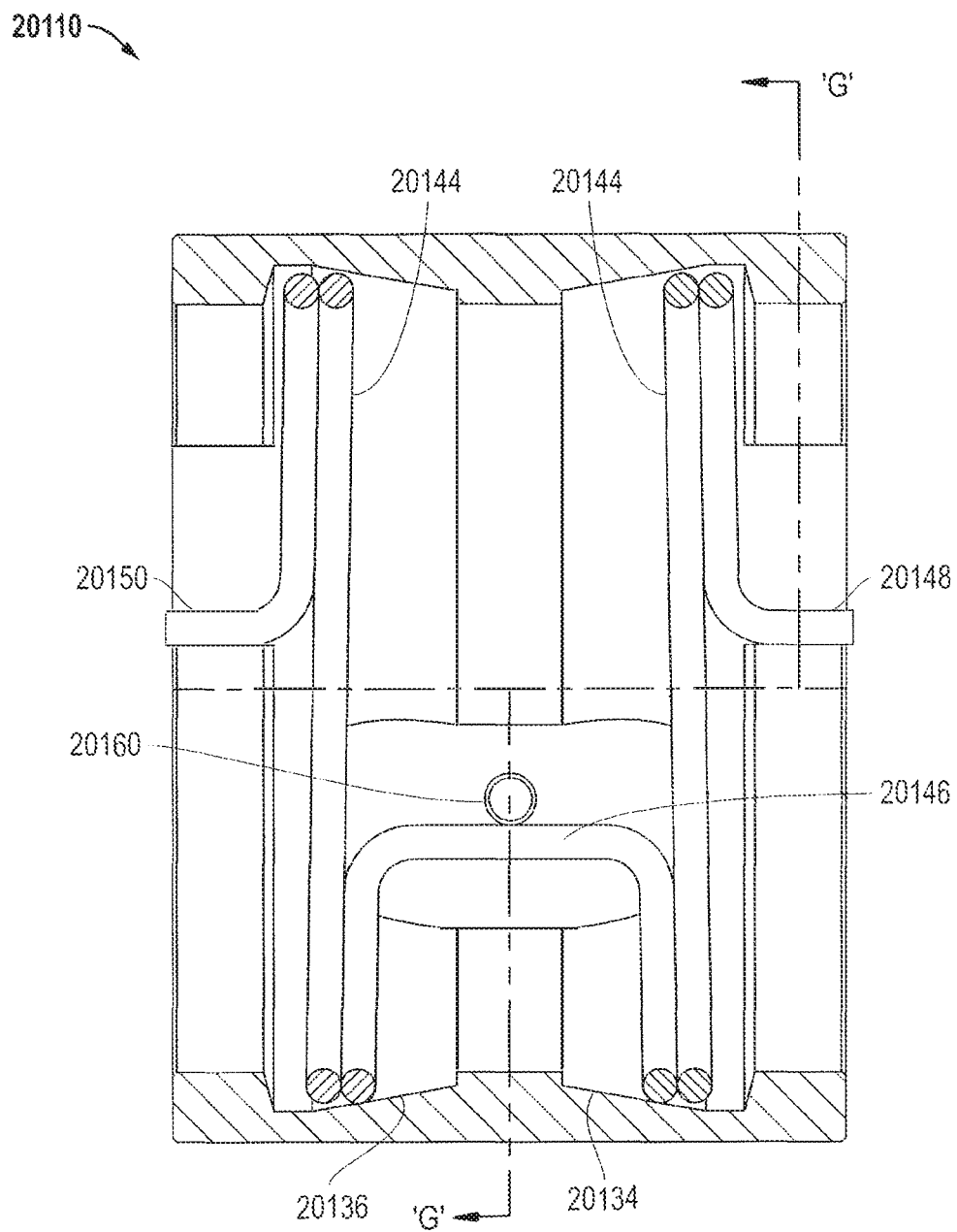
FIG. 20 is a cross-sectional side view of the centralizer of FIGS. 16-19.

FIG. 20 is a cross-sectional side view of centralizer 20110. In summary of the operation, when retainer pin 20160 is removed, spring 20140 is preloaded against the surface of tubular 20100, holding it in place. This prevents axial movement of centralizer 20110 relative to tubular 20100. Clockwise rotation of tubular 20100 relative to centralizer 20110 engages tab 20148 between first ramp 20124 and tubular 20100 to limit further rotation. Counterclockwise rotation of tubular 20100 relative to centralizer 20110 engages tab 20150 between second ramp 20126 and tubular 20100 to limit further rotation. The surface of spring 20140 may be knurled or profiled to increase resistance to sliding relative to tubular 20100.

Figure 21:
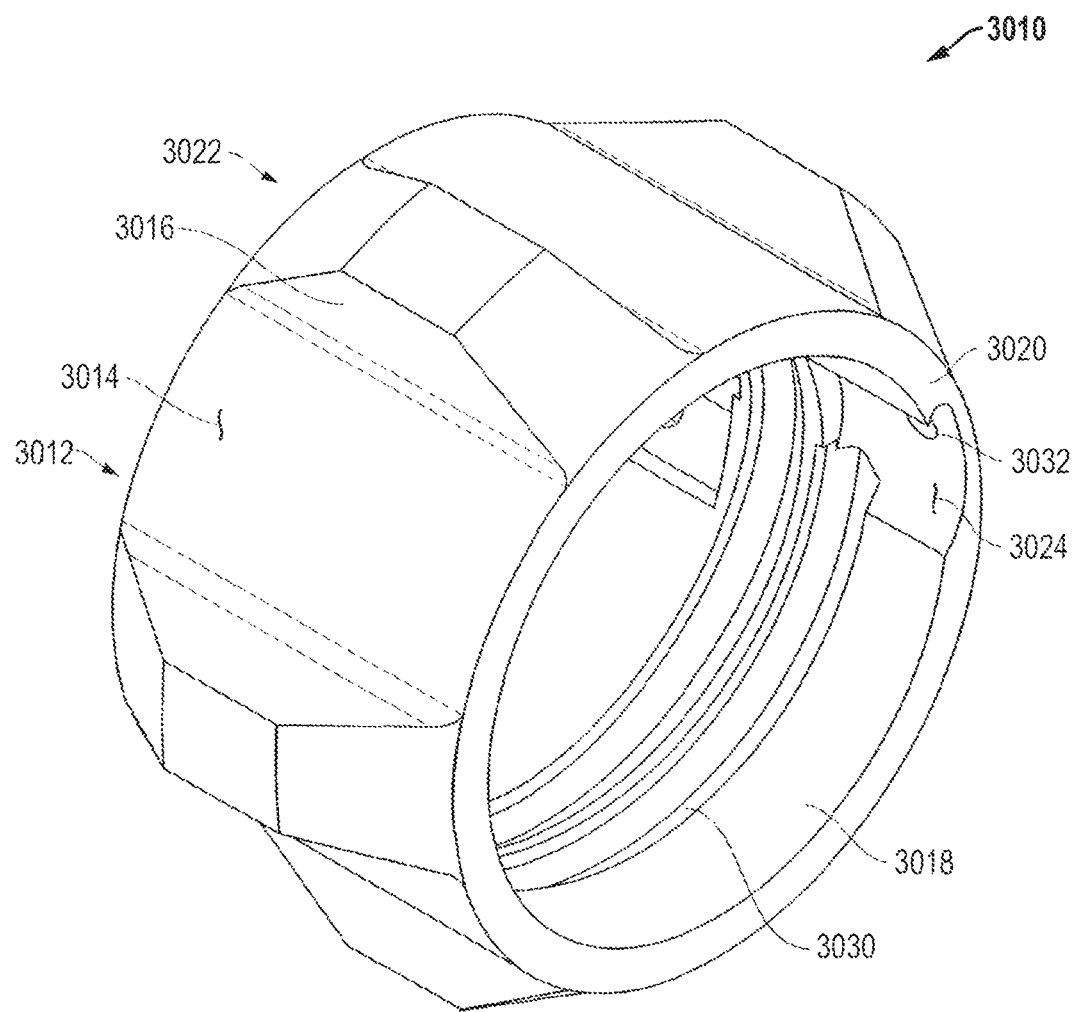
FIG. 21 is an isometric view of an embodiment of a centralizer body illustrated in accordance with principles of the present invention described herein.

FIG. 21 is an isometric view of a first embodiment of a centralizer 3010 illustrated in accordance with principles of the present invention described herein. Referring to FIG. 21, centralizer 3010 has a cylindrical body 3012, comprising an exterior surface 3014 and stabilizing fins 3016 extending outwards from exterior surface 3014. Body 3012 has a hollow interior with an interior surface 3018, a first edge 3020, and a second edge 3022 formed between exterior surface 3014 and interior surface 3018.

A first ramp 3024 is formed on interior surface 3018, proximate to first edge 3020, and a second ramp 3026 (see FIG. 23) is formed on interior surface 3018, proximate to second edge 3022. A generally helical interior channel 3030 is provided on interior surface 3018, extending between first ramp 3024 and second ramp 3026. A first aperture 3032 extends between exterior surface 3014 and first ramp 3024. A second aperture 3034 (see FIG. 23, aperture 3034 shown receiving retaining pin 3052) extends between exterior surface 3014 and second ramp 3026.

Figure 22:
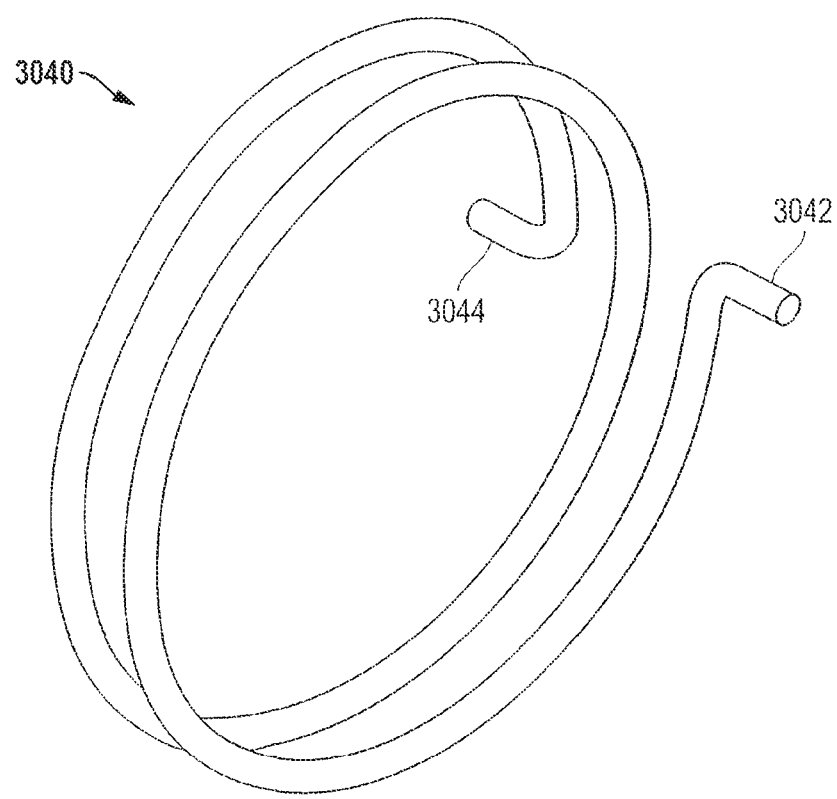
FIG. 22 is an isometric view of a spring member for use with the centralizer body of FIG. 21.

FIG. 22 is an isometric view of a spring member 3040 for use with centralizer 3010. Expandable spring member 3040 is provided with a first tab 3042 at one end and a second tab 3044 at its opposite end.

Figure 23:
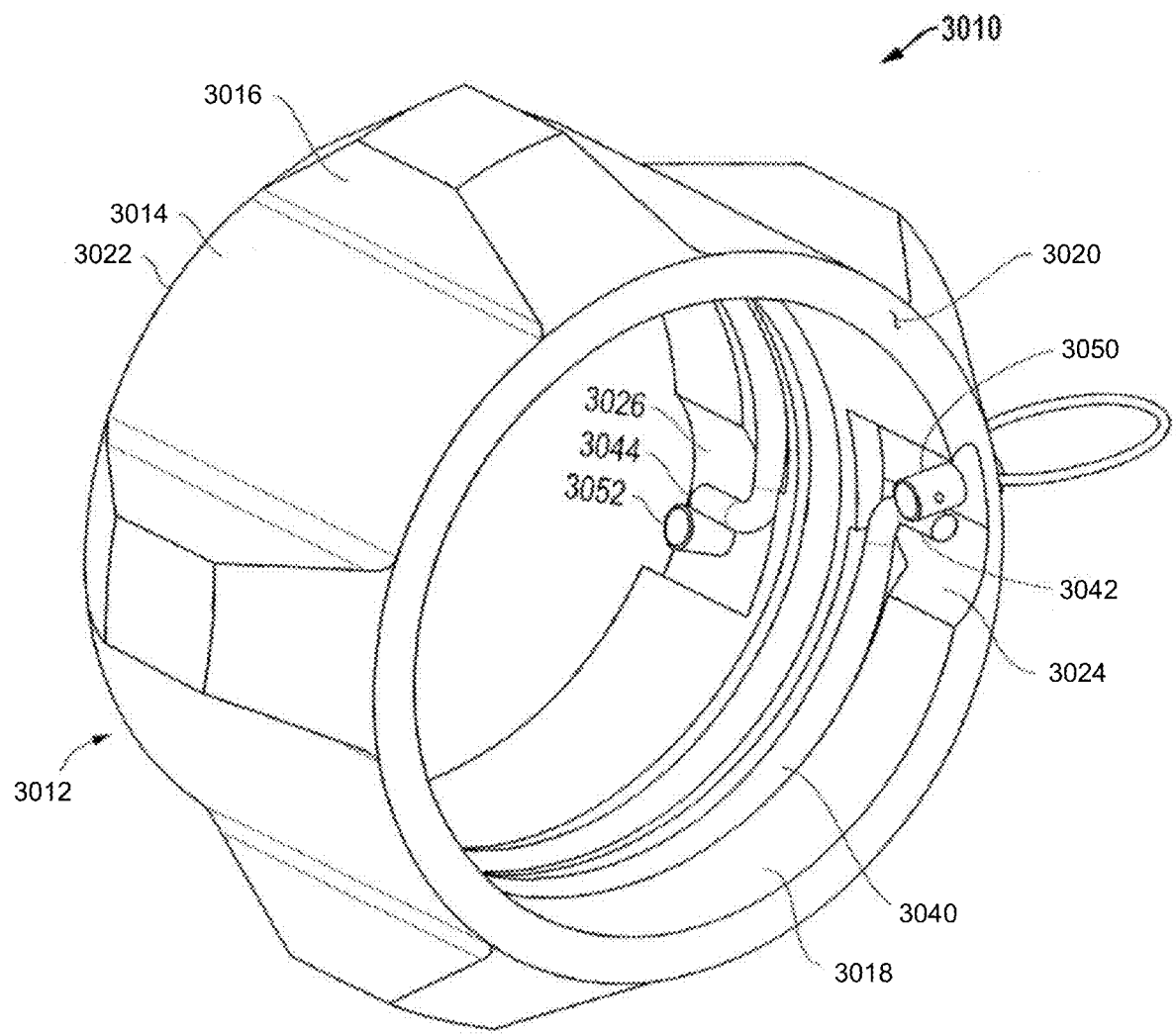
FIG. 23 is an isometric view of the centralizer illustrated with the spring member of FIG. 22 in place.

FIG. 23 is an isometric view of centralizer 3010, illustrated with spring member 3040 in place. As seen in this view, spring 3040 is located in channel 3030. A first retaining pin 3050 is removably located in first aperture 3032 such that retaining pin 3050 is in engagement with first tab 3042. A second retaining pin 3052 is removably located in second aperture 3034 for engagement with second tab 3044 such that retaining pin 3052 is in engagement with second tab 3044.

Figure 24:
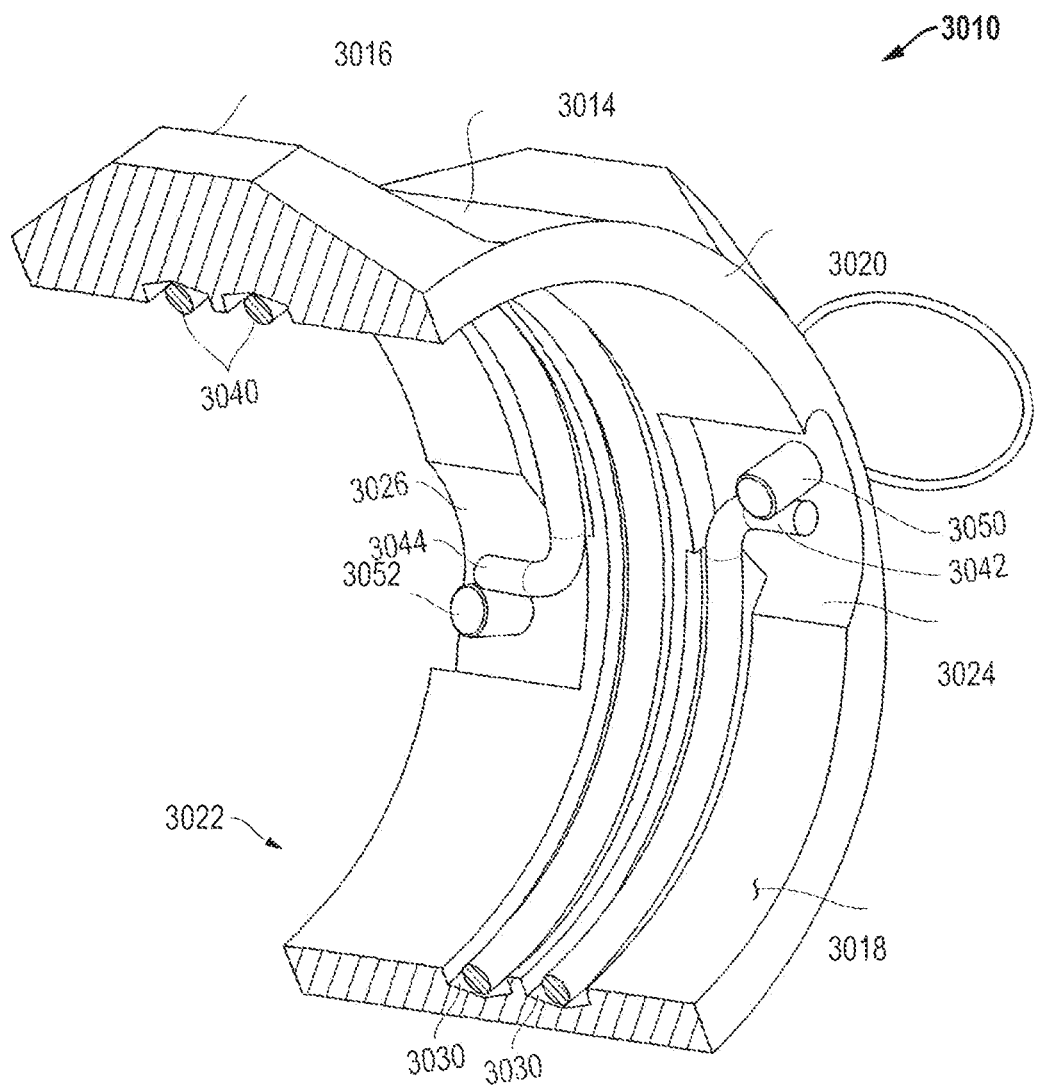
FIG. 24 is an isometric cross-sectional view of the centralizer illustrated with the spring member of FIG. 22 in place.

FIG. 24 is an isometric cross-sectional view of centralizer 3010. In this view, the intersection of channel 3030 with first ramp 3024 and second ramp 3026 is readily visible. It is also seen that spring 3040 is compressed between retaining pins 3050 and 3052.

Figure 25:
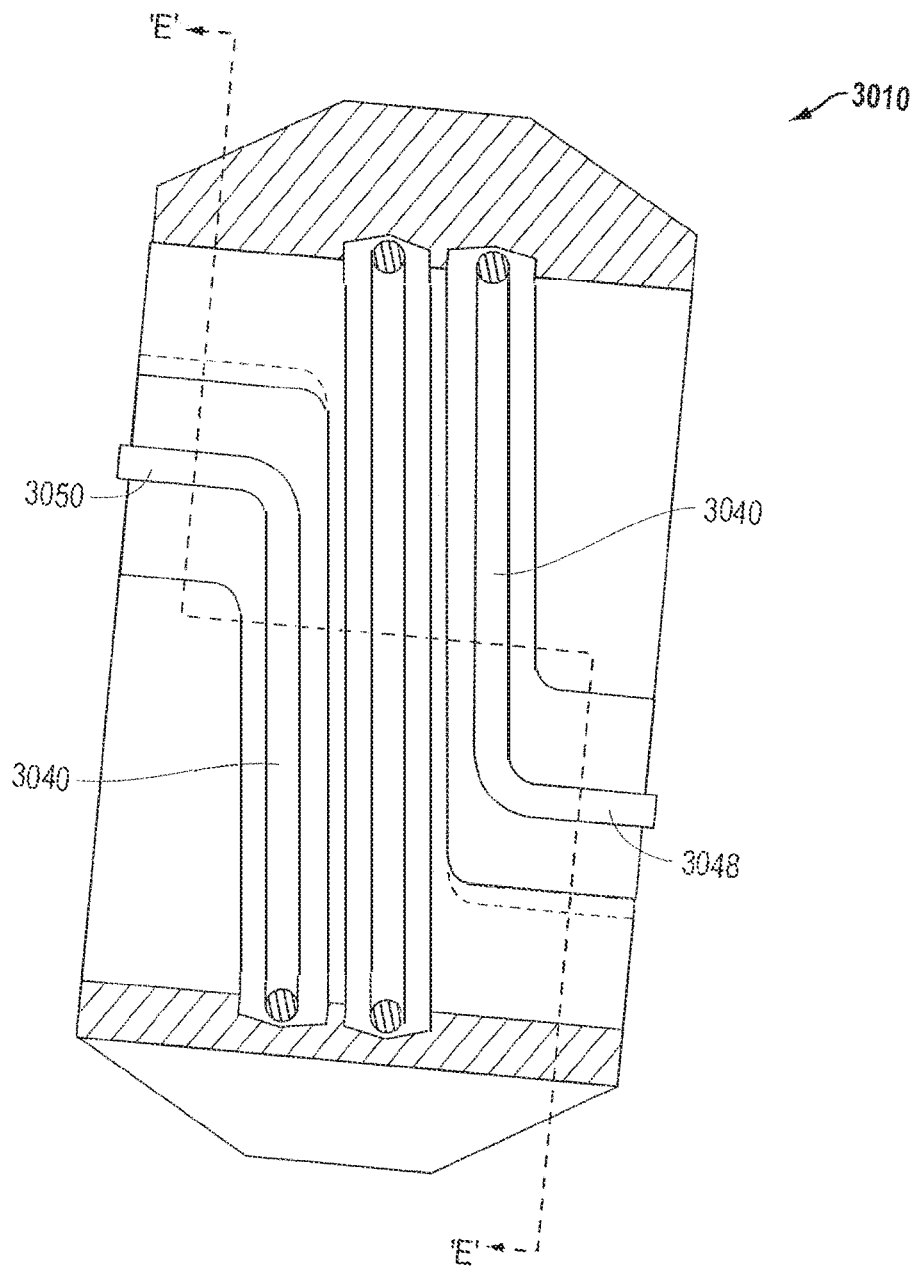
FIG. 25 is a cross-sectional side view of the centralizer that defines a section E-E through which both end positions of the spring may be seen.

FIG. 25 is a cross-sectional side view of centralizer 3010 that defines a section E-E through which both end positions of the spring may be seen.

Figure 26:
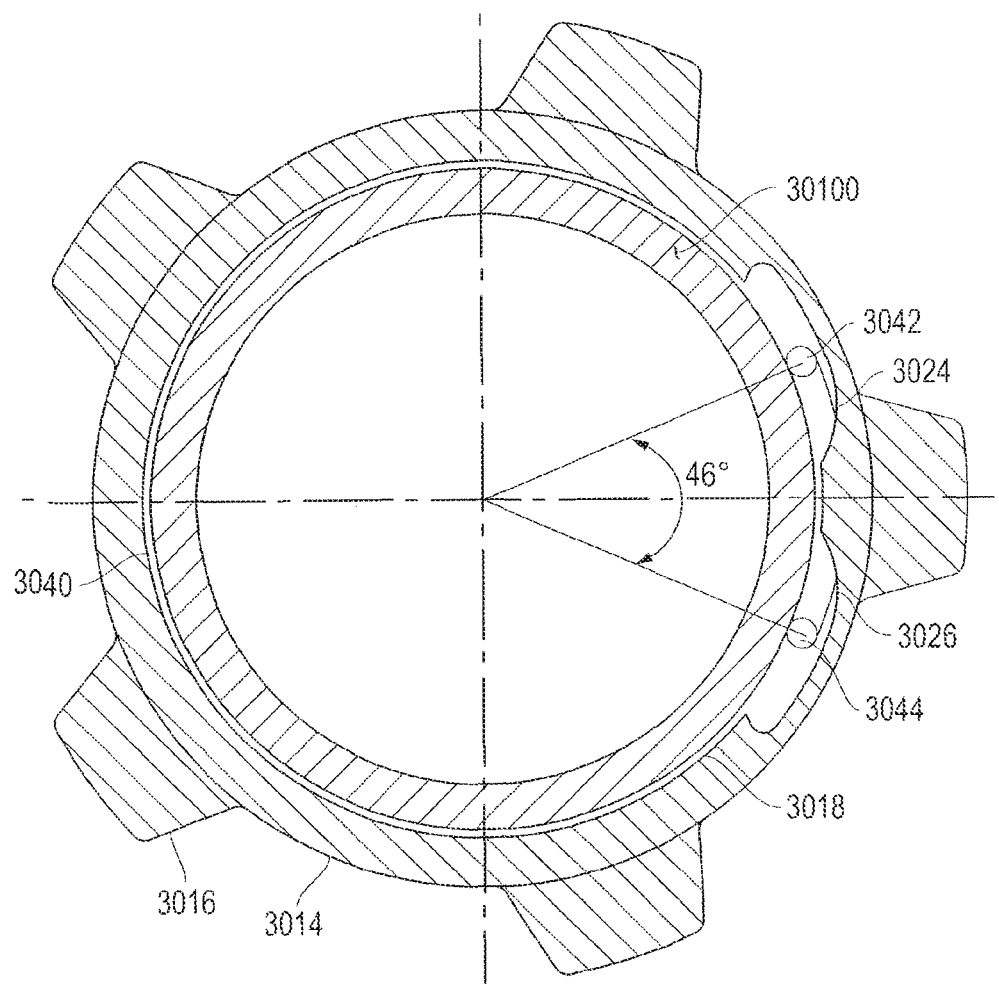
FIG. 26 is an axial cross-section of the centralizer, illustrated as mounted on a tubular, and illustrated inside a well bore, illustrated at a section line that permits viewing of both ends of the spring member, with the spring in the installed, uncompressed state.

FIG. 26 is an axial cross-section of centralizer 3010, illustrated as mounted on tubular 30100, illustrated at a section line that permits viewing both tabs 3042 and 3044 of spring member 3040 in relationship to slopes 3024 and 3026, respectively. In this embodiment an exemplary angle of 46 degrees is provided between first tab 3042 and second tab 3044. As seen in FIG. 26, rotation in either direction will have the result of further securing centralizer 3010 against tubular 30100.

Figure 27:
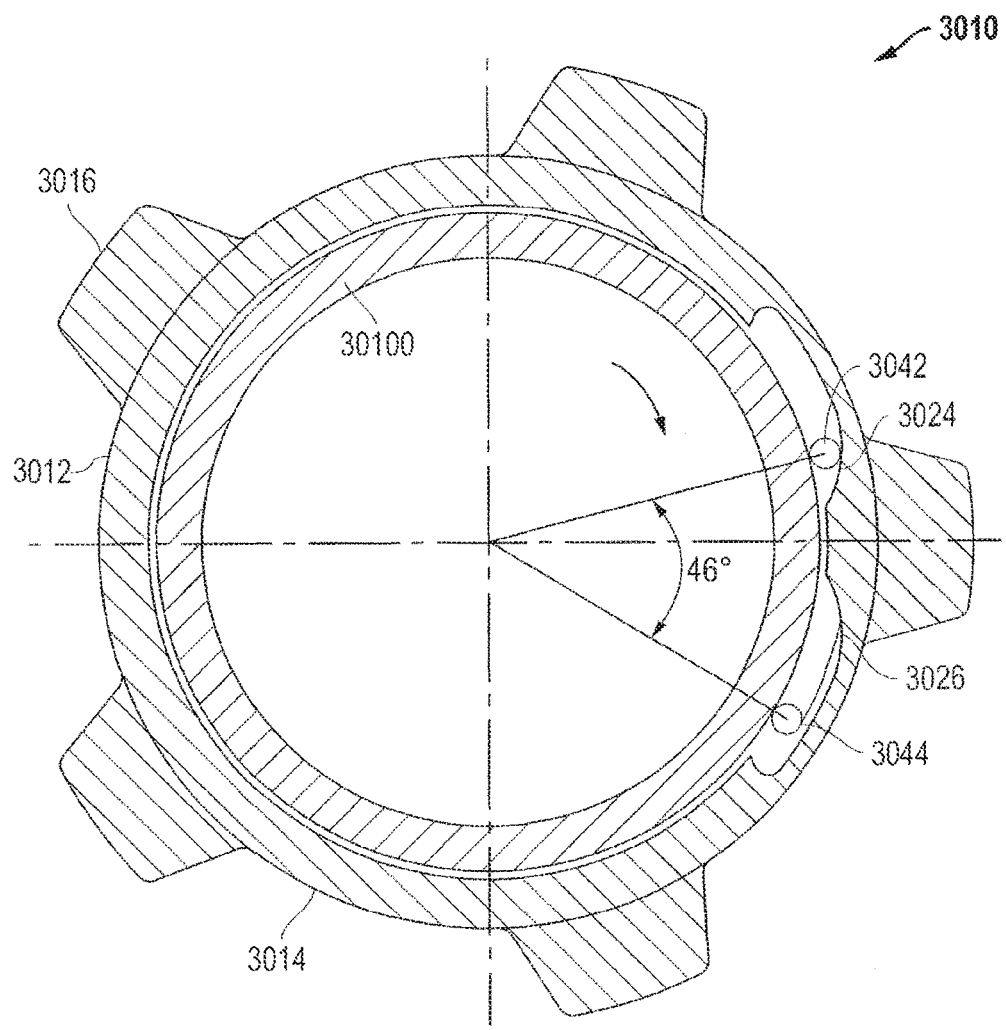
FIG. 27 is an axial cross-section of the centralizer, illustrated as mounted on a tubular, illustrated at a section line that permits viewing of both ends of the spring member, shown with the centralizer rotated counterclockwise and loading the spring against the internal wedge surface.

FIG. 27 is another axial cross-section of centralizer 3010, illustrated as mounted on tubular 30100, illustrated at section line E-E, shown with tubular 30100 rotated clockwise (centralizer 3010 rotated relatively counterclockwise) and loading spring tab 3042 against ramp 3024 to limit additional relative rotation between tubular 30100 and centralizer 3010.

Figure 28:
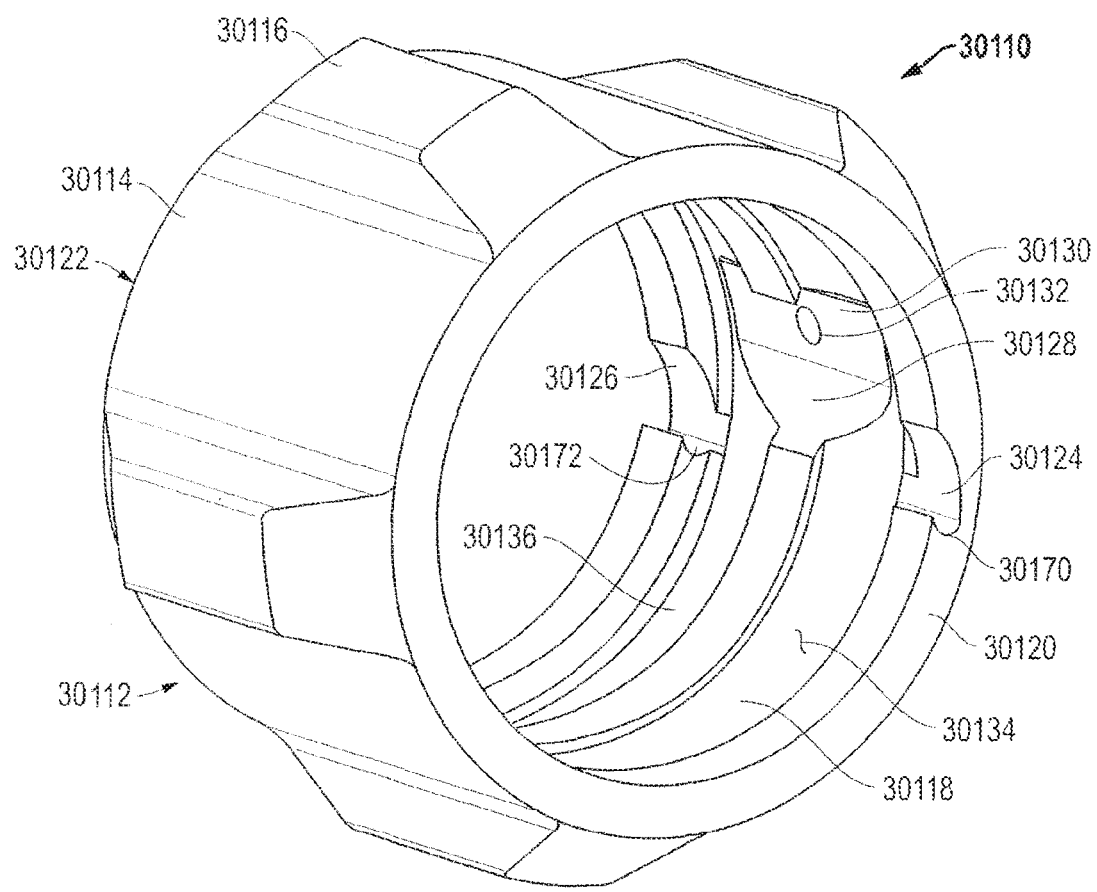
FIG. 28 is an isometric view of a second embodiment of a centralizer body illustrated in accordance with principles of the present invention described herein.

FIG. 28 is an isometric view of a second embodiment of a centralizer body 30110 illustrated in accordance with principles of the present invention described herein. Referring to FIG. 28, centralizer 30110 has a cylindrical body 30112, comprising an exterior surface 30114 and stabilizing fins 30116 extending outwards from exterior surface 30114. Body 30112 has a hollow interior with an interior surface 30118, a first edge 30120, and a second edge 30122 formed between exterior surface 30114 and interior surface 30118.

A first ramp 30124 is formed on interior surface 30118, proximate to first edge 30120, and a second ramp 30126 is formed on interior surface 30118, proximate to second edge 30122. A first ramp 30124 is formed on interior surface 30118, proximate to first edge 30120. A second ramp 30126 is formed on interior surface 30118, proximate to second edge 30126.

At the position where first ramp 30124 engages side 30120, a first slot 30170 is formed. A second slot 30172 is formed where second ramp 30126 engages side 30122.

A third ramp 30128 is centrally formed on interior surface 30118. A first interior circumferential wedge 30134 is formed on interior surface 30118, and extends between first ramp 30124 and third ramp 30128. A second interior circumferential wedge 30136 is formed on interior surface 30118 and extends between second ramp 30126 and third ramp 30128. An aperture extends between exterior surface 30112 and third ramp 30128.

Figure 29:
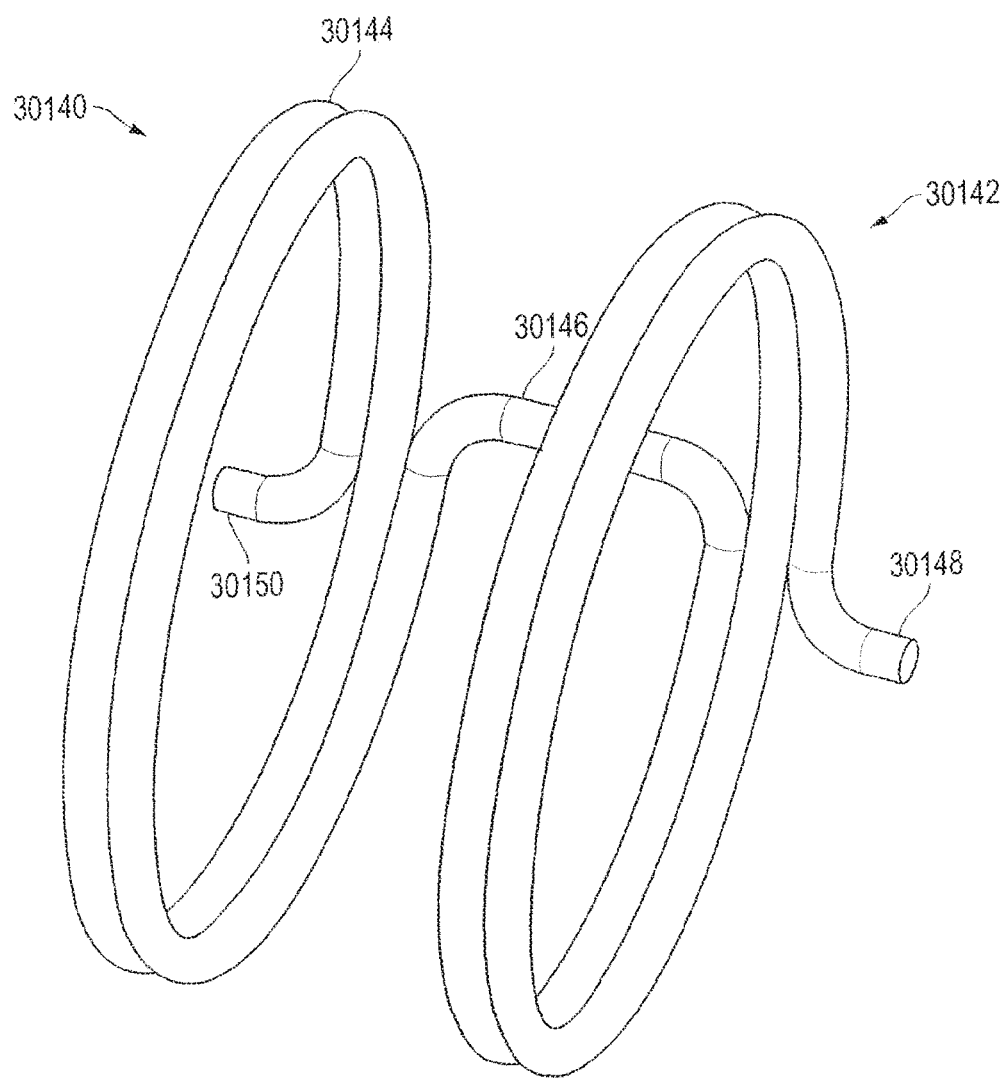
FIG. 29 is an isometric view of a spring member for use with the centralizer of FIG. 28.

FIG. 29 is an isometric view of a spring member 30140 for use with centralizer 30110 of FIG. 28. Expandable spring member 30140 has a first helical section 30142 and a second helical section 30144 connected by a bridge portion 30146. A first tab 30148 extends outward from first helical section 30142. A second tab 30150 extends outward from second helical section 30144.

Figure 30:
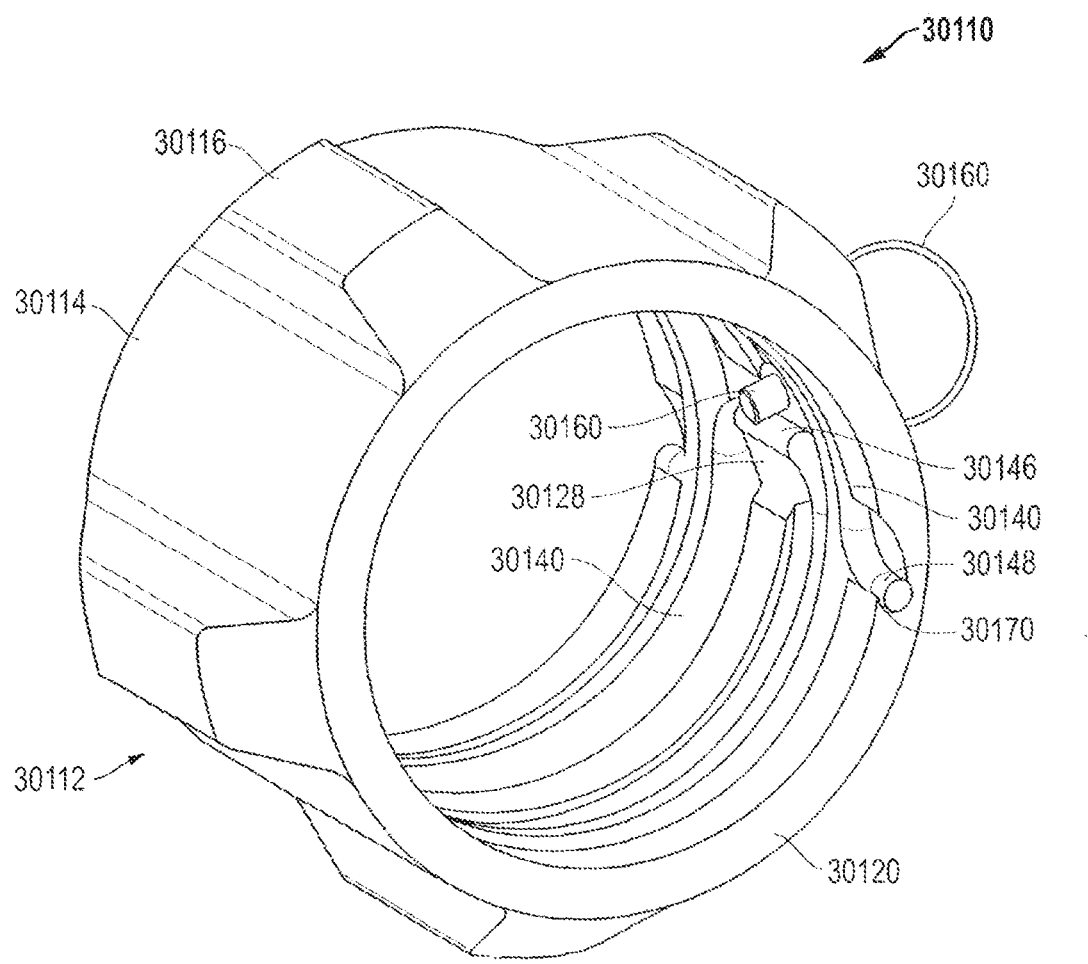
FIG. 30 is an isometric view of the centralizer illustrated with the spring member of FIG. 29 in place.
Figure 31:
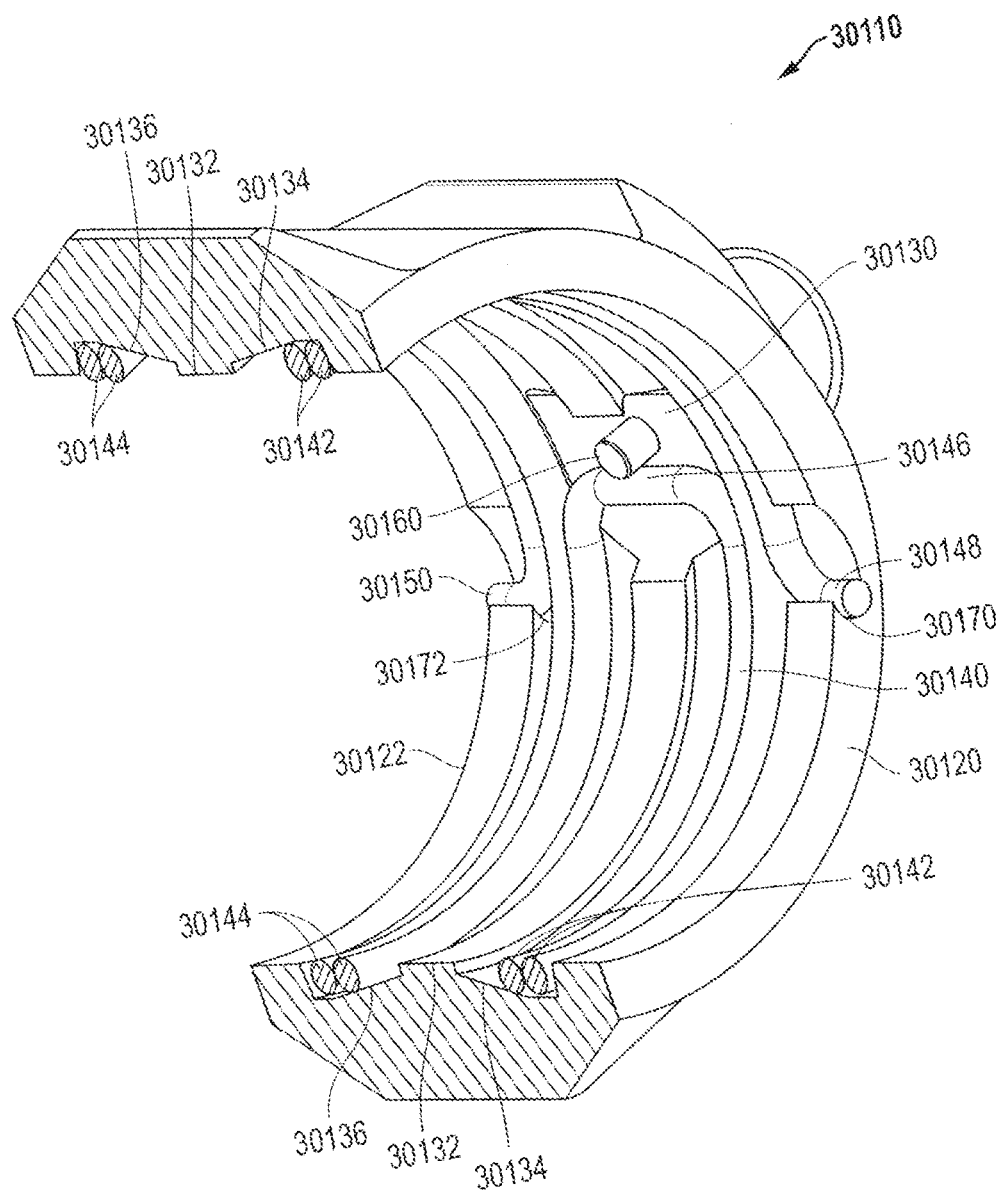
FIG. 31 is an isometric cross-sectional view of the centralizer illustrated with the spring of FIG. 29 in place.

FIG. 30 is an isometric view of centralizer 30110 illustrated with spring member 30140 of FIG. 29 in place. FIG. 31 is an isometric cross-sectional view of centralizer 30110 as illustrated in FIG. 30.

Referring to FIGS. 30 and 31, it is seen that first helical section 30142 is located on first wedge 30134. Second helical section 30144 is located on second wedge 30136. A retaining pin 30160 is removably located in aperture 30136 for engagement with bridge 30146 of spring 30140. As will be seen in FIGS. 29 and 30, slots 30170 and 30172 provide a rotational limit for spring 30140 when pre-tensioning spring member 30140 against retaining pin 30160.

Figure 32:
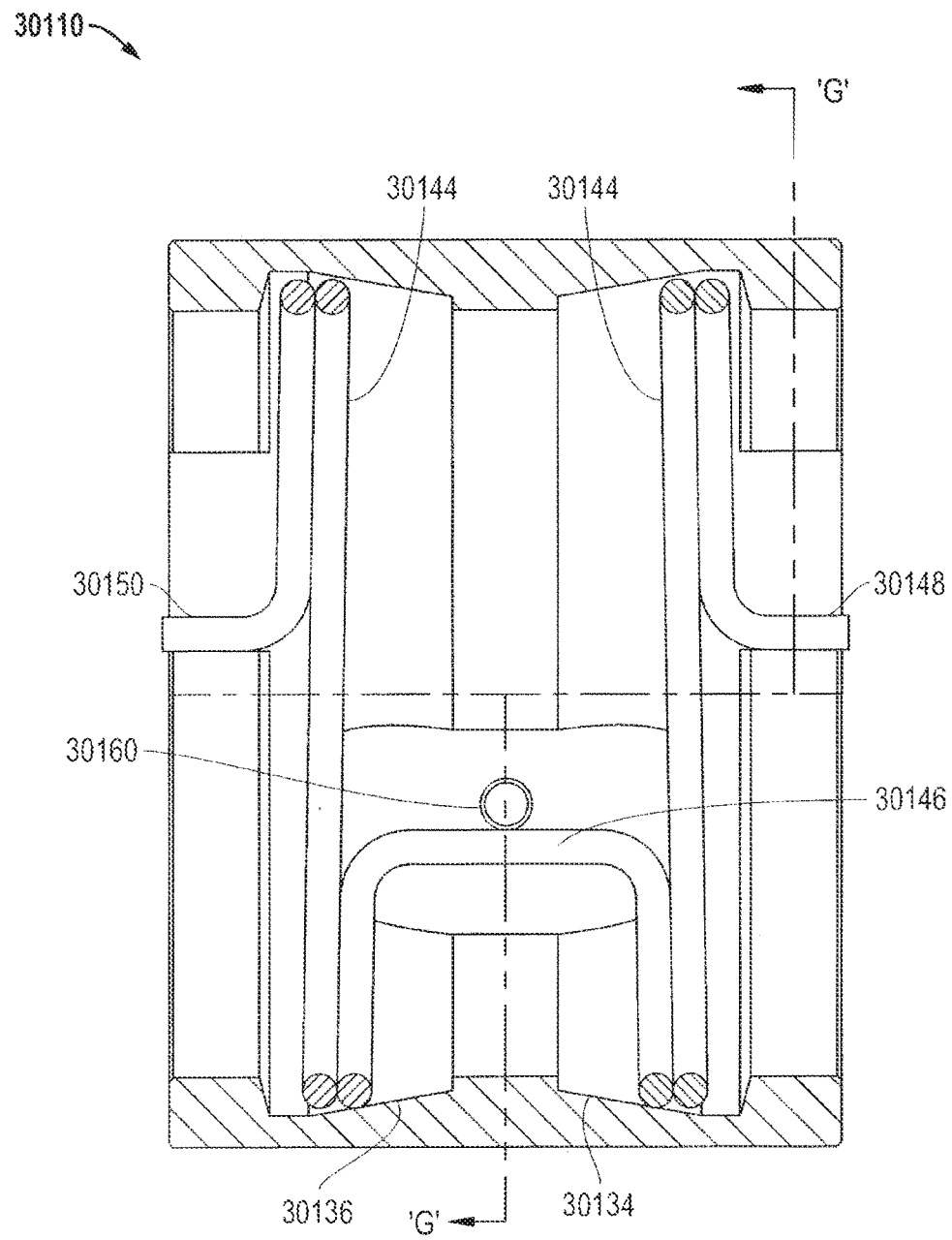
FIG. 32 is a cross-sectional side view of the centralizer of FIGS. 28-31.

FIG. 32 is a cross-sectional side view of centralizer 30110. In summary of the operation, when retainer pin 30160 is removed, spring 30140 is preloaded against the surface of tubular 30100, holding it in place. This prevents axial movement of centralizer 30110 relative to tubular 30100. Clockwise rotation of tubular 30100 relative to centralizer 30110 engages tab 30148 between first ramp 30124 and tubular 30100 to limit further rotation. Counter-clockwise rotation of tubular 30100 relative to centralizer 30110 engages tab 30150 between second ramp 30126 and tubular 30100 to limit further rotation. The surface of spring 30140 may be knurled or profiled to increase resistance to sliding relative to tubular 30100.

Figure 33:
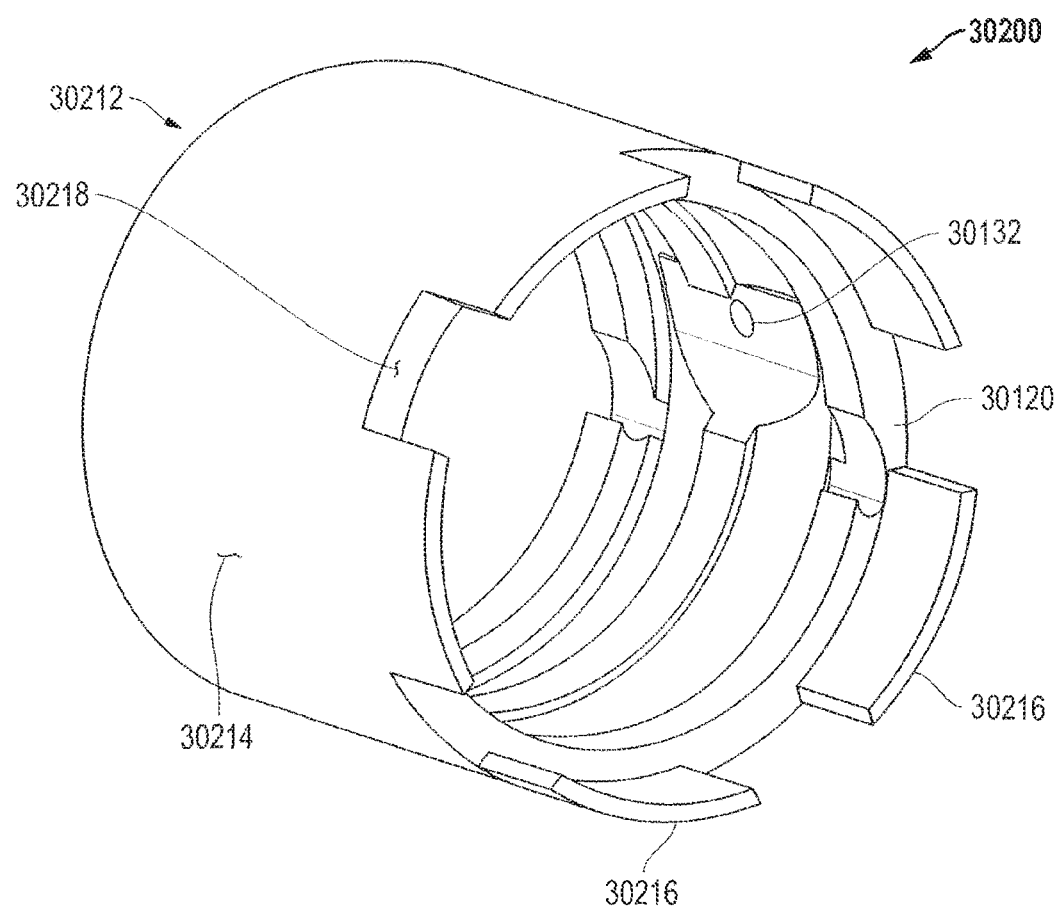
FIG. 33 is an isometric view of a third embodiment, being for a lock collar.

FIG. 33 is an isometric view of a third embodiment, being for a lock collar 30200. Lock collar 30200 has all the same inten1al configurations of the self-locking centralizer 30110 described in the preceding paragraphs, and these components are occasionally numbered the same for reference purposes, but will not otherwise be described herein as their design and operation is the same.

FIG. 33 is an illustration of a body 30212 of lock collar 30200. Body 30212 has an external surface 30214 and a plurality of body tabs 30216 extending outward from one end thereof. Body tabs 30216 are separated by intermittent body slots 30218.

Figure 34:
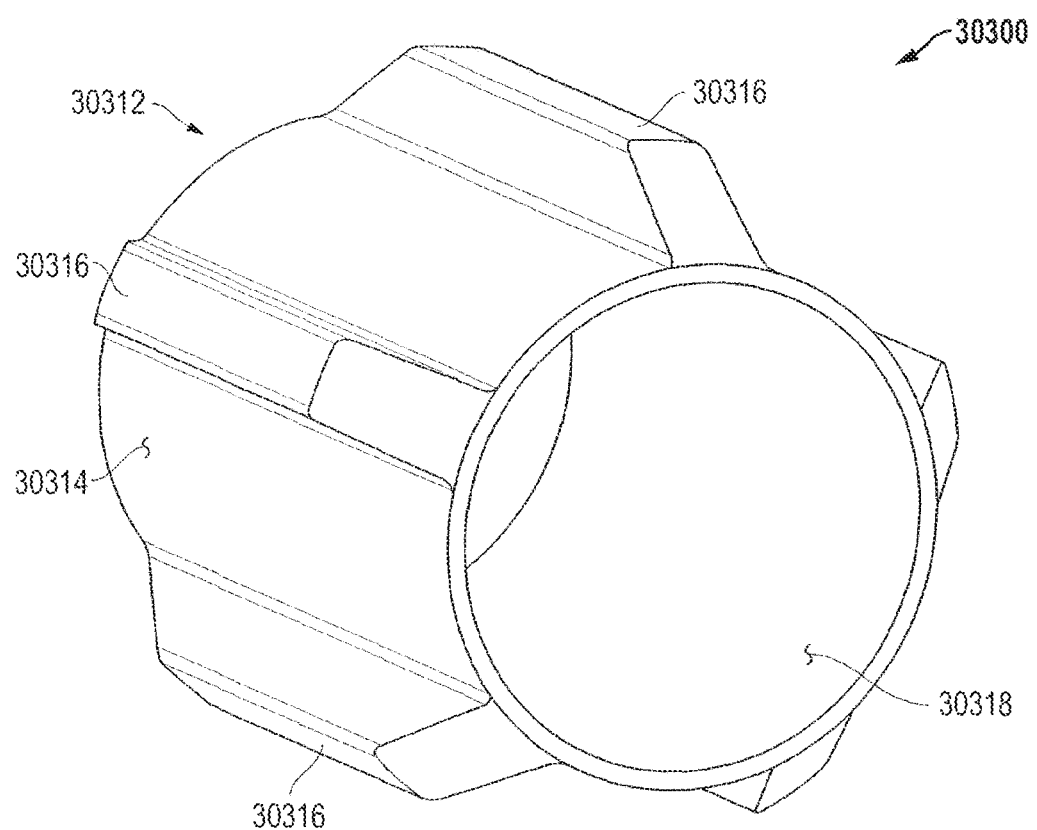
FIG. 34 is an isometric view for the centralizer.

FIG. 34 is an isometric view for a conventional centralizer 30300. Centralizer 30300 has a cylindrical body 30312, comprising an exterior surface 30314 and stabilizing fins 30316 extending outward from exterior surface 30314. Body 30312 has a hollow interior with an interior surface 30318 for fitting over a tubular 30100 (not shown).

Figure 35:
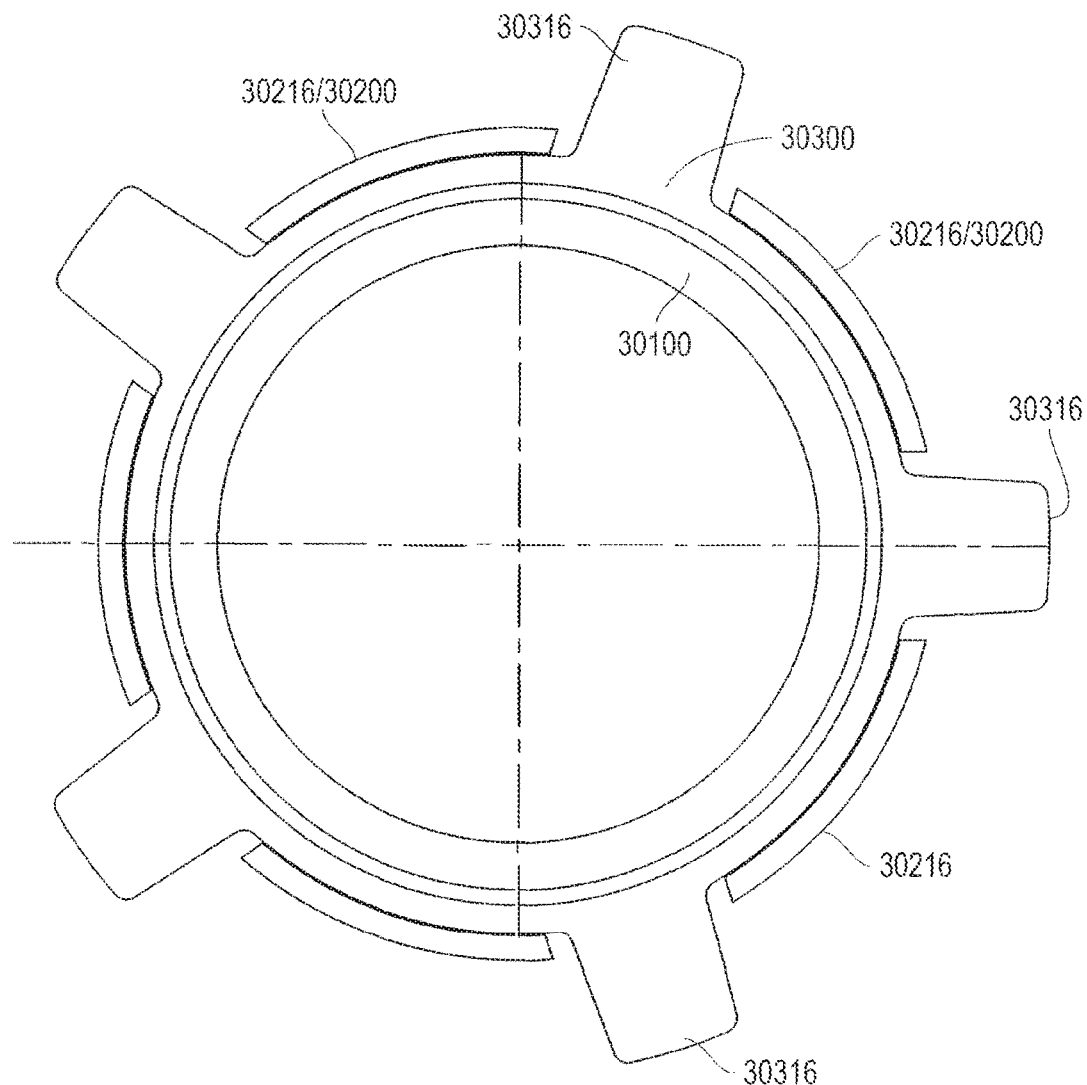
FIG. 35 is an end view of the lock collar mounted on the centralizer.

FIG. 35 is an end view of lock collar 30200 mounted on centralizer 30300, illustrating body tabs 30216 positioned over exterior surface 30314 of centralizer 30300 and between stabilizing fins 30316 of centralizer 30300. In this position, stabilizing fins 30316 are engaged with body slots 30218 of lock collar 30200.

Figure 36:
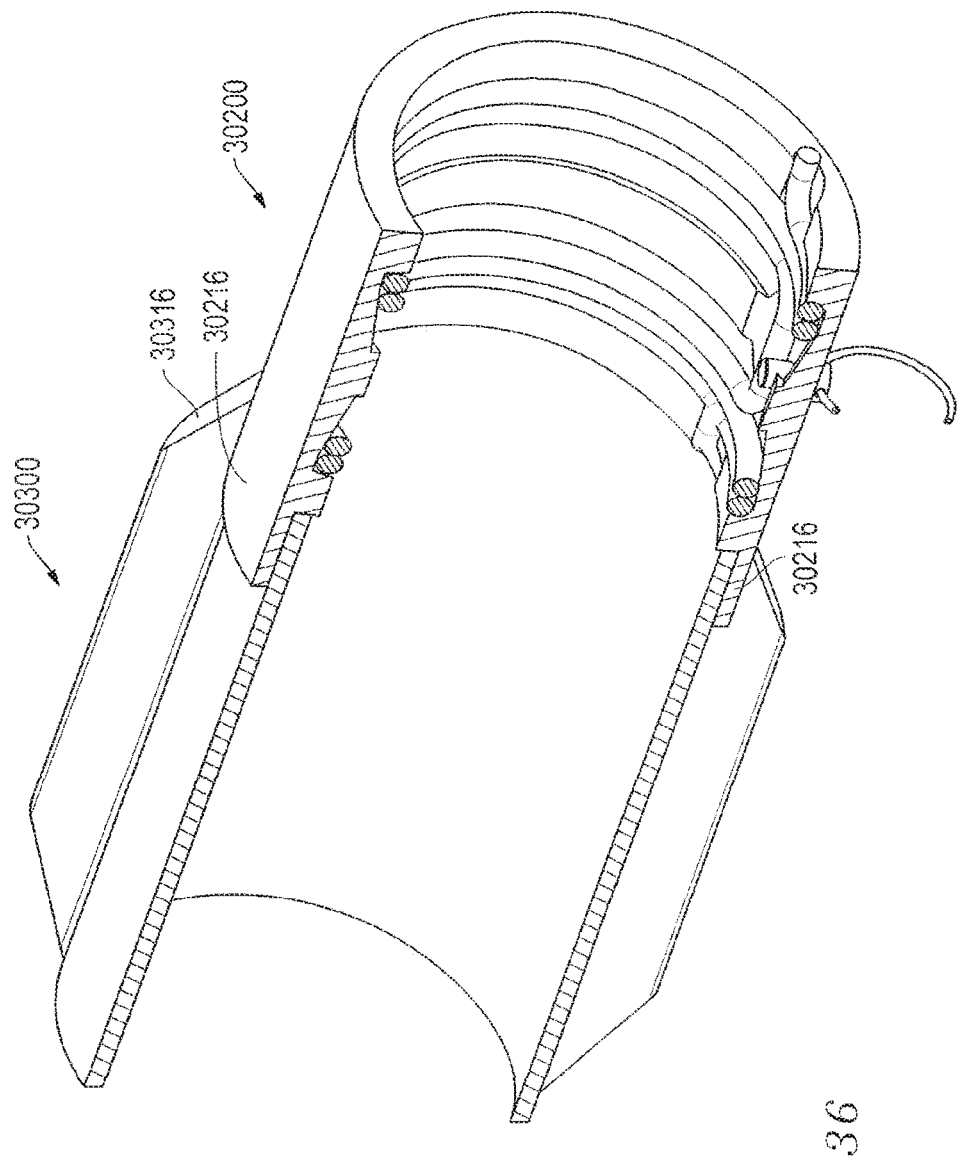
FIG. 36 an isometric view of the lock collar mounted on the centralizer.

FIG. 36 an isometric view of lock collar 30200 mounted on centralizer 30300. The internal locking system of lock collar 30200 secures lock collar 30200 to tubular 30100. The engagement of lock collar 30200 with stabilizing fins 30316 of centralizer 30300 works to prevent rotation of centralizer 30300 relative to lock collar 30200 and tubular 30100.

Figure 37:
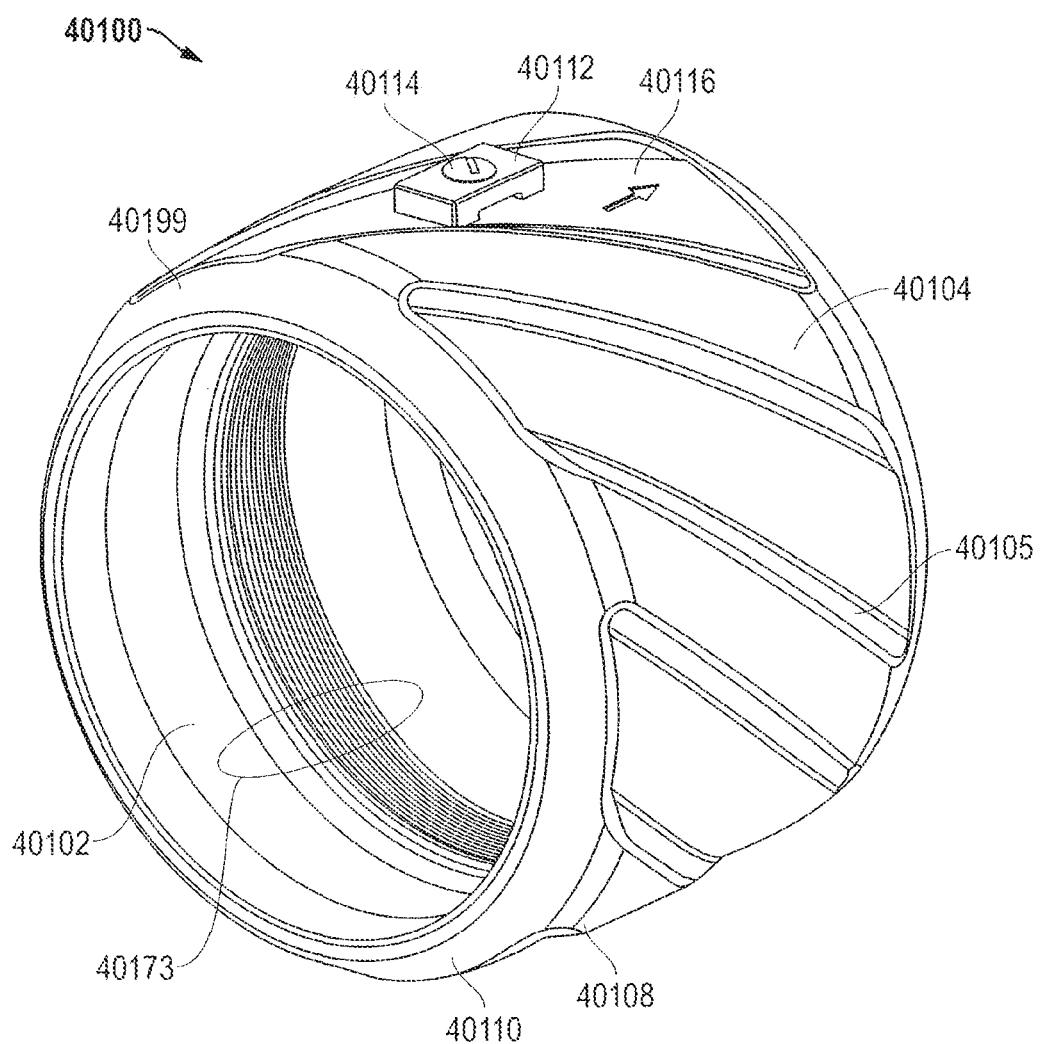
FIG. 37 is an illustration of an exemplary centralizer in accordance with an embodiment.

FIG. 37 is an illustration of an exemplary centralizer 40100 in accordance with an embodiment. Referring to FIG. 37, centralizer 40100 has a cylindrical body 40199, comprising an exterior surface 40104 and an inner cavity 40102. Centralizer 40100 also comprises a first locking mechanism 40108 and a second locking mechanism 40110. In one embodiment, the first locking mechanism 40108 is a helical spring and the second locking mechanism is a "C" shaped spring comprising a rectangular cross section wire (in one embodiment substantially square), which also acts as a slip or wedge when released from its expanded installation position and into its enabled position.

In one embodiment, the first locking and second locking mechanism are retained in an expanded, unlocked or disabled position by retaining member 40112. In one embodiment, retaining member 40112 is secured by a set screw 40114. It is appreciated that the set screw 40114 could be any type of retaining device and is not limited to a screw. For example, in one embodiment, the set screw 40114 is configured to be uninstalled without requiring the use of a tool and may comprise a pull-tab shaft having a frangible plastic thread (not shown) engaging an interior portion of the body 40199.

In one embodiment, removing set screw 40114 from retaining member 40112, and from a threaded portion of the body 40199 below the retainer 40112 (as shown in section in FIG. 38) where such removal enables separation of the retaining member from the body 40199. In response to the retaining member 40112 being removed, the first and second lock mechanisms are released from the expanded position and automatically (due to spring force) move to an enabled or locked position. When installing the centralizer, the centralizer is located in the desired location and the retaining member 40112 is then removed to allow the centralizer to lock in place.

In one embodiment, the centralizer described herein is configured such that the centralizer 40100 can be freely slipped over the outer diameter of a cylindrical member, such as a well pipe, when the locking mechanism(s) is in a disabled, expanded or unlocked position. When the retaining member 40112 is properly positioned and attached to the body 40199, the centralizer 40100 is considered to be in an unlocked or disabled position. Accordingly, when the retaining member 40112 is removed from the body 40199, the centralizer or device 40100 is considered to be in a locked or enabled position. A direction indicator 40116 can be used to aid in installation of the centralizer 40100 by showing a proper orientation of installation relative to the well pipe.

In one embodiment, the inner surface 40102 of housing 40199 comprises a tapered inner diameter, such that the inner diameter of the housing is larger proximate a central position of the inner diameter, as measured in an axial direction from end to end of the centralizer, and smaller towards an outer edge of the inner diameter of the housing. This inner surface may have a variable diameter such that it is tapered and creates a space that provides room for one or more locking expanded mechanisms. Such a tapered inner surface can be seen in area 40204 of FIG. 38. In one embodiment, the angle of the taper is in the range of 10-25 degrees. In one embodiment, the inner surface is conical and the angle of the taper with respect to the housing's axis is in the range of 10-25 degrees. In another embodiment the inner surface is toroidal, and the angle of the taper with respect to the housings axis varies from between 0-15 degrees on end and 10-60 degrees on the other end.

In one embodiment, the first lock mechanism 40108 comprises a spring. The spring may include one or more coils of spring wire that are configured to slide freely over an outer diameter of pipe when in an expanded or disabled position and configured to provide a gripping or frictional force between the centralizer 40100 and an outer surface of a pipe when in an enabled or semi-relaxed position. When the retaining member is installed, the first spring mechanism is in a retracted or disabled position and can slide freely over an outer surface of a pipe section. Once the retaining member 40112 is removed, the first spring mechanism moves to a semi-relaxed or enabled position and provides a frictional force on an outer surface of a pipe section that restricts axial movement of the centralizer with respect to the pipe section. In one embodiment, the first spring mechanism or first locking mechanism 108 includes a helically wound flat wire spring.

In one embodiment, the inner surface 40204 of the centralizer includes a recess diameter area 40173 proximate a mid-portion as measured axially from either end of the centralizer. The recess diameter area 40173 comprises a section of inner diameter slightly greater than adjacent inner diameter. The axial width of the recess diameter area 40173 is slightly greater than the stack width of the locking mechanisms. In one embodiment shown in FIG. 38 the recess diameter area 40273 length is slightly greater than the stack height of the expanded and retained first locking mechanism 40108 and two second locking mechanisms 40110. As shown the recess diameter is bordered at each end by a shoulder portion 40156 of the inner surface 40204. The shoulder portion 40156 helps retain the first locking mechanism 40108 and/or the second locking mechanism 40110 in a tightly stacked (axially) position within the centralizer when the locking mechanisms are expanded tightly against the inner diameter of the recess.

In one embodiment, the second lock mechanism 40110 comprises a spring which may function as a slip or wedge for operating in conjunction with a tapered surface 40102 or 40204 of the inner diameter of the centralizer for enhanced gripping of the well pipe when the slip spring is enabled. The slip spring may include one or more lengths of wire that are configured to slide freely over an outer diameter of pipe when in an expanded or retracted (to a larger inner diameter) position and configured to provide a gripping force between the centralizer 40100 and an outer surface of a pipe when in an enabled or semi-relaxed (toward a smaller inner diameter) position. While in the retracted position, one or more surface, such as open end surfaces (e.g. 40306, 40308) of the slip spring may abut against one or more portion of the retaining member where the interposition of the retaining member 40112 between the open end surfaces retains an expanded condition in the spring such that the spring assumes a larger diameter and a stored energy state. When the retaining member is removed, the stored energy causes the spring to move toward a smaller (semi-relaxed) diameter condition, which in use will place it in contact with a pipe on which the centralizer is being installed.

In one embodiment, the slip spring has one or more gripping edges 40135 that provide a gripping force that impedes motion of the centralizer with respect to a well pipe.

A gripping edge could be an edge of machined grooves or could be an edge of a square or rectangular wire, for example. When the retaining member is installed, the second spring mechanism 40110 is in a retracted (expanded by interposition of retaining member as described above) or disabled position and can slide freely over an outer surface of a pipe section. In one example embodiment, one or more portion of the first and/or second spring mechanisms comprises hardened metal such as spring steel. For example, in one embodiment, the gripping surfaces of the first and second locking mechanisms have a Rockwell C scale hardness of at least 30. In one embodiment, the gripping surfaces of the first and second locking mechanisms have a Rockwell C scale hardness between 40-45.

Once the retaining member 40112 is removed, the second spring mechanism 40110 is in a semi-relaxed or enabled position and provides a frictional or gripping force on an outer surface of a pipe section that restricts movement of the centralizer with respect to the pipe section. In one embodiment, the second locking mechanism 40110 restricts rotational movement of the centralizer with respect to the pipe section. In this embodiment, the slip spring described above may be formed in and/a twisted or helical configuration.

For example, in the case the slip spring is formed from a square wire, the square wire would be twisted helically wherein the corners of the square wire become gripping edges that are disposed helically along a circumferential length of the slip spring. When in an engaged position, the helically disposed gripping edges dig into an outer surface of a wellbore pipe and prevent rotational movement of the centralizer with respect to the wellbore pipe.

In another embodiment, the second locking mechanism 40110 restricts axial movement of the centralizer with respect to the pipe section. In this embodiment, the slip spring described above may be disposed as a non-twisted square or rectangular wire. For example, in FIG. 38, the slip spring 40110 is formed from a non-twisted square wire and one or more corners formed by grooves on the inner surface of the square wire become gripping edges that prevent axial movement of the centralizer with respect to a wellbore pipe.

In one embodiment, the second spring mechanism includes a square or rectangular wire and in one embodiment, the square or rectangular wire is twisted and formed in a helix shape. In this embodiment, the edges of the twisted square or rectangular wire form a helix and the edges of the helix provide a frictional force between the centralizer body 40199 and the outer surface of a pipe section.

In one embodiment, the outer surface 40104 of the centralizer body comprises one or more ridges or blades 40106 that are contoured to induce a non-laminar flow of material, such as casing cement that flows past the centralizer 40100 when installed on a pipe section within a borehole. In one embodiment, the blades 40106 direct material, such as casing cement, in multiple directions when flowing past the centralizer. In one embodiment, the ridges 40106 facilitate proper cementing and reduce problems such as cement channeling within a borehole.

In one embodiment, one or more blades 40106 are of a tapered or teardrop profile. For example, the blades may have an apparent outer diameter that is larger at one end of the centralizer than the other and a taper or teardrop profile may extend between the differing diameter ends. In one embodiment the larger outer diameter is configured to be on the lower or down-hole side of the centralizer as the well pipe is lowered into the well bore. Such a configuration helps to minimize the possibility of wedge sticking of the centralizer in tight well diameters or "keyholes." In one embodiment a central portion (toward the axial middle, end to end of the centralizer) of the blades includes a reduced apparent outer diameter to facilitate decreased fluid by pass pressure drop during the running of pipe into the well or fluid circulation such as cementing operations.

Figure 38:
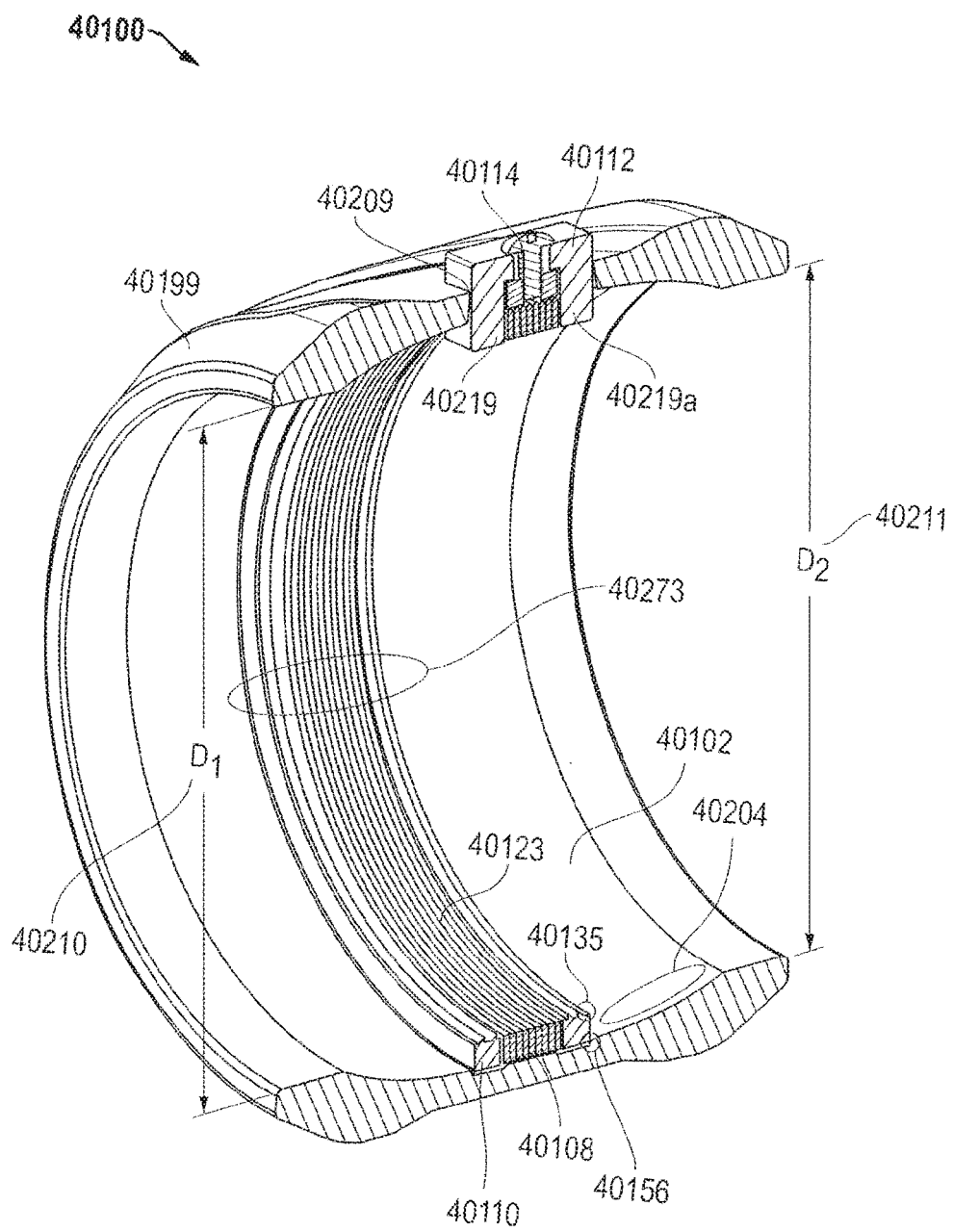
FIG. 38 is a sectional view of and exemplary centralizer showing a first locking mechanism and a second locking mechanism in a retracted position, in accordance with an embodiment.

FIG. 38 shows a sectional view of centralizer 40100 having the first locking mechanism 40108 and the second locking mechanism 40110 in an expanded position. In FIG. 38, the first locking mechanism 40108 comprises a plurality of helically wound coils 40123. The helically wound coils 40123 of 40108 are rectangular in cross section. The inner diameter edge 40156 of the wire includes a substantially sharpened edge and the "flat" wire comprises spring steel having, in one embodiment, a Rockwell C scale hardness of 38-42. The second locking mechanism is shown to comprise at least one substantially rectangular wire ring 40110. The embodiment of FIG. 38 includes a rectangular or semi-rectangular cross section ring 40110 on each axial side of the first locking mechanism 40108. The wire ring 40110 includes at least one raised and substantially sharp circumferential reduced contact area gripping profile 40135 having the form of a "tooth" or "wicker" profile 40135 for enhanced gripping of an exterior of a well pipe on which the centralizer is installed. In one embodiment the raised wicker comprises a material having a Rockwell C scale hardness of 38-42.

Retaining member 40112 retains the first and second lock mechanisms in a retracted position. In the retracted position, an inner diameter 40210 of the first and second lock mechanisms is larger than the outer diameter of a wellbore pipe which allows the centralizer 40100 to be freely positioned axially along a length of wellbore pipe.

When the retaining member is removed, the first lock mechanism 40108 is allowed to contract to an enabled or locked position and the resulting inner diameter 40410 of the more relaxed spring coils in the enabled position is smaller than the inner diameter 40210 when in the retracted (expanded due to reaction force retaining strain energy within the spring and applied axially at the ends of the coiled or circumferentially bent spring wire) or disabled position.

The smaller diameter in the locked position results in the spring coils of the first locking mechanism gripping the outer surface of a wellbore pipe with a frictional force that restricts movement of the centralizer with respect to the wellbore pipe when in the engaged or locked position. In one embodiment, the first locking mechanism 40108 restricts axial movement of the centralizer with respect to a wellbore pipe. In one embodiment the coil or coils of 40108 "lean" slightly when subjected to relative axial movement between the outer housing and the wellbore pipe. When such coils 108 are so "leaned" or canted in a pall like fashion, the edges, in one embodiment sharp and hardened (e.g. 40 RC), of the coil bite into the outer diameter of the wellbore pipe thereby increasing the gripping load that can be borne by the locking mechanism 40108.

In one embodiment, when the retaining member, which also holds the second lock mechanism in an expanded position via axial reaction force applied to the spring wire as described above, is removed, the second lock mechanism 40110 is allowed to contract to an enabled or locked position and the resulting inner diameter of the lock ring in the enabled position is smaller than the inner diameter when in the retracted or disabled position. The smaller inner diameter in the locked position results in the lock ring of the second locking mechanism gripping the outer surface of a wellbore pipe with a frictional or gripping force that restricts movement of the centralizer with respect to the wellbore pipe when in the engaged or locked position.

In one embodiment, the second locking mechanism 40110 includes a circumferentially bent or "coiled" (e.g. "coiled" in at least one partial coil) helically twisted square or rectangular wire member that restricts rotational movement of the centralizer with respect to a wellbore pipe. In another embodiment, the second locking mechanism 40110 includes a coiled non-twisted square or rectangular wire member that augments the force of the first locking mechanism and also restricts axial movement of the centralizer with respect to a wellbore pipe.

In one embodiment, the inner surface 40102 of the centralizer body 40199 includes at least one tapered inner diameter surface 40204 and as shown may include a tapered surface on each side of the center locking mechanism recess area. In one embodiment the tapered surface comprises a non-linear (e.g., not straight taper) diameter surface 40204 that includes a variable diameter. The tapered surface, whether straight or non-linear, is configured to interact with a portion of the second locking mechanism such that the second locking mechanism becomes wedged between the tapered surface 40204 of the centralizer body 40199 and an outer surface of a wellbore pipe. Axial movement of the centralizer body 40199 relative to the pipe will further wedge the second locking mechanism between the diminishing inner diameter of the taper and the outer diameter of the well pipe. An axial wedge mechanism as described herein would however operate in a conceptually similar fashion.

In one embodiment the non-linear taper forms an inner diameter than decreases at an increasingly rapid rate (such as for example a curve of exponentially decreasing radius) as it progresses toward an end of the centralizer. In one embodiment the angle of the taper, relative to the central axis of the centralizer, toward the inner end or center of the tapered section is 5 degrees and toward the outer end of the tapered section is 30 degrees or greater. The increasing angle facilitates a reduced radial load component (resulting from the wedging), in relation to axial load on the centralizer body, on the second locking mechanism thereby reducing any likelihood that the well pipe will be collapsed locally or that the centralizer body will be burst locally by the radial wedge loading of the second locking mechanism. The curve or angle variation of the taper may be designed to optimize gripping load while minimizing the possibility of failed casing or centralizer body due to overloading of the wedge under high axial centralizer load (as might occur when running the centralizer into a down-hole obstruction while lowering pipe into the wellbore).

In one embodiment, the first 40108 and second 40110 locking mechanisms are activated in stages. The first locking mechanism performs as a first stage lock and the second locking mechanism performs as a second stage lock wherein the second stage lock augments the force applied by the first stage lock to restrict movement of the centralizer with respect to a wellbore pipe.

In one embodiment, the second locking mechanism 40110 is wedged in response to an axial force being applied to a centralizer outer body that is initially held to a wellbore pipe by the first locking mechanism 40108. When both the first and second locking mechanisms are deployed into gripping engagement with an outer diameter of the wellbore pipe the first locking mechanism may, in one embodiment, move axially within the centralizer outer body. When an axial force overcomes the gripping force applied by the first locking mechanism, the centralizer may then shift axially along the wellbore pipe. The first locking mechanisms will tend to stay engaged with the well pipe and retain its axial location thereon. As the outer centralizer body moves, taking the first second locking mechanisms axially therewith, one of the second locking mechanisms (corresponding to the end of the centralizer body moving closer to the first locking mechanism) will abut the first locking mechanism and be retained thereby even as the centralizer body continues to move. As the centralizer body moves relative to the retained second locking mechanism, that mechanism will be forced into the inner diameter wedge section of the centralizer body and will be wedged into tight gripping engagement with the outer surface of the well pipe. As such the second locking feature augments the first locking mechanism by providing an additional griping force that resists movement.

In one embodiment, when the second locking mechanism includes a non-twisted member, the second locking member restricts axial movement of the centralizer with respect to a wellbore pipe. In another embodiment, when the second locking mechanism includes a twisted member, the second locking member restricts axial and rotational movement of the centralizer with respect to a wellbore pipe. It is appreciated that the second locking mechanism may restrict axial and/or rotational movement of the centralizer with respect to a wellbore pipe in one or more directions.

In one embodiment, the centralizer body 40199 comprises a substantially cylindrical outer body having a first inner diameter at each end thereof and a second inner diameter located intermediate of the ends, wherein the second inner diameter is greater than the first inner diameter. This is shown in FIG. 38 as the inner diameter of the centralizer body 40199 is larger proximate the locking mechanisms 40108 and 40110 than the inner diameter of the centralizer body near the ends. This difference in diameters creates a surface 40204 that is configured to interact with the second locking mechanism to wedge a portion of the second locking mechanism between the outer surface of a wellbore pipe and the inner surface of the centralizer.

In one embodiment, the first locking mechanism comprises a spring that comprises a helically wound wire having at least one coil and a first wire end and a second wire end and is positioned substantially co-axially within the centralizer body and proximate the larger inner diameter of the centralizer housing. In one embodiment, the spring has a spring expanded position such that an inner diameter of the at least one coil of the spring is substantially equal to or greater than the smaller inner diameter at either end of the centralizer housing and also has a spring released position such that the inner diameter of the at least one coil would be smaller than the inner diameter at either end of the centralizer housing were the spring unrestrained.

Figure 39:
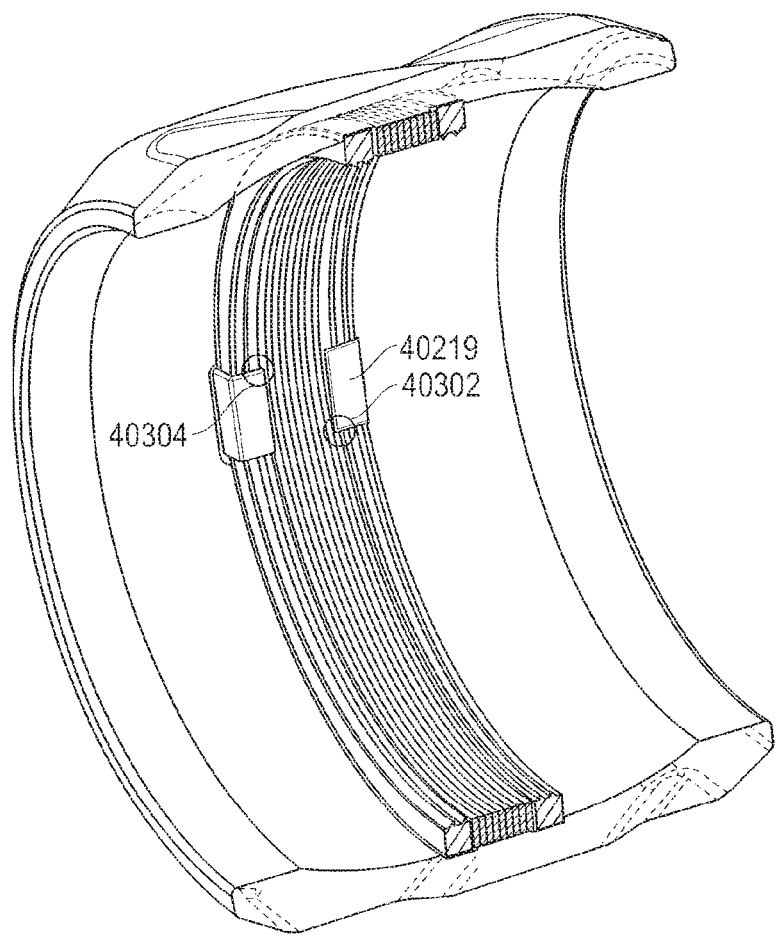
FIG. 39 is a sectional view of and exemplary centralizer having a retaining member maintaining a first locking mechanism and a second locking mechanism in a retracted position, in accordance with an embodiment.
Figure 40A:
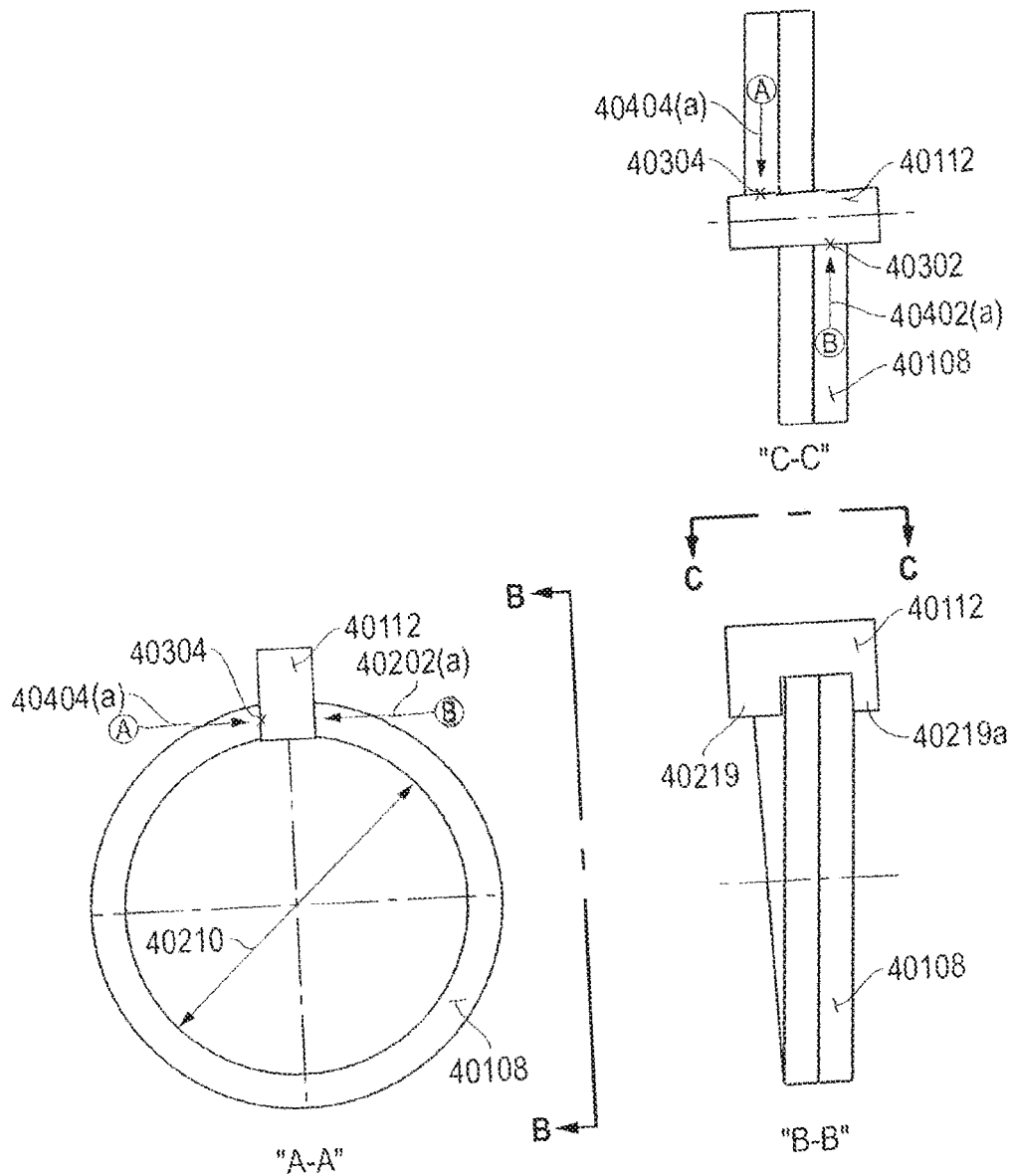
FIG. 40A shows an initial disabled state of an exemplary centralizer in accordance with an embodiment.
Figure 40B:
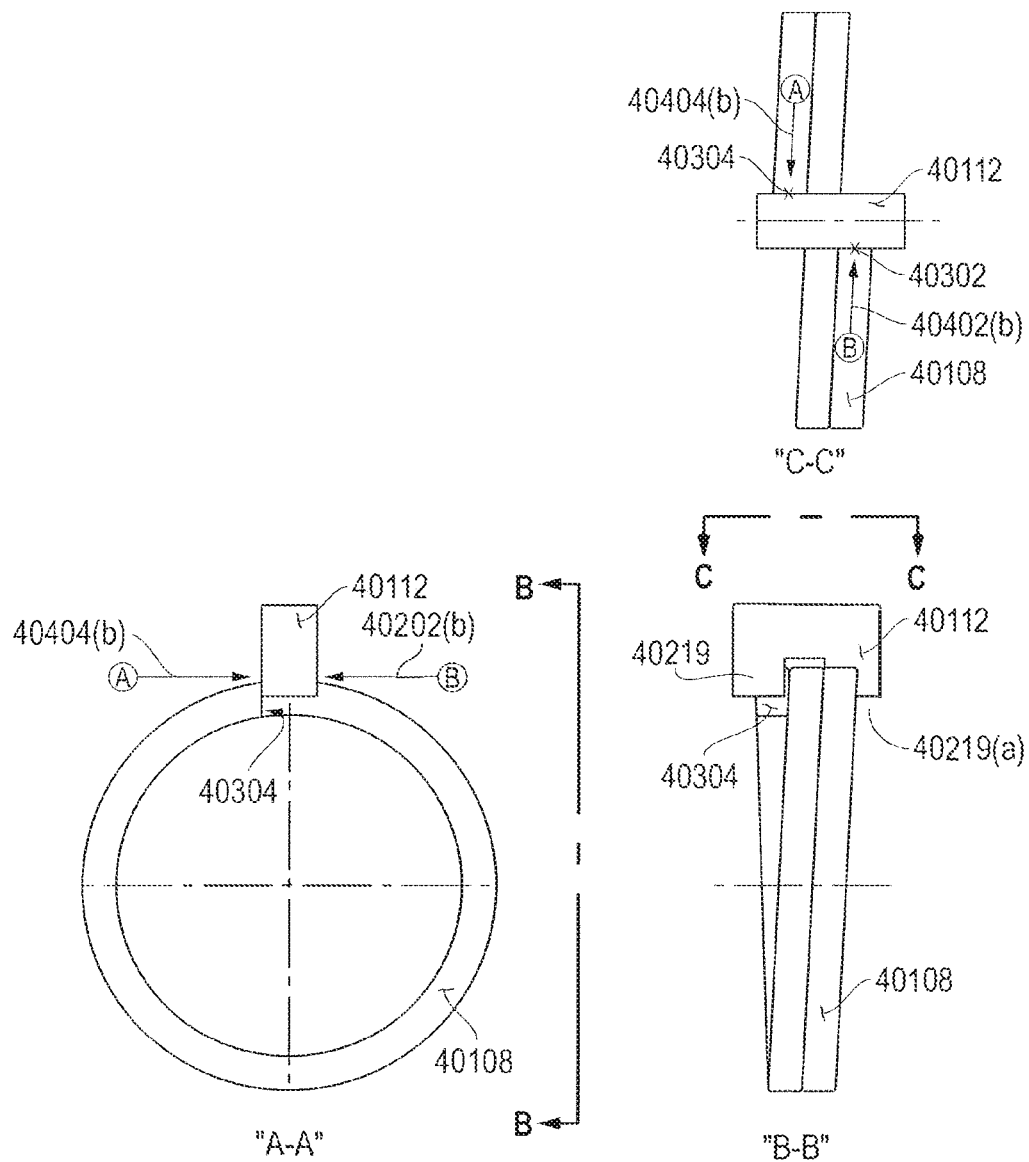
FIG. 40B shows an intermediary state of an exemplary centralizer in accordance with an embodiment.
Figure 40C:
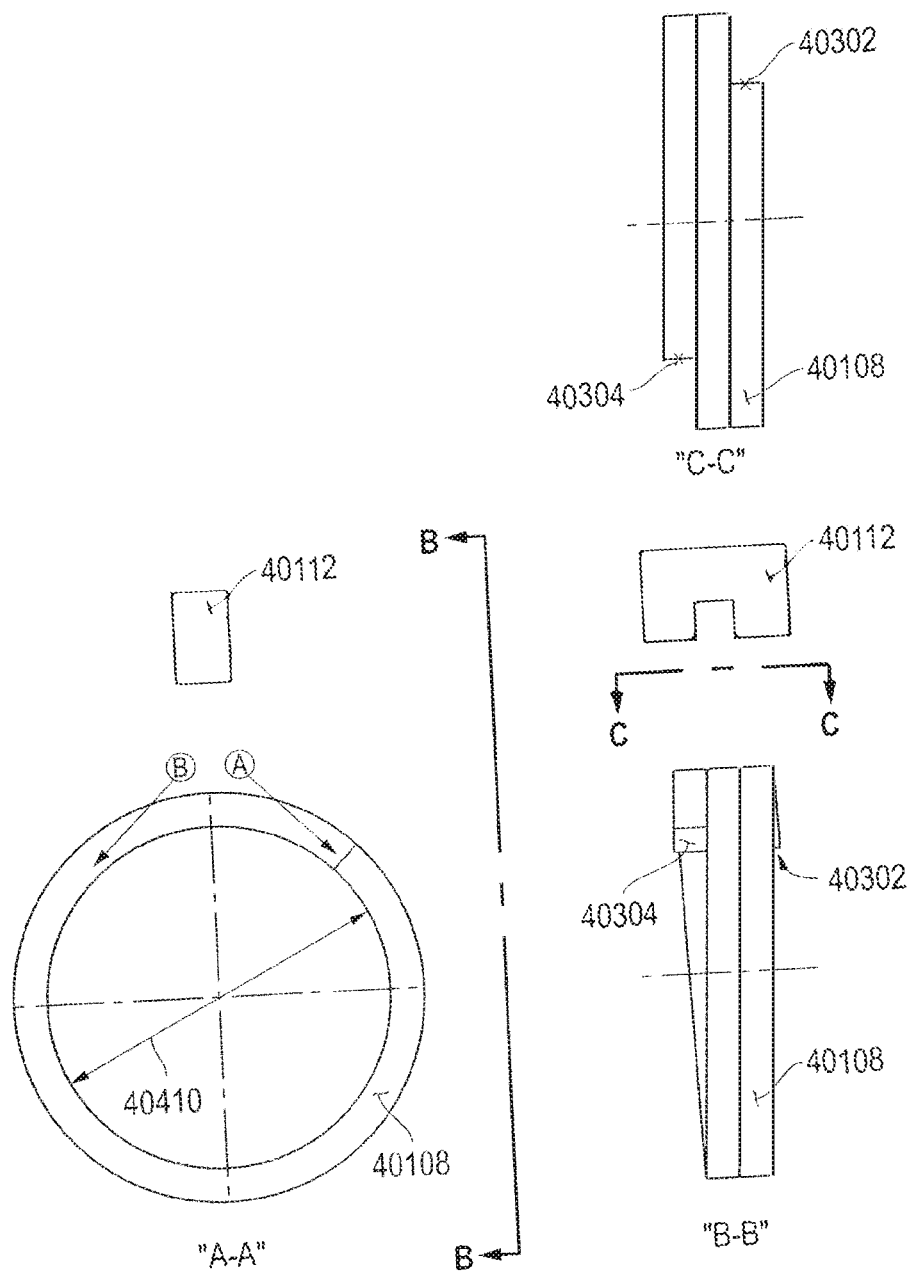
FIG. 40C shows a locked or enabled state of an exemplary centralizer in accordance with an embodiment.

As shown in FIGS. 39 through 40C, in one embodiment, the retainer member 40112 has a first retainer position wherein it extends through apertures 40209 and 40209a in the outer body 40199 and has a leg portions 40219 and 40219a abutting at least one of the first 40302 and second 40304 wire ends of a first spring locking mechanism such that the spring is restrained in the spring expanded position and also has a second retainer position as indicated in FIG. 40C wherein at least one of the leg portion is removed from abutment with the at least one of the first and second wire ends such that the spring may move to its spring released position.

In one embodiment, the coil spring of the first locking mechanism is helically wound with the first wire end 40304 pressing on or abutted against retainer leg portion 40219a from a first direction and the second wire end 40302 pressing or abutting against the retainer leg portion 40219 from a second direction that is opposite the first direction. The opposing forces of the wire ends 40302 and 40304 induce reactive loads within the retainer leg portions 40219 and 40219a in the retracted position or unlocked position of the first locking mechanism.

FIGS. 40A, 40B and 40C are perspective views showing various locking states that are controlled by the retaining member 40112. For clarity, only the first locking mechanism 108 is shown, however, it is appreciated that the retaining member 40112 could also control similar locking states of the second locking mechanism 40110 and an inner diameter 40210 of the wire spring is maintained.

FIG. 40A shows an initial unlocked or disabled state where the retaining member 40112 is fully positioned in the centralizer housing and abuts a first wire end 40302 and a second wire end 40304 to keep the first locking mechanism in a retracted (diameter expanded) state. In the retracted or disabled state, wire end 40302 presses against the retaining member in direction 40402A and wire end 40304 presses against the retaining member in direction 40404A.

FIG. 40B shows an intermediary state where the retaining member is a partially removed from the centralizer housing while still abutting the first wire end 40302 and the second wire end 40304 to keep the first locking mechanism in a diameter expanded (retracted state). In the intermediary state, wire end 40302 still presses or abuts against the retaining member in direction 40402B and wire end 40304 presses against the retaining member in direction 40404B.

FIG. 40C shows a locked or enabled state (diameter semi-relaxed to engage well pipe) where the retaining member is fully removed from the centralizer housing. When the retaining member 40112 is removed, the locking device automatically moves into and remains in a locked or enabled position without requiring an additional outside applied force. FIG. 40C shows the first wire end 40302 and the second wire end 40304 in a locked or enabled state. In the enabled state, wire end 40302 may overlap wire end 40304. The overlapping of the wire ends 40302 and 40304 results in the smaller inner diameter 40410 of the wire spring compared to its diameter 40210 in the disabled state described above. The reduced inner diameter of the wire spring provides a gripping force to resist movement of the centralizer with respect to a wellbore pipe.

Figure 41:
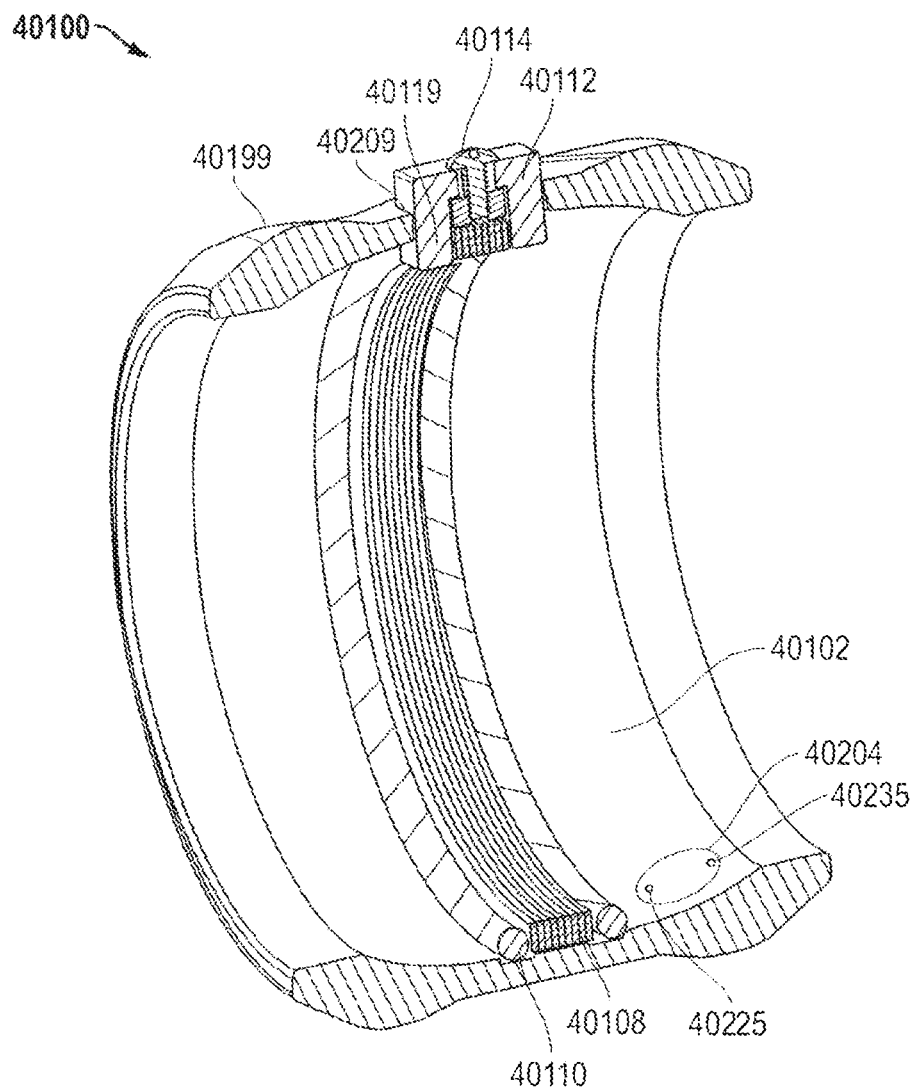
FIG. 41 shows a sectional view of an exemplary centralizer having a gripping edge that is helically disposed about a circumference of the slip spring in accordance with an embodiment.

FIG. 41 shows a side view centralizer 40100 having a second locking mechanism 40110 with a twisted wire member. In this example, a twisted square or rectangular wire slip spring is used to resist rotational movement of the centralizer with respect to a wellbore pipe. As provided above, the second lock mechanism of FIG. 38 included a non-twisted slip spring that resists axial movement of the centralizer with respect to a wellbore pipe. With respect to FIG. 41, the twisted or helix form of the slip spring of the second locking mechanism 40110 provides a gripping force on a wellbore pipe that resists rotational and axial movement of the centralizer 40100 with respect to the wellbore pipe when in an enabled position.

In one embodiment, the retainer member 40112 has a first retainer position wherein it extends through an aperture 40209 in the outer body 40199 and has a leg portion 40219 abutting at least one of a first and second wire ends of the second lock mechanism 40110 such that slip spring is restrained in an expanded position and also has a second retainer position wherein the leg portion is removed from abutment with the at least one of the first and second wire ends such that the spring may move to its spring released position.

In one embodiment, the wellbore pipe centralizer 40100 comprises a substantially cylindrical outer body 40199 having a first inner diameter 40211 at each end thereof and a second inner diameter located intermediate of the ends, wherein the second inner diameter is greater than the first inner diameter. FIG. 37 shows the tapered surface of the inner surface 40102 of the outer body that forms a tapered surface or "non-planar" section 40204.

The well pipe centralizer 40100 further comprises a spring 40108 comprising a helically wound wire having at least one coil and a first wire end 40302 and a second wire end 40304, positioned substantially co-axially within the outer body 40199 and proximate the second diameter, the spring 40108 having a spring expanded position (shown in FIG. 40A) such that an inner diameter of the at least one coil of the spring is substantially equal to or greater than the first diameter, and having a spring released position (shown in FIG. 40C) such that the inner diameter of the at least one coil would be smaller than the first diameter were the spring unrestrained.

The well pipe centralizer further comprising a retainer member 40112 having a first retainer position (Shown in FIG. 40A) wherein it extends through an aperture 40209 in the outer body 40199 and has a leg portion 40219 abutting at least one of the first and second wire ends such that the spring is restrained in the spring expanded position and having a second retainer position (shown in FIG. 40C) wherein the leg portion is removed from abutment with the at least one of the first and second wire ends such that the spring may move to its spring released position.

In one embodiment, the outer body of the wellbore pipe centralizer further includes at least one inner diameter taper (shown in area 40204 of FIG. 38) located axially between the second inner diameter and at least one of the first inner diameters, and wherein the centralizer further comprises a slip spring 40110, positioned substantially co-axially within the outer body and proximate the spring, and having a slip spring expanded position such that an inner diameter of the slip spring is substantially equal to or greater than the first diameter, and having a slip spring released position such that the inner diameter of the slip spring would be smaller than the first diameter were the slip spring unrestrained.

In one embodiment, the slip spring 40110 comprises at least one circumferentially distributed pipe gripping edge, and a first slip wire end and a second slip wire end. In one embodiment, the pipe gripping edge is proximate an inner diameter of the slip spring.

In one embodiment, the slip spring 40110 is restrained in the slip spring expanded position (shown in FIG. 40A) by one of the retainer and a second retainer.

In one embodiment, the slip spring 40110 is movable between a first taper location and a second taper location (for example, area 40204) when the slip spring is in the slip spring released position and where the first taper location inner diameter is greater than the second taper location inner diameter.

In one embodiment, the slip spring 40110 comprises wire having a substantially rectangular cross-section as shown in FIG. 38. In one embodiment, the slip spring 40110 comprises a circumferential body having at least one raised portion including the gripping edge thereon.

FIG. 41 shows a side view of an exemplary centralizer having a gripping edge that is helically disposed about a circumference of the slip spring.

In one embodiment, the centralizer includes a first inner diameter taper and a first slip-spring movable therein, wherein the first slip spring is movable between an initial first taper location 40225 of FIG. 41 and an ending first taper location 40235 of FIG. 41 when the first slip spring is in the slip spring released position and where the initial first taper location inner diameter is greater than the ending first taper location inner diameter, and a second inner diameter taper and a second slip spring movable therein, wherein the second slip spring is movable between an initial second taper location and an ending second taper location when the second slip spring is in the slip spring released position and where the initial second taper location inner diameter is greater than the ending second taper location inner diameter.

In one embodiment, the spring 108 comprises a flat wire spring as shown in FIGS. 38 and 41. In one embodiment, the flat wire spring is wound having its long cross-sectional axis substantially aligned in a radial direction and further where the flat wire spring includes at least one sharp gripping edge proximate the inner diameter.

In one embodiment, one or more components of the centralizer 40100 are hardened. For example, in one embodiment, the flat wire 40108 comprises spring steel having a Rockwell C scale hardness of at least 40.

In one embodiment, the second locking mechanism includes at least one twisted square wire (shown in FIG. 41) having a first wire end and a second wire end and positioned proximate the second diameter, the twisted square wire configured to provide a gripping force between an inner surface of the outer body of the wellbore pipe centralizer and an outer surface of the wellbore pipe when the first wire end and the second wire ends are in a released position.

In one embodiment, the outer body 40199 comprises at least one ridge 40106 on an outer surface for inducing a non-laminar flow of material past the centralizer. For example, once a centralized pipe is disposed within wellbore, cement is used to secure the pipe within the borehole. The cement is disposed between the well pipe and the borehole. The ridges 40106 direct the flow of cement in multiple directions to improve cement flow and to reduce the chances of improper cementing.

In one embodiment, the retainer member 40112 is removably coupled to the substantially cylindrical outer body by a retaining nut 40114.

In one embodiment, the locking centralizer 40100 includes a multiple stage locking system that includes a first stage lock 40108 configured such that when in a first unlocked position, the first stage lock allows axial movement of the cylindrical housing with respect to the tubular member and when in a locked position, the first stage lock provides a first gripping force that restricts axial movement of the housing with respect to the tubular member. The locking centralizer also includes a second stage lock 40110 configured such that when in a second locked position, the second stage lock provides a second gripping force that further prevent the axial movement of the housing with respect to the tubular member, the second gripping force also restricts movement of the locking centralizer with respect to the tubular member.

FIG. 42 is a flow diagram of an exemplary method 40600 for attaching a centralizer to a tubular member. In one embodiment, method 40600 is performed without requiring the use of an applied force to secure the centralizer to the tubular member.

At 40602, method 40600 includes placing a centralizer housing onto a tubular member, the centralizer housing comprising an inner cavity configured to slide over an outer surface of the tubular member, the housing comprising an outer surface for centering the tubular member within a borehole.

At 40604, method 40600 includes accessing a first locking mechanism coupled with the inner cavity, the first locking mechanism configured such that when retained in a retracted position by a retaining member, the locking mechanism allows axial movement of the centralizer housing with respect to the tubular member and when the retaining member is removed and the first locking mechanism is in an enabled position, the locking mechanism provides a gripping force that restricts axial movement of the housing with respect to the tubular member.

At 40606, method 40600 includes releasing the retaining member to attach the centralizer to the tubular member.

In one embodiment, method 40600 also includes axially moving the centralizer housing with respect to the tubular member and engaging a second locking mechanism coupled with the inner cavity and configured such that when in a locked position, the second locking mechanism provides a second gripping force that further restricts the axial movement of the centralizer housing with respect to the tubular member.

In one embodiment, method 40600 further includes preventing rotation of the centralizer with respect to the tubular member with the second locking mechanism.

In one embodiment, the first locking mechanism moves to the enabled position without requiring use of an applied force.

FIG. 43 is a flow diagram of an exemplary method 40700 method for using a wellbore pipe centralizer. At 40702, method 40700 includes positioning a centralizer housing onto a wellbore pipe, the centralizer housing comprising an inner cavity configured to slide over an outer surface of the wellbore pipe, the housing comprising an outer surface for centering the wellbore pipe within a wellbore.

At 40704, method 40700 includes accessing a first locking mechanism coupled with the inner cavity, the first locking mechanism configured such that when retained in a retracted position by a retaining member, the locking mechanism enables free movement of the centralizer housing with respect to the wellbore pipe and when the retaining member is removed and the first locking mechanism is in an enabled position, the first locking mechanism provides a frictional force between the wellbore pipe and the centralizer housing that restricts axial movement of the centralizer housing with respect to the wellbore pipe.

At 40706, method 40600 includes removing the retaining member to attach the centralizer to the wellbore pipe.

At 40708, method 40700 includes moving axially the centralizer housing with respect to the wellbore pipe.

At 40710, method 40700 includes engaging a second locking mechanism coupled with the inner cavity and configured such that when in an unlocked position, the second locking mechanism provides a second gripping force that restricts rotational movement of the centralizer housing with respect to the wellbore pipe.

In one embodiment, method 40700 includes the first locking mechanism moving to the enabled position without requiring an applied force.

In one embodiment, method 40700 includes maintaining the first locking mechanism in the enabled position without requiring an applied force.

Figure 44:
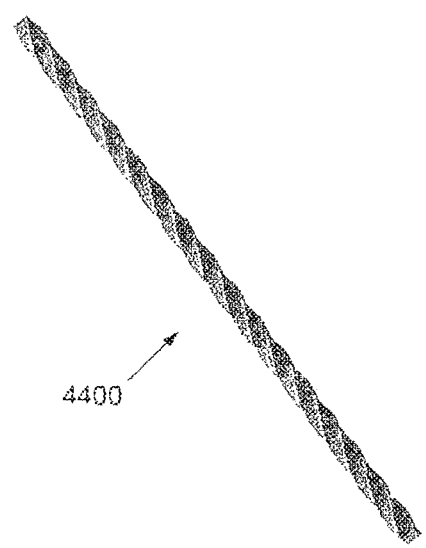
FIG. 44 is a perspective view of a twisted square wire.

FIG. 44 is a perspective view of a twisted square wire 4400. Twisted square wire 4400 may be employed as one the first locking mechanism and/or the second locking mechanism, in various embodiments. The twisted nature of twisted square wire 4400 exposes edges of the square wire to frictional engage with a surface of a well gripped pipe section to resist rotational movement of the pipe section with respect to the locking mechanism(s).

Figure 45:
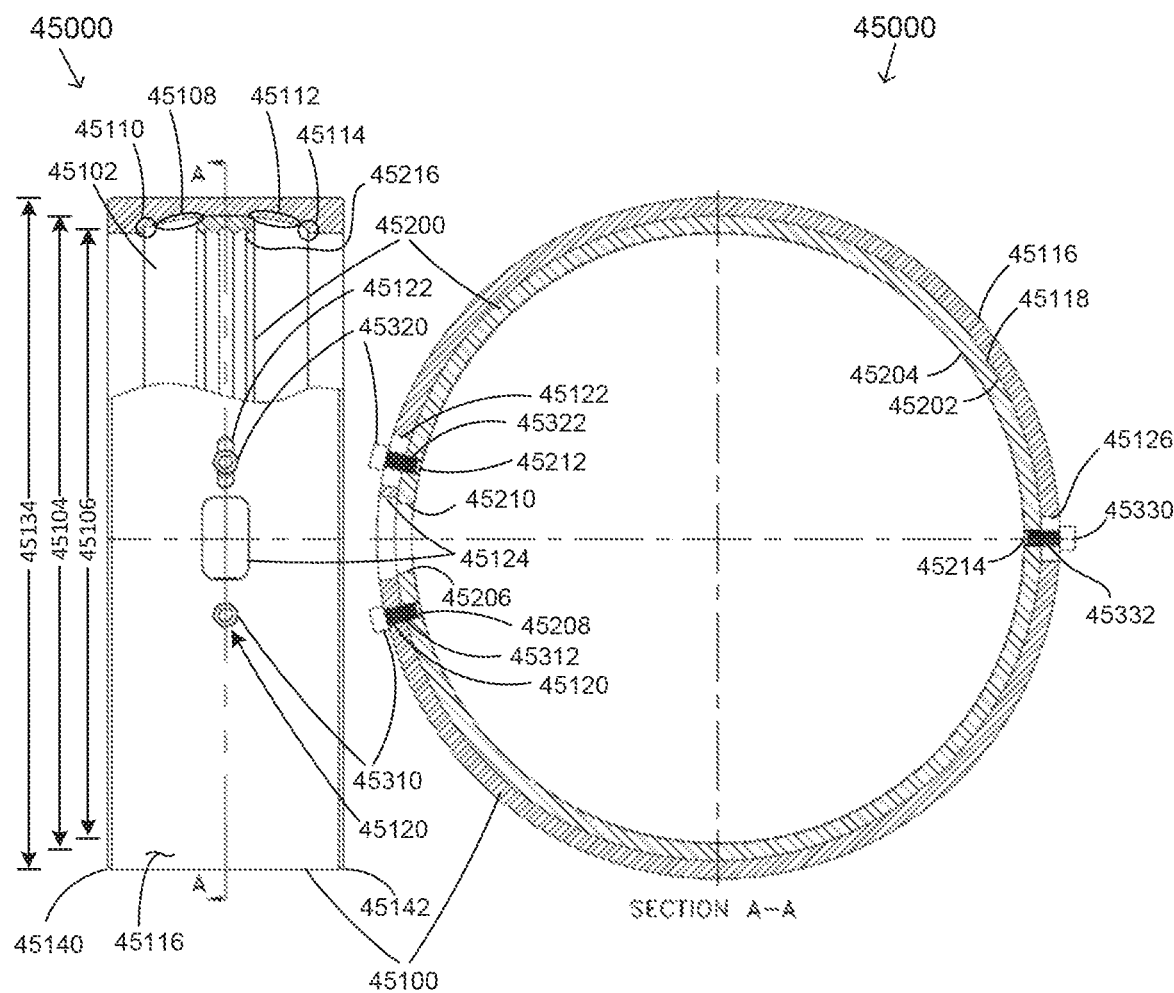
FIG. 45 is a partially exposed side plan view along with a sectional end view of a tubular gripping device, in accordance with various embodiments.
Figure 46:
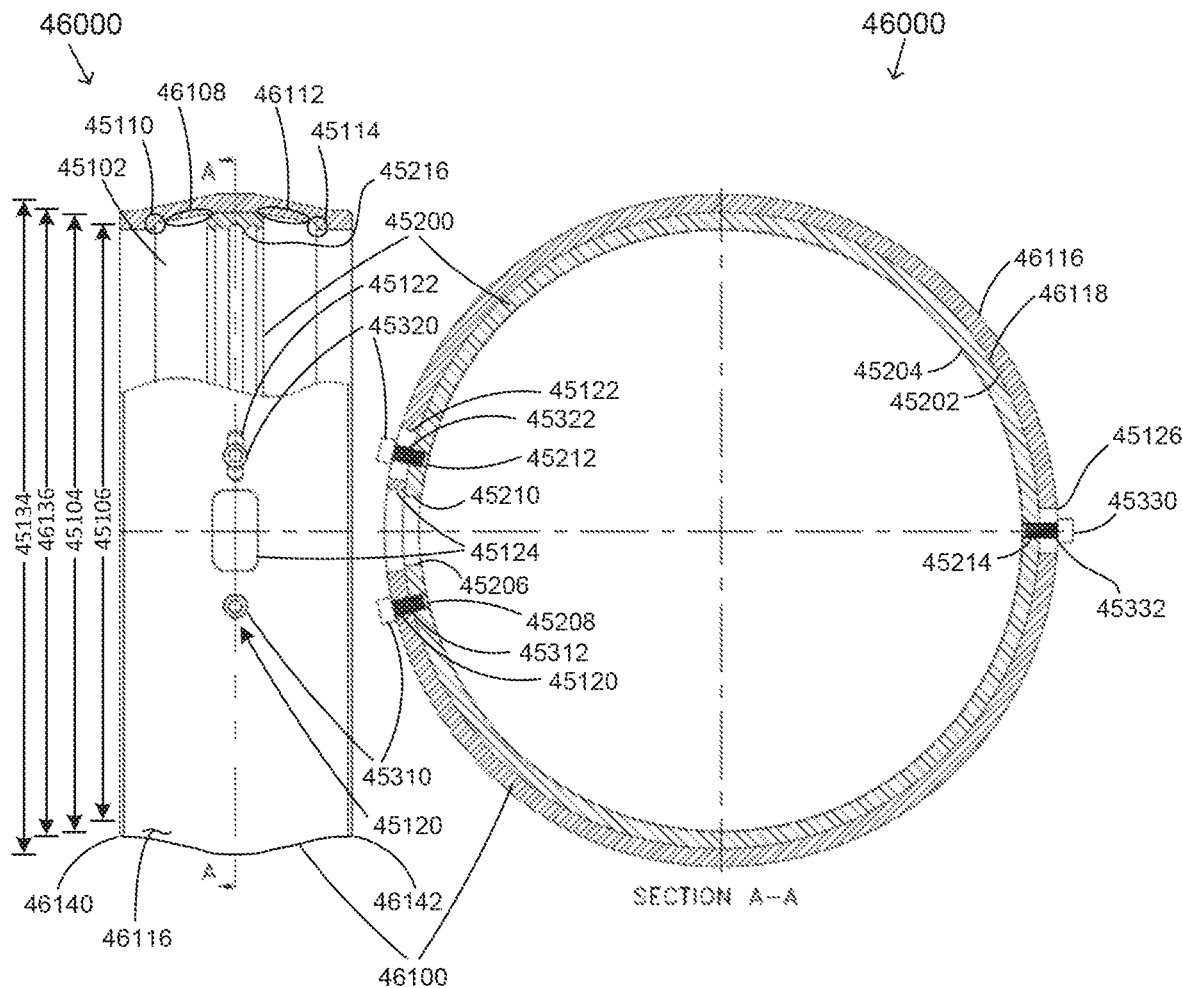
FIG. 46 is a partially exposed side plan view along with a sectional end view of a tubular gripping device, in accordance with various embodiments.

FIG. 45 is a partially exposed side plan view along with a sectional end view (A-A) of a tubular gripping device 45000, in accordance with various embodiments. Tubular gripping device 45000 may be implemented as a stop collar (depicted) and/or as a centralizer (by incorporating other features disclosed in one or more of FIGS. 1-44). Tubular gripping device 45000 has a cylindrical outer body 45100 comprising an exterior surface 45116 and an inner surface 45118 which defines an inner tubular cavity 45102. Exterior surface 45116 is non-profiled between first end 45140 and second end 45142, and is thus may be substantially uniform in diameter 45134 between first end 45140 and second end 45142. In some embodiments exterior surface 45116 may be configured with one or more features, such as stabilizing fins described in conjunction with other Figures depicted herein (see e.g., fin 2016 of FIG. 12), to center both the tubular gripping device 45000 and a gripped tubular member within a borehole. Inner surface 45118 has a first inner diameter 45104 and a second inner diameter 45106, where first inner diameter 45104 is greater than second inner diameter 45106. First inner diameter 45104 occurs approximately where the section lines for section A-A are disposed on the partially exposed side plan view. Inner surface 45118 is profiled into a first load shoulder 45108 and a second load shoulder 45110. An axial taper (from right to left with respect to FIG. 45) of first load shoulder 45108 tapers the first inner diameter 45104 down to second inner diameter 45106 at the second load shoulder 45110, where the second load shoulder 45110 is configured as a stop at the second inner diameter 45106 on the left side. The right to left axial taper of first load shoulder 45108 is depicted as a variable angle taper (e.g., spheroid), but in some embodiments, may be a constant angle taper (e.g., conical) as is depicted in FIG. 46. In some embodiments, an edge of a self-locking mechanism 45200 is configured to engage a load surface of the first load shoulder 45108. An example of this edge-to-load shoulder engagement is progressively depicted in FIGS. 50-55, and particularly in FIGS. 51 and 52.

Although some embodiments include only one set of load shoulders, FIG. 45 depicts two sets of load shoulders. As such, inner surface 45118 is profiled into a third load shoulder 45112 and a fourth load shoulder 45114. An axial taper (from left to right with respect to FIG. 45) of third load shoulder 45112 tapers the first inner diameter 45104 down to second inner diameter 45106 at the fourth load shoulder 45114, where the fourth load shoulder 45114 is configured as a second stop at the second inner diameter 45106 on the right side. The left to right axial taper of third load shoulder 45112 is depicted as a variable angle taper (e.g., spheroid), but in some embodiments, may be a constant angle taper (e.g., conical) as is depicted in FIG. 46. In some embodiments, an edge of a self-locking mechanism 45200 is configured to engage a load surface of the third load shoulder 45112. An example of this edge-to-load shoulder engagement is progressively depicted in FIGS. 50-55, and particularly in FIGS. 51 and 52.

Tubular gripping device 45000 also includes a self-locking mechanism 45200 positioned substantially co-axially within the tubular cavity 45102 of the outer body 45100 and proximate the first inner diameter 45104. Self-locking mechanism 45200 has an outer surface 45202 and an inner surface 45204. The self-locking mechanism 45200 may be a c-shaped grip ring (depicted) or other type of spring (such as a helical spring) described in conjunction with FIGS. 1-44). Self-locking mechanism 45200 has a spring expanded position (depicted in section A-A of FIG. 45) such that an inner diameter of the self-locking mechanism 45200 is marginally smaller than, substantially equal, to or greater than the second inner diameter 45106 of the outer body 45100. In some embodiments, the inner diameter of the self-locking mechanism when in the expanded position is configured to be slightly smaller than the second inner diameter 45106 of the outer body 45100. With the self-locking mechanism 45200 radially thicker than the cavity in the outer body 45100 we can ensure that the inner ring will be loaded into the first load shoulder and not allowed to slide, thus avoiding a potential problem where offset loading allows slipping.

Self-locking mechanism 45200 also has a spring released position (not depicted in FIG. 45) such that the inner diameter of the self-locking mechanism would springably contract from the expanded position to be smaller than the second inner diameter 45106 were the self-locking mechanism unrestrained. Self-locking mechanism is self-locking in that an external force or preload, such as a hammer strike, does not need to be applied at the time of installation; instead retainer member(s) are simply removed and the self-locking mechanism contracts by virtue of its own spring force. The self-locking mechanism is then wedged into place by movement of the outer body which pushes the load shoulders against the self-locking mechanism. In some embodiments inner surface 45204 of the self-locking mechanism 45200 includes ridges, teeth, and/or sharp wickers 45216 (depicted) that are configured to engage into the outer surface of a tubular member when self-locking mechanism 45200 is in an unrestrained in a spring released position. In some embodiments, the self-locking mechanism has a Rockwell C scale hardness of at least 30. In some embodiments, the ridges, teeth, and/or wickers 45216 provide gripping and/or frictional force between the tubular gripping device and the pipe section, and have a Rockwell C scale hardness between 38 and 45 and are harder than other portions of the self-locking mechanism.

In some embodiments, least one edge of self-locking mechanism 45200 is configured to engage a load surface of the second load shoulder 45110, wherein a vector normal to the surface of contact between the contacting edge of the self-locking mechanism 45200 and the second load shoulder 45110 is more parallel to the axis of the outer body 45100 than is a vector normal to the surface of contact between the contacting edge of the self-locking mechanism 45200 and the first load shoulder 45108. This type of engagement is better depicted in FIGS. 50-55, which also depict how, in some embodiments, a first radius of curvature of the load surface of the second load shoulder 45110 can substantially match a second radius of curvature of the at least one edge of the self-locking mechanism 45200 with which it is configured to engage. In some embodiments, least at least one edge of self-locking mechanism 45200 is configured to engage a load surface of the fourth load shoulder 45114, wherein a vector normal to the surface of contact between the contacting edge of the self-locking mechanism 45200 and the fourth load shoulder 45114 is more parallel to the axis of the outer body 45100 than is a vector normal to the surface of contact between the contacting edge of the self-locking mechanism 45200 and the third load shoulder 45112. This type of engagement is better depicted in FIGS. 50-55, which also depict how, in some embodiments, a first radius of curvature of the load surface of the fourth load shoulder 45114 can substantially match a second radius of curvature of the at least one edge of the self-locking mechanism 45200 with which it is configured to engage.

Several apertures/openings (45120, 45122, 45124, and 45126) are defined within outer body 45100. Aperture 45120 permits insertion of a retainer member 45310, which has a leg portion 45312. In a first retainer position for retainer member 45310, leg portion 45312 is configured to extend through aperture 45120 to interface with and radially restrain self-locking mechanism 45200 in the spring expanded position that is depicted in section A-A of FIG. 45. Retainer member 45310 also has a second retainer position where leg portion 45312 is removed from interfacing with and restraining the self-locking mechanism 45200 such that the self-locking mechanism 45200 may contract to its spring released position to grip an outer surface of a tubular member (not depicted in FIG. 45). In some embodiments, leg portion 45312 is threaded and interfaces with (threads into) a set of tapped threads 45208 located proximal the c-shaped open end 45206 of self-locking mechanism 45200, acting as a set screw, to radially restrain the self-locking mechanism 45200 in the spring expanded position as depicted. This radial restraint causes outer surface 45202 to abut inner surface 45118 of outer body 45100. In some embodiments, see e.g., FIG. 48, retainer member 45310 may alternatively interface with an end portion of the spring (e.g., a c-shaped grip ring), at the end edge 45206 of the c-shaped opening when the self-locking mechanism is in the spring expanded position. In such a case, leg portion 45312 may not be threaded or may not be fully threaded throughout its length.

Aperture 45122 permits insertion of a retainer member 45320, which has a leg portion 45322. In some embodiments, aperture 45122 may be elongated rather that being a simple circular hole, to provide increased tolerance and freedom of movement when installing retainer members 45310 and 45320. In a first retainer position for retainer member 45320, leg portion 45322 is configured to extend through aperture 45122 to interface with and radially restrain self-locking mechanism 45200 in the spring expanded position that is depicted in section A-A of FIG. 45. Retainer member 45320 also has a second retainer position where leg portion 45322 is removed from interfacing with and restraining the self-locking mechanism 45200 such that the self-locking mechanism 45200 may contract to its spring released position to grip an outer surface of a tubular member (not depicted in FIG. 45). In some embodiments, leg portion 45322 is threaded and interfaces with (threads into) a set of tapped threads 45212 located proximal the c-shaped open end 45210 of self-locking mechanism 45200, acting as a set screw, to radially restrain the self-locking mechanism 45200 in the spring expanded position as depicted. This radial restraint causes outer surface 45202 to abut inner surface 45118 of outer body 45100. In some embodiments, see e.g., FIG. 48, retainer member 45320 may alternatively interface with an end portion of the spring (a c-shaped grip ring), at the end edge 45210 of the c-shaped opening when the self-locking mechanism is in the spring expanded position. In such a case, leg portion 45322 may not be threaded or may not be fully threaded throughout its length.

In some embodiments outer body 45100 further includes a third aperture 45124 which allows for interaction with self-locking mechanism 45200, such as with spreading pliers, to expand self-locking mechanism 45200 to a spring expanded state to facilitate installation of one or more retainer members (45310, 45320, and the like). Such apertures may also be used to nudge or urge a spring released state self-locking mechanism into a desired position in contact with its load shoulder to facilitate precise positioning of the tubular gripping device.

In some embodiments outer body 45100 further includes aperture 45126. When included, aperture 45126 permits insertion of retainer member 45330, which has a leg portion 45332. In some embodiments, aperture 45126 may be elongated rather that being a simple circular hole, to provide increased tolerance and freedom of movement when installing retainer members 45310, 45320, and 45330. In a first retainer position of retainer member 45330, leg portion 45332 is configured to extend through aperture 45126 to interface with and axially and radially restrain self-locking mechanism 45200 in the spring expanded position that is depicted in section A-A of FIG. 45. In some embodiments, leg portion 45332 is threaded and interfaces with (threads into) a set of tapped threads 45214 located in self-locking mechanism 45200, acting as a set screw, to axially and radially restrain the self-locking mechanism 45200 in the spring expanded position (as depicted). The location of aperture 45126 is shown as being substantially opposite a mid-point between the spread apart ends 45206 and 45210 of self-locking mechanism 45200, but may be situated in other locations which provide for axial retention of self locking mechanism 45200. Retainer member 45330 also has a second retainer position where leg portion 45332 is removed from interfacing with and restraining the self-locking mechanism 45200 such that the self-locking mechanism 45200 may contract to its spring released position to grip an outer surface of a tubular member (not depicted in FIG. 45).

Tubular gripping device 45000 operates bidirectionally, and thus can be assembled onto a tubular member without regard to its orientation with respect to the tubular member. For example, outer body 45100 is configured to and able to slidably move relative to the self-locking mechanism in the left or right axial directions (with respect to the partial sectional view in FIG. 45) when the self-locking mechanism 45200 is in the spring released position and gripping the outer surface of a tubular member.

FIG. 46 is a partially exposed side plan view along with a sectional end view A-A of a tubular gripping device 46000, in accordance with various embodiments. In FIG. 46 like numbered items to those in FIG. 45 are similar or identical to those previously described in conjunction with FIG. 45. FIG. 46 differs from FIG. 45 in that it includes: 1) a profiled exterior surface 46116 of outer body 46100 instead of the non-profiled exterior surface 45116 of outer body 46100 depicted in FIG. 45; 2) a first load shoulder 46108 on inner surface 46118 with a constant angle of taper instead of the variable angle of taper of first load shoulder 45108 depicted in FIG. 45; and 3) a third load shoulder 46112 on inner surface 46118 with a constant angle of taper instead of the variable angle of taper of third load shoulder 45112 depicted in FIG. 45. The constant angle of taper of first load shoulder 45108 and/or third load shoulder 45112 may be a shallow angle, such as between 8 and 15 degrees. In some embodiments, the angle of taper may be, for example, 10 degrees.

With respect to the profiled exterior surface 46116, the maximum outer diameter of 45134 which occurs at approximately the location of section lines A-A is profiled or tapered downward to from diameter 45134 to a smaller diameter 46136 at first end 46140, and is likewise profiled or tapered downward from diameter 45134 to smaller diameter 46134 at second end 46142. This profiled outer diameter is configured to counteract increases in an effective outer diameter of the outer body in response to flaring of the outer body under load on the first load shoulder and the second load shoulder and/or on the third load shoulder and fourth load shoulder. Compensation for this load induced flaring by a profiled load shoulder is depicted and described in conjunction with FIGS. 54 and 55.

Tubular gripping device 46000 operates bidirectionally, and thus can be assembled onto a tubular member without regard to its orientation with respect to the tubular member. For example, outer body 46100 is configured to and able to slidably move relative to the self-locking mechanism in the left or right axial directions (with respect to the partial sectional view in FIG. 46) when the self-locking mechanism 45200 is in the spring released position and gripping the outer surface of a tubular member.

Figure 47:
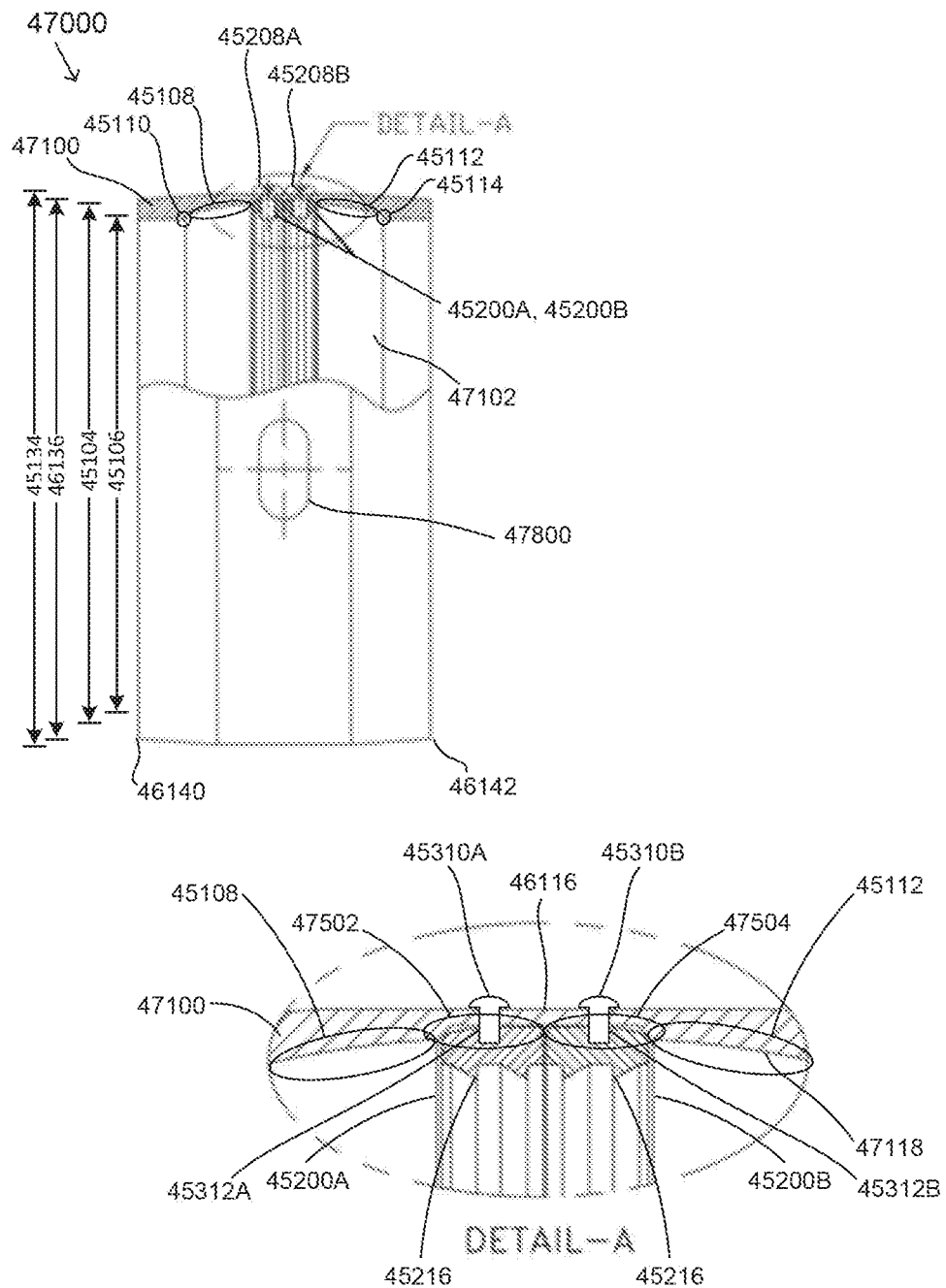
FIG. 47 is a partially exposed side plan view along with a detail view of a tubular gripping device, in accordance with various embodiments.

FIG. 47 is a partially exposed side plan view along with a detail view (Detail-A) of a tubular gripping device 47000, in accordance with various embodiments. Tubular gripping device 47000 combines various features from tubular gripping devices 45000 and 46000, while also including two self-locking mechanisms 45200A and 45200B instead of the single self-locking mechanism 45200 illustrated in tubular gripping devices 45000 and 46000. It should be apparent that the bi-directional tubular gripping devices 45000 and 46000 can similarly be equipped with two self-locking mechanisms. In FIG. 47 like numbered items to those in FIGS. 45 and 46 are similar or identical and thus may not be described again in conjunction with the description of FIG. 47.

Outer body 47100 has a profiled exterior surface 46116 and an inner surface 47118 that defines an inner tubular cavity 47102. Inner surface 47118 has a first diameter 45104 and a second diameter 45106 that is smaller than first diameter 45104. Inner surface 47118 defines first load shoulder 45108, second load shoulder 45110, third load shoulder 45112, and fourth load shoulder 45114. As illustrated in Detail-A, instead of a single self-locking mechanism 45200, tubular gripping device 47000 includes a pair of self-locking mechanisms 45200A and 45200B. Self-locking mechanisms 45200A and 45200B are similar in function to the previously described self-locking mechanism 45200. As illustrated in FIG. 47, a first self-locking mechanism 45200A is restrained by a retainer member (e.g., 45310A with leg portion 45312A) radially and/or axially in a spring expanded position within a recess 47502 which abuts first load shoulder 45108 with which it will engage with when in the spring released position. Additional retainer member(s) are not visible, but may be utilized in any manner depicted elsewhere herein. As illustrated in FIG. 47, a second self-locking mechanism 45200B is restrained by a retainer member (e.g., 45310B with leg portion 45312B) radially and/or axially in a spring expanded position within a recess 47504 which abuts third load shoulder 45112 with which it will engage with when in the spring released position. Additional retainer member(s) are not visible, but may be utilized in any manner depicted elsewhere herein. It should be appreciated that in some embodiments, recesses 47502 and 47504 may be omitted. Likewise, it should be appreciated that a similar recess or recess may be utilized with other described embodiments.

Tubular gripping device 47000 operates bidirectionally, and thus can be assembled onto a tubular member without regard to its orientation with respect to the tubular member. For example, outer body 47100 is configured to and able to slidably move relative to the self-locking mechanisms in the left or right axial directions (with respect to the partial sectional view in FIG. 46) when the self-locking mechanisms 45200A and 45200B are in the spring released position and gripping the outer surface of a tubular member.

Figure 48:
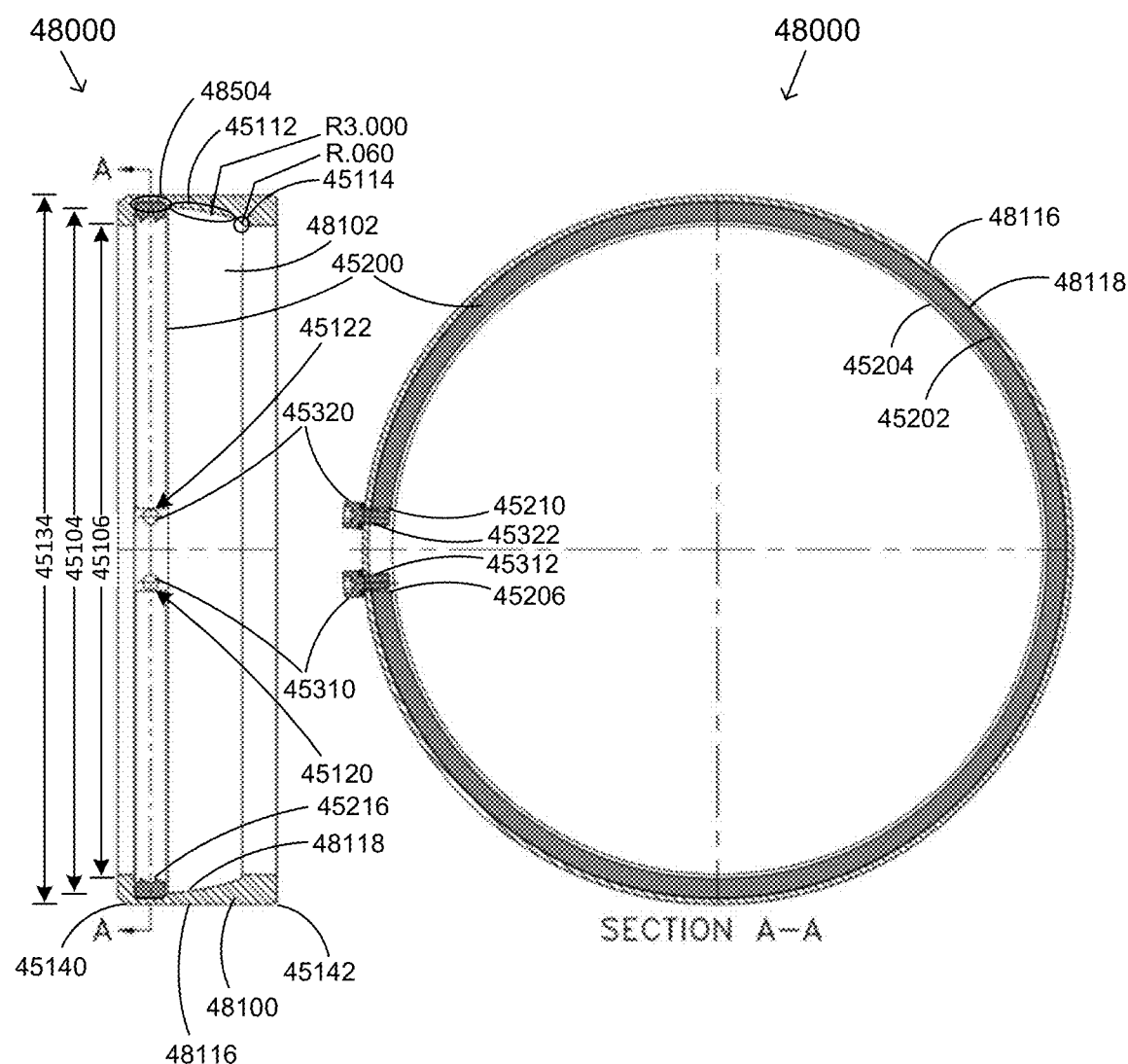
FIG. 48 is a sectional side plan view along with a sectional end view of a tubular gripping device, in accordance with various embodiments.

FIG. 48 is a sectional side plan view along with a sectional end view A-A of a tubular gripping device 48000, in accordance with various embodiments. Tubular gripping device 48000 is a unidirectional tubular gripping device and includes only one self-locking mechanism 45200. In FIG. 48 like numbered items to those in FIGS. 45, 46, and 47 are similar or identical and thus may not be described again in conjunction with the description of FIG. 48.

Outer body 48100 has a non-profiled exterior surface 48116 similar to non-profiled exterior surface 45116 of FIG. 45. Outer body 48100 has an inner surface 48118 that defines an inner tubular cavity 48102. Inner surface 48118 has a first diameter 45104 and a second diameter 45106 that is smaller than first diameter 45104. Inner surface 48118 defines a first load shoulder 45112 and a second load shoulder 45114 with a variable angle taper between the first and second load shoulders. Tubular gripping device 48000 includes a single self-locking mechanism 45200. Self-locking mechanism 45200 operates in a manner previously described for self-locking mechanism 45200 in conjunction with FIG. 45. As illustrated in FIG. 48, self-locking mechanism 45200 is radially restrained by retainer members 45310 and 45320 in a spring expanded position within a recess 48504 which abuts first load shoulder 45112 with which it will engage with when in the spring released position. Retainer members 45310 and 45320 abut end portions 45206 and 45210 of self-locking mechanism 45200 which may be a spring, such as a c-shaped grip ring or a helical spring. Additional retainer member(s) are not depicted, but may be utilized in any manner depicted elsewhere herein. It should be appreciated that in some embodiments, recesses 48504 may be omitted. Likewise, it should be appreciated that a similar recess or recess may be utilized with other described embodiments that do not depict a recess similar to recess 48504.

Figure 49:
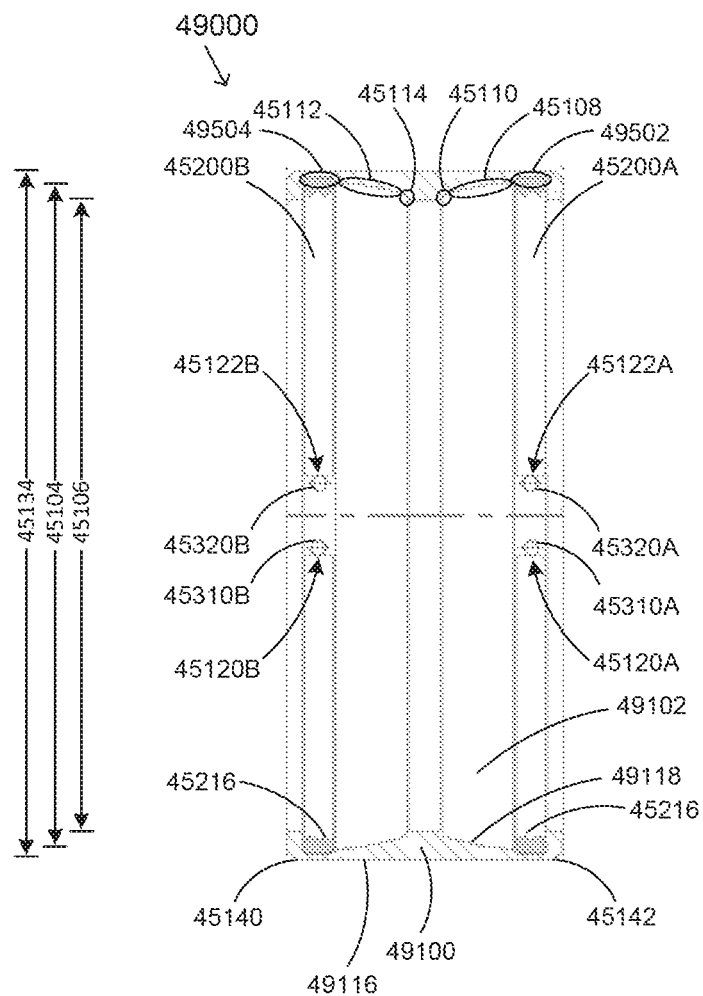
FIG. 49 is a sectional side plan view of a tubular gripping device, in accordance with various embodiments.

FIG. 49 is a sectional side plan view along with a sectional end view of a tubular gripping device 49000, in accordance with various embodiments. Tubular gripping device 49000 is a bidirectional tubular gripping device and includes two self-locking mechanisms 45200A and 45200B. In FIG. 49 like numbered items to those in FIGS. 45, 46, 47, and 48 are similar or identical and thus may not be described again in conjunction with the description of FIG. 49.

Outer body 49100 has a non-profiled exterior surface 49116 similar to non-profiled exterior surface 45116 of FIG. 45. Outer body 49100 has an inner surface 49118 that defines an inner tubular cavity 49102. Inner surface 49118 has a first diameter 45104 and a second diameter 45106 that is smaller than first diameter 45104. Inner surface 49118 defines a first load shoulder 45108, a second load shoulder 45110, a third load shoulder 45112, and a fourth load shoulder 45114 with a variable angle taper between them. Bidirectional tubular gripping device 49000 includes two self-locking mechanisms 45200A, and 45200B. Self-locking mechanisms 45200A and 45200B operate in a manner previously described for self-locking mechanism 45200 in conjunction with FIG. 45. As illustrated in FIG. 49, self-locking mechanism 45200A is restrained radially by retainer members 45310A and 45320A in a spring expanded position within a recess 49502 which abuts first load shoulder 45108 with which it will engage with when in the spring released position. Retainer members 45310A and 45320A extend through apertures 45120A and 45130A respectively (not visible) to engage with portions of self-locking mechanism 45200A which may be a spring, such as a c-shaped grip ring or a helical spring. Additional retainer member(s) are not depicted, but may be utilized in any manner depicted elsewhere herein. As illustrated in FIG. 49, self-locking mechanism 45200B is restrained radially by retainer members 45310B and 45320B in a spring expanded position within a recess 49504 which abuts third load shoulder 45112 with which it will engage with when in the spring released position. Retainer members 45310B and 45320B extend through apertures 45120B and 45130B respectively (not visible) to engage with portions of self-locking mechanism 45200B which may be a spring, such as a c-shaped grip ring or a helical spring. Additional retainer member(s) are not depicted, but may be utilized in any manner depicted elsewhere herein. It should be appreciated that in some embodiments, recesses 49502 and 49504 may be omitted. Likewise, it should be appreciated that a similar recess or recess may be utilized with other described embodiments that are not depicted or described as having such recesses.

Tubular gripping device 49000 operates bidirectionally, and thus can be assembled onto a tubular member without regard to its orientation with respect to the tubular member. For example, outer body 49100 is configured to and able to slidably move relative to the self-locking mechanisms in the left or right axial directions (with respect to the sectional view in FIG. 49) when either or both of the self-locking mechanism 45200A and/or 45200B are in the spring released position and gripping the outer surface of a tubular member.

When two self-locking mechanisms are utilized in a bi-directional tubular gripping device (see e.g., FIGS. 47 and 49) the separate self-locking mechanisms can be urged into initial engagement against their appropriate load shoulders once installed, thereby minimizing the amount of slop or movement of the outer body upon loads being applied from alternate directions. For example, the slot aperture 47800 depicted in FIG. 47, when included, provides another opening in the outer body 47100 of tubular gripping device 47000 through which a rod, screwdriver, pliers, or the like, may be used to prod and slide the self-locking mechanisms 45208A and 45208B axially apart from each other and against their respective load shoulders in outer body 47100. This would be done after the system has been installed on a tubular member by removal of the retainer members from interfacing with the self-locking members.

One or more apertures of various shapes and/or sizes may be provided in outer body 47100 of FIG. 47 and/or outer body 49100 of FIG. 49 to provide similar access for a screwdriver, push rod, or the like to push the self-locking mechanisms into initial engagement with their respective load shoulders. Causing this initial engagement to occur reduces axial movement and has the effect that adjacent parts can be installed on a tubular member with greater positional accuracy. Also, the minimizing initial movement in this manner can provide a high level of confidence to an installer that the system is properly set in place on the tubular member.

Figure 50:
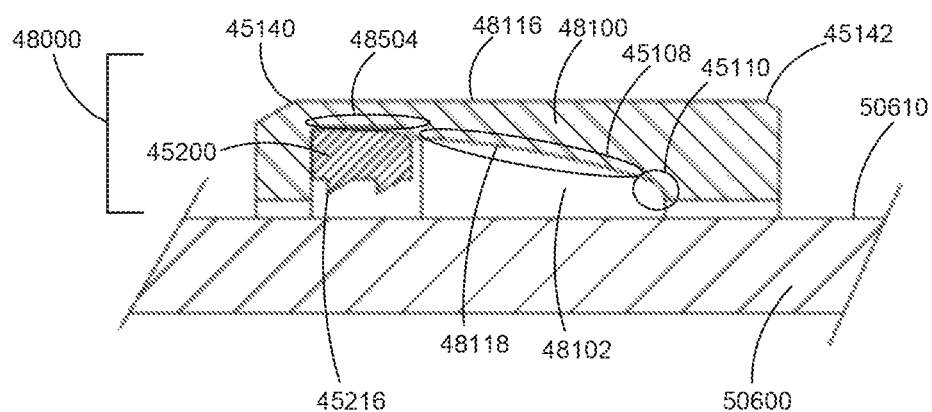
FIG. 50 is a detail of a tubular gripping device installed upon a tubular member and before engagement of a self-locking mechanism with the tubular member, according to various embodiments.

FIG. 50 is a detail of a tubular gripping device 48000 installed upon a tubular member 50600 and before engagement of a self-locking mechanism 45200 with the tubular member 50600, according to various embodiments. As depicted, self-locking mechanism 45200 is in the spring expanded position and wickers 45216 are held above and do not touch the outer surface 50610 of tubular member 50600. The radius of curvature of the outer surface of self-locking mechanism 45200 is smaller than the radius of curvature of load shoulder 45108, and this insures a fairly controlled small band of contact as load is initially applied at initial contact, with the band getting larger as the load is increased along with the load vector angle changing. Additionally, as will be illustrated in FIG. 53, the top right edge (with respect to FIG. 50) of self-locking mechanism 45200 is configured to engage the load surfaces of load shoulder 45110. It should be noted that a first radius of curvature of load surface of load shoulder 45110 substantially matches a second radius of curvature of the top right edge of self-locking mechanism 45200 such that second load shoulder acts as a stop when self-locking mechanism fully interfaces with load shoulder 45110. Although load shoulder 45108 is illustrated as having a varying angle of taper, it should be appreciated that the same progression shown in FIGS. 50-53 (with slightly different axial loads) would occur if a constant taper load shoulder were instead employed in this example.

Figure 51:
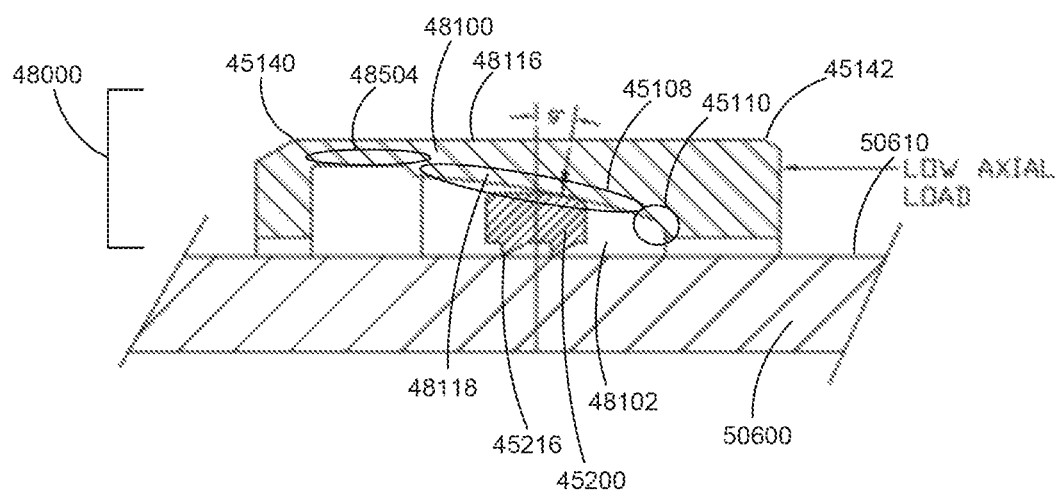
FIG. 51 is a detail of a tubular gripping device installed upon a tubular member and after release of a self-locking mechanism and engagement with a first load shoulder, according to various embodiments.

FIG. 51 is a detail of a tubular gripping device 48000 installed upon a tubular member 50600 and after release of a self-locking mechanism 45200 and initial engagement with a first load shoulder 45108, according to various embodiments. As depicted, self-locking mechanism 45200 is in the spring release position (with retainer members having been removed or moved to a second retainer position). Outer body 45100 has moved axially from right to left (with respect to the previous position FIG. 50) creating a low axial load on self-locking mechanism 45200. Under this low axial load, wickers 45216 are now touching but not imbedded in outer surface 50610 of tubular member 50600.

Figure 52:
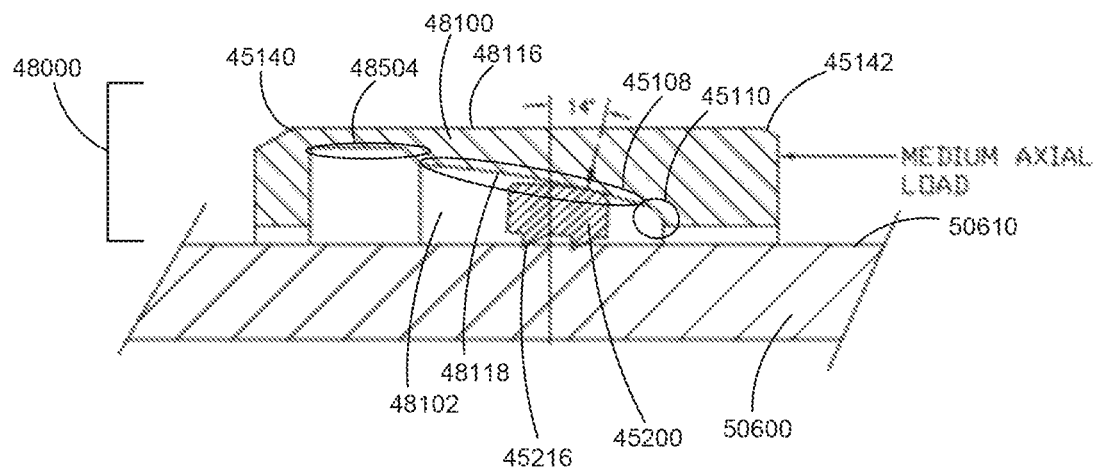
FIG. 52 is a detail of a tubular gripping device installed upon a tubular member and after release of a self-locking mechanism and further engagement with a first load shoulder, according to various embodiments.

FIG. 52 is a detail of a tubular gripping device installed upon a tubular member and after release of a self-locking mechanism and further engagement with a first load shoulder 45108, according to various embodiments. As depicted, self-locking mechanism 45200 is still in the spring release position. Outer body 45100 has moved further axially from right to left (with respect to the previous position in FIG. 51) creating a medium axial load on self-locking mechanism 45200. The contact vector angle is shown to be have increased to 14 degrees from the normal to the center line of tubular member 50600. This large angle lessens the compressive collapse load on tubular member 50600 and the tensional expansive load on outer body 45100 as opposed to maintaining a constant angle of taper and interface in load shoulder 45108. It should be appreciated that the exact angle would vary based, for example, on the tolerance of the outer diameter of tubular member 50600. Under this medium axial load, wickers 45216 are now being forced into the relatively softer material of outer surface 50610 of tubular member 50600.

Figure 53:
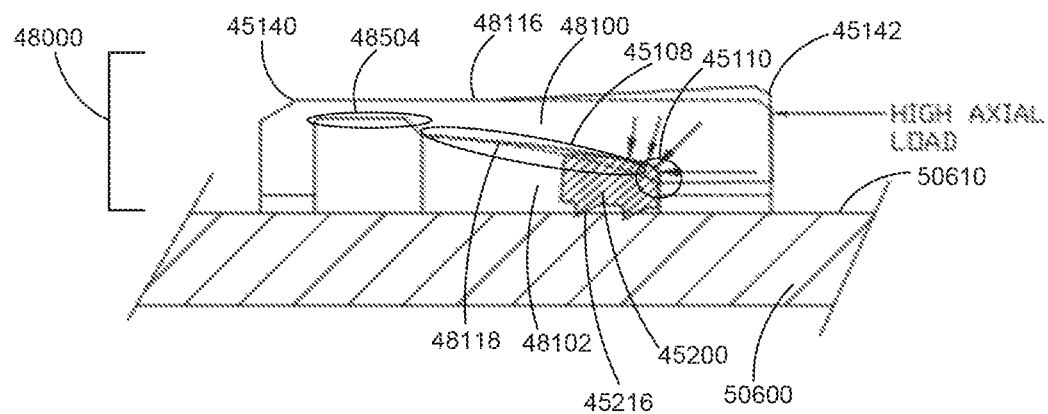
FIG. 53 is a detail of a tubular gripping device installed upon a tubular member and after release of a self-locking mechanism and engagement with a second load shoulder, according to various embodiments.

FIG. 53 is a detail of a tubular gripping device 48000 installed upon a tubular member 50600 and after release of a self-locking mechanism 45200 and engagement with a second load shoulder 45110, according to various embodiments. Secondary load shoulder 45110 provides a stop by decreasing the radius/angle of taper very quickly from load shoulder 45108 to near or equal to zero degrees (parallel) with respect to the centerline normal of tubular member 50600 at the point in load shoulder 45108 when high axial loading occurs. As depicted, the top right corner of self-locking mechanism 45200 has nested into the radius of load shoulder 45110. Additionally, second end 45142 has flared upward by several degrees due to the expansive load placed upon load shoulder 45108 and load shoulder 45110. This flaring has the effect of slightly deforming the second edge 45142 of the non-profiled exterior surface 48116 slightly out of parallel with respect to the outer surface 50610 of tubular member 50600 and thus increasing the effective outer diameter of outer body 45100. The flaring comprises a certain amount of elastic and plastic deformation of outer body 45100. From a deformation perspective, the provision of load shoulder 45110 limits, to a prescribed amount, the possible expansion/flaring of outer body 45100. In many instances this slight flaring causes no issues, however when tolerances are tight this flaring could create fit issues in the well bore. In such tight tolerances the flaring can be minimized or eliminated by implementing a profiled outer diameter on the outer body, as illustrated in FIGS. 54 and 55.

In the state shown in FIG. 53, further application of axial load to the system does not result in further hoop load developing in outer body 45100. Rather, further applied loads are transferred axially into the end of the self-locking member 45200 and into the wickers 45216. Since additional loads and reactive loads are now primarily axial in nature, they will not result in much (if any) further collapse loads on the tubular member 50600. When loads are increased to the point of failure, shearing will occur in wickers 45216 or the material of tubular member 50600 in which wickers 45216 are imbedded. More simply put, failure does not result in bursting of outer body 45100 or collapse of tubular member 50600.

Figure 54:
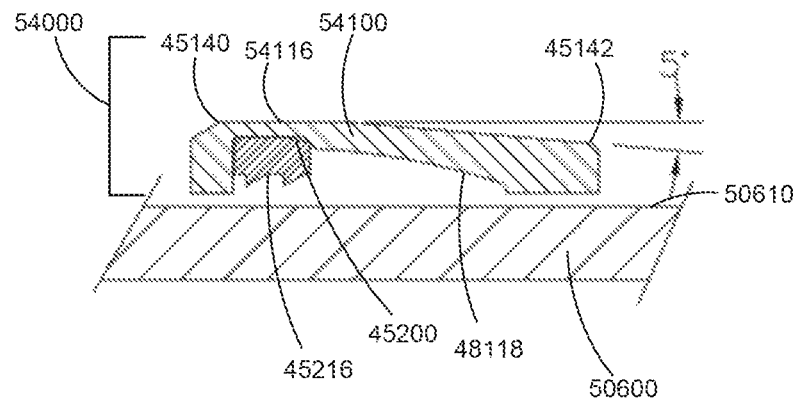
FIG. 54 is a detail of a tubular gripping device with a profiled outer diameter installed upon a tubular member and before engagement of a self-locking mechanism with the tubular member, according to various embodiments.

FIG. 54 is a detail of a tubular gripping device 54000 with a profiled outer diameter installed upon a tubular member 50600 and before engagement of a self-locking mechanism 45200 with the tubular member 50600, according to various embodiments. FIG. 54 is a comparable state of installation to what is shown in FIG. 50 with a non-profiled outer body. In many use cases, such as tight borehole tolerances for example, it may be desirable to minimize or prevent the flaring which causes an effective increase in the outer diameter of an outer body. To do this, a portion of the outer diameter of outer body 54100 may be profiled (i.e., a portion of exterior surface 54116 is removed or purposely shaped) to compensate for expansion caused by flaring on end 45142. FIG. 54 illustrates a 5 degree profile in the form of a decrease in 5 degrees of the outer diameter of outer body 54100 between end 45140 and end 45142.

Figure 55:
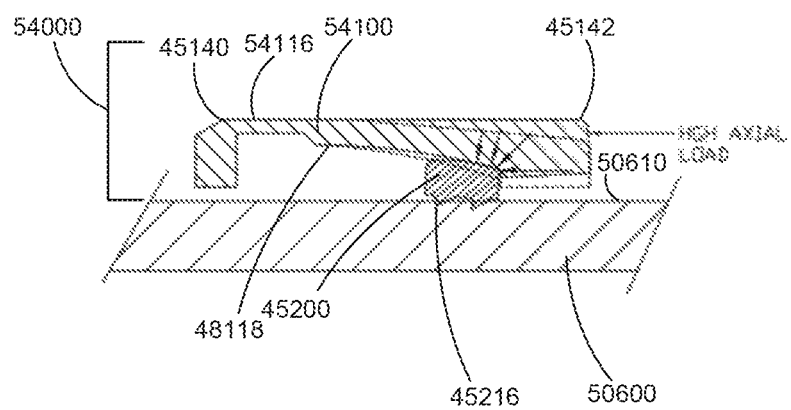
FIG. 55 is a detail of a tubular gripping device with a profiled outer diameter installed upon a tubular member and after release of a self-locking mechanism and engagement with a second load shoulder, according to various embodiments.

FIG. 55 is a detail of a tubular gripping device 54000 with a profiled outer diameter installed upon a tubular member 50600 and after release of a self-locking mechanism and engagement with a first load shoulder 45108 and a second load shoulder 45110, according to various embodiments. FIG. 55 is a comparable state of installation to what is shown in FIG. 53 with a non-profiled outer body. In FIG. 55 a high axial load has caused end 45142 to deformably flare upward by approximately 5 degrees such that the effective outer diameter of outer body 54100 is now substantially parallel with the outer surface 50610 of tubular member 50600. In one embodiment, the effective outer diameter after maximum flaring of the outer body 54100 does not exceed the initial maximum outer diameter of outer body 54100 at end 45140.

It should be appreciated that, in some embodiments, the state illustrated in FIGS. 53 and 55 creates an axial lock of tubular gripping device 48000 with respect to tubular member 50600, but may not create a rotational lock of tubular gripping device 48000 with respect to tubular member 50600. In other embodiments both a rotational and axial lock are created.

FIG. 56A and FIG. 56B illustrate a flow diagram 56000 of a method of attaching a tubular gripping device to a tubular member, in accordance with various embodiments. The tubular gripping device may be any of the tubular gripping devices (e.g., 45000, 46000, 47000, 48000, 49000, 54000, or the like) or variations thereof, illustrated and/or described in FIGS. 45 through 55. The tubular member may be a pipe such as a wellbore pipe, one example of which is tubular member 50600 illustrated in FIG. 50. For purposes of example and not of limitation reference will be made primarily to elements of FIG. 46 in description of flow diagram 56000.

Referring now to FIG. 56A, at 56100, in an embodiment, the tubular gripping device 46000 is placed onto the tubular member (e.g., tubular member 50600). This can include sliding the tubular gripping device 46000 into a desired position relative to the tubular member 50600. In various embodiments, the tubular gripping device 46000 comprises: an outer body 46100, at least one self-locking mechanism 45200, and at least one retainer member 45310.

The outer body 46100 defines an inner tubular cavity 45102, and is configured to slide over an outer surface (e.g., outer surface 50610) of the tubular member 50600. The inner tubular cavity 45102 has a first inner diameter 45104, a second inner diameter 45106, a first load shoulder 46108, and a second load shoulder 45110. The first inner diameter 45104 is greater than the second inner diameter 45106, and an axial taper of the first load shoulder 46108 tapers the first inner diameter 45104 down to second inner diameter 45106 at the second load shoulder 45110. Additionally, the second load shoulder 45110 is configured as a stop at the second inner diameter 45106.

The at least one self-locking mechanism 45200 is positioned substantially co-axially within the tubular cavity 45102 of the outer body 46100 and proximate the first inner diameter 45104. The self-locking mechanism 45200 has a spring expanded position such that an inner diameter of the self-locking mechanism 45200 is substantially equal to or greater than the second inner diameter 45106. The self-locking mechanism 45200 also has a spring released position such that the inner diameter of the self-locking mechanism would springably contract to be substantially smaller than the second inner diameter 45106 were the self-locking mechanism 45200 unrestrained.

The retainer member 45310 has a first retainer position where a leg portion 45312 of the retainer member 45310 is configured to extend through an aperture 45120 in the outer body 46100 to interface with and radially restrain the self-locking mechanism 45200 in the spring expanded position. The retainer member 45310 also has a second retainer position where the leg portion 45312 of the retainer member 45310 is removed from interfacing with (e.g., pulled out and/or unscrewed) and restraining the self-locking mechanism 45200 such that the self-locking mechanism 45200 may contract to the spring released position to grip an outer surface 50610 of the tubular member 50600. It should be appreciated that there may be two or more retainer members in some embodiments.

At 56200, in various embodiments, the retainer member 45310 is moved from the first retainer position to the second retainer position to allow the self-locking mechanism 45200 of the tubular gripping device to grip the outer surface of the tubular member. It should be appreciated that in some embodiments there may be two or more retainer members (e.g., 45320, 45330, and the like) which are removed at 56200 from interfacing with and restraining the self-locking mechanism 45200. Moving any retainer member from its first retainer position to its second retainer position may comprise pulling it radially outward, such as by hand or with a hand tool, and/or or unscrewing it. For example, in various embodiments the leg portion (e.g., 45312) of the retainer member (e.g., 45310) is unscrewed from a set of threads (e.g., tapped threads 45208) that are tapped into the self-locking mechanism 45200. In some such embodiments, self-locking mechanism 45200 comprises a c-shaped grip ring, and the threads are tapped proximal to but not on one of the ends (e.g., 45206) of the c-shaped opening in the c-shaped grip ring.

Referring now to FIG. 56B, at 56300, in various embodiments, the method further comprises: axially repositioning one or more self-locking mechanisms relative to the outer body by sliding the one or more self-locking mechanisms into contact with their respective load shoulders by manually interacting with the one or more self-locking mechanisms via one or more apertures provided in the outer body. An example of such manual access was previously discussed in conjunction with the description of FIGS. 47 and 49.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments.

We claim:

1. A tubular gripping device comprising:
   an outer body defining an inner tubular cavity having a first inner diameter, a second inner diameter, a first load shoulder, and a second load shoulder, wherein the first inner diameter is greater than the second inner diameter, and wherein an axial taper of the first load shoulder tapers the first inner diameter down to second inner diameter at the second load shoulder, wherein the second load shoulder is configured as a stop at the second inner diameter;
   a self-locking mechanism positioned substantially co-axially within the tubular cavity of the outer body and proximate the first inner diameter, the self-locking mechanism having a spring expanded position such that an inner diameter of the self-locking mechanism is marginally smaller than or substantially equal to or greater than the second inner diameter, and having a spring released position such that the inner diameter of the self-locking mechanism would springably contract to be substantially smaller than the second inner diameter were the self-locking mechanism unrestrained, said self-locking mechanism further comprising:
   a set of tapped threads, and wherein the leg portion of the retainer member is configured to extend through the aperture in the outer body to thread into the tapped threads and radially restrain the self-locking mechanism in the spring expanded position; and
   a retainer member having a first retainer position wherein a leg portion of the retainer member is configured to extend through an aperture in the outer body to interface with and radially restrain the self-locking mechanism in the spring expanded position, and the retainer member having a second retainer position wherein the leg portion of the retainer member is removed from interfacing with and restraining the self-locking mechanism such that the self-locking mechanism may contract to the spring released position to grip an outer surface of a tubular member.

2. The tubular gripping device of claim 1, further comprising:
   a second retainer member having a first retainer position wherein a leg portion of the second retainer member is configured to extend through a second aperture in the outer body to interface with and radially restrain the self-locking mechanism in the spring expanded position, and the second retainer member having a second retainer position wherein the leg portion of the second retainer member is removed from interfacing with and restraining the self-locking mechanism such that the self-locking mechanism may contract to the spring released position to grip the outer surface of the tubular member.

3. The tubular gripping device of claim 2, further comprising:
   a third retainer member having a first retainer position wherein a leg portion of the third retainer member is configured to extend through a third aperture in the outer body to interface with and axially and radially restrain the self-locking mechanism in the spring expanded position, and the third retainer member having a second retainer position wherein the third leg portion is removed from interfacing with and restraining the self-locking mechanism such that the self-locking mechanism may contract to the spring released position to grip the outer surface of the tubular member.

4. The tubular gripping device of claim 1, wherein the self-locking mechanism further comprises:
   a second set of tapped threads, and wherein the second leg portion of the second retainer member is configured to extend through the second aperture in the outer body to thread into the second set of tapped threads and radially restrain the self-locking mechanism in the spring expanded position.

5. The tubular gripping device of claim 1, wherein the outer body further comprises:
   a profiled outer diameter configured to counteract increase in an effective outer diameter of the outer body in response to flaring of the outer body under load on the first load shoulder and the second load shoulder.

6. The tubular gripping device of claim 1, wherein the outer body further comprises:
   an outer surface configured to center the tubular member within a borehole.

7. The tubular gripping device of claim 1, where in the taper is a constant angle taper.

8. The tubular gripping device of claim 1, where in the taper is a varied angle taper.

9. The tubular gripping device of claim 1, wherein an inner surface of the self-locking mechanism comprises:
   a plurality of wickers configured to engage into the outer surface of the tubular member.

10. The tubular gripping device of claim 1, wherein the self-locking mechanism comprises:
    a c-shaped grip ring.

11. The tubular gripping device of claim 1, wherein an edge of the self-locking mechanism is configured to engage a load surface of the second load shoulder, and wherein a first radius of curvature of the load surface of the second load shoulder substantially matches a second radius of curvature of the edge of the self-locking mechanism.

12. The tubular gripping device of claim 1, wherein an edge of the self-locking mechanism is configured to engage a load surface of the second load shoulder, and wherein a vector normal to a surface of contact between the engaging edge of the self-locking mechanism and the second load shoulder is more parallel to the axis of the outer body than is a vector normal to the surface of contact between the engaging edge of the self-locking mechanism and the first load shoulder.

13. A tubular gripping device comprising:
    an outer body defining an inner tubular cavity having a first inner diameter, a second inner diameter, a first load shoulder, a second load shoulder, a third load shoulder, and a fourth load shoulder, wherein the first inner diameter is greater than the second inner diameter, and wherein the first load shoulder tapers in a first axial direction from the first inner diameter down to the second inner diameter at the second load shoulder, wherein the second load shoulder is configured as a stop, and wherein the third load shoulder tapers in a second axial direction from the first inner diameter down to the second inner diameter at the fourth load shoulder, wherein the fourth load shoulder is configured as a stop, wherein the first axial direction and the second axial direction are opposite directions;
- a self-locking mechanism positioned substantially co-axially within the tubular cavity of the outer body, the self-locking mechanism having a spring expanded position such that an inner diameter of the self-locking mechanism is marginally smaller than or substantially equal to or greater than the second inner diameter, and having a spring released position such that the inner diameter of the self-locking mechanism would springably contract to be substantially smaller than the second inner diameter were the self-locking mechanism, said self-locking mechanism further comprising:
  - a set of tapped threads, and wherein the leg portion of the retainer member is configured to extend through the aperture in the outer body to thread into the tapped threads and radially restrain the self-locking mechanism in the spring expanded position;
- a retainer member having a first retainer position wherein a leg portion of the retainer member is configured to extend through an aperture in the outer body to interface with and radially restrain the self-locking mechanism in the spring expanded position, and the retainer member having a second retainer position wherein the leg portion of the retainer member is removed from interfacing with and restraining the self-locking mechanism such that the self-locking mechanism may contract to the spring released position to grip an outer surface of a tubular member; and
- a second retainer member having a first retainer position wherein a leg portion of the second retainer member is configured to extend through a second aperture in the outer body to interface with and radially restrain the self-locking mechanism in the spring expanded position, and the second retainer member having a second retainer position wherein the leg portion of the second retainer member is removed from interfacing with and restraining the self-locking mechanism such that the self-locking mechanism may contract to the spring released position to grip the outer surface of the tubular member.

14. The tubular gripping device of claim 13, further comprising:
- a second self-locking mechanism positioned substantially co-axially within the tubular cavity of the outer body, the self-locking mechanism having a spring expanded position such that an inner diameter of the second self-locking mechanism is marginally smaller than or substantially equal to or greater than the second inner diameter, and having a spring released position such that the inner diameter of the second self-locking mechanism would springably contract to be substantially smaller than the second inner diameter were the self-locking mechanism unrestrained.

15. The tubular gripping device of claim 13, further comprising:
- a third retainer member having a first retainer position wherein a leg portion of the third retainer member is configured to extend through a third aperture in the outer body to interface with and axially and radially restrain the self-locking mechanism in the spring expanded position, and the third retainer member having a second retainer position wherein the third leg portion is removed from interfacing with and restraining the self-locking mechanism such that the self-locking mechanism may contract to the spring released position to grip the outer surface of the tubular member.

16. The tubular gripping device of claim 13, wherein the self-locking mechanism further comprises:
- a second set of tapped threads, and wherein the second leg portion of the second retainer member is configured to extend through the second aperture in the outer body to thread into the second set of tapped threads and radially restrain the self-locking mechanism in the spring expanded position.

17. The tubular gripping device of claim 13, wherein the outer body further comprises:
- a profiled outer diameter configured to counteract increase in an effective outer diameter of the outer body in response to flaring of the outer body under load on the first load shoulder and the second load shoulder.

18. The tubular gripping device of claim 13, wherein the outer body further comprises:
- an outer surface configured to center the tubular member within a borehole.

19. The tubular gripping device of claim 13, where the first load shoulder tapers at a constant angle in the first axial direction.

20. The tubular gripping device of claim 13, where the first load shoulder tapers at varied angle in the first axial direction.

21. The tubular gripping device of claim 13, wherein an inner surface of the self-locking mechanism comprises:
- a plurality of wickers configured to engage into the outer surface of the tubular member.

22. The tubular gripping device of claim 13, wherein the self-locking mechanism comprises:
- a c-shaped grip ring.

23. The tubular gripping device of claim 13, wherein an edge of the self-locking mechanism is configured to engage a load surface of the second load shoulder, and wherein a first radius of curvature of the load surface of the second load shoulder substantially matches a second radius of curvature of the edge of the self-locking mechanism.

24. The tubular gripping device of claim 13, wherein an edge of the self-locking mechanism is configured to engage a load surface of the third load shoulder, and wherein a first radius of curvature of the load surface of the fourth load shoulder substantially matches a second radius of curvature of the edge of the self-locking mechanism.

25. The tubular gripping device of claim 13, wherein an edge of the self-locking mechanism is configured to engage a load surface of the second load shoulder, and wherein a vector normal to a surface of contact between the engaging edge of the self-locking mechanism and the second load shoulder is more parallel to the axis of the outer body than is a vector normal to the surface of contact between the engaging edge of the self-locking mechanism and the first load shoulder.

26. The tubular gripping device of claim 13, wherein an edge of the self-locking mechanism is configured to engage a load surface of the fourth load shoulder, and wherein a vector normal to a surface of contact between the engaging edge of the self-locking mechanism and the fourth load shoulder is more parallel to the axis of the outer body than is a vector normal to the surface of contact between the engaging edge of the self-locking mechanism and the third load shoulder.

27. The tubular gripping device of claim 13, wherein the outer body configured to slidably move relative to the self-locking mechanism in either of the first axial direction and the second axial direction when the self-locking mechanism is in the spring released position and gripping the outer surface of the tubular member.

28. A method of attaching a tubular gripping device to a tubular member, the method comprising:
   placing a tubular gripping device onto the tubular member, the tubular gripping device comprising:
      an outer body which defines an inner tubular cavity configured to slide over an outer surface of the tubular member, the inner tubular cavity having a first inner diameter, a second inner diameter, a first load shoulder, and a second load shoulder, wherein the first inner diameter is greater than the second inner diameter, and wherein an axial taper of the first load shoulder tapers the first inner diameter down to second inner diameter at the second load shoulder, and wherein the second load shoulder is configured as a stop at the second inner diameter;
      a self-locking mechanism positioned substantially co-axially within the tubular cavity of the outer body and proximate the first inner diameter, the self-locking mechanism having a spring expanded position such that an inner diameter of the self-locking mechanism is marginally less than or substantially equal to or greater than the second inner diameter, and having a spring released position such that the inner diameter of the self-locking mechanism would springably contract to be substantially smaller than the second inner diameter were the self-locking mechanism unrestrained; and
      a retainer member having a first retainer position wherein a leg portion of the retainer member is configured to extend through an aperture in the outer body to interface with and radially restrain the self-locking mechanism in the spring expanded position, and the retainer member having a second retainer position wherein the leg portion of the retainer member is removed from interfacing with and restraining the self-locking mechanism such that the self-locking mechanism may contract to the spring released position to grip an outer surface of the tubular member; and
   moving the retainer member from the first retainer position to the second retainer position to allow the self-locking mechanism of the tubular gripping device to grip the outer surface of the tubular member, wherein moving said retainer member from said first retainer position to said second retainer position comprises:
      unscrewing the leg portion of the retainer member from a set of threads tapped into the self-locking mechanism, wherein the self-locking mechanism comprises a c-shaped grip ring, and the threads are tapped proximal to an end of the c-shaped opening in the c-shaped grip ring.

29. The method as recited in claim 28 further comprising: axially repositioning the self-locking mechanism relative to the outer body by sliding the self-locking mechanism into contact with its respective load shoulder by manually interacting with the self-locking mechanism via one or more apertures provided in the outer body.

\* \* \* \* \*